(12) United States Patent
Lawson et al.

(10) Patent No.: US 8,919,413 B2
(45) Date of Patent: Dec. 30, 2014

(54) SYSTEM AND METHOD FOR PROCESSING A TIRE-WHEEL ASSEMBLY

(75) Inventors: Lawrence J. Lawson, Troy, MI (US);
Barry A. Clark, Ortonville, MI (US);
Robert Reece, Clarkston, MI (US);
Ramsey R. Niazy, Key Colony Beach, FL (US)

(73) Assignee: Android Industries LLC, Auburn Hills, MI (US)

( * ) Notice: Subject to any disclaimer, the term of this patent is extended or adjusted under 35 U.S.C. 154(b) by 231 days.

(21) Appl. No.: 13/617,605

(22) Filed: Sep. 14, 2012

(65) Prior Publication Data
US 2013/0081765 A1 Apr. 4, 2013

Related U.S. Application Data

(60) Provisional application No. 61/535,745, filed on Sep. 16, 2011.

(51) Int. Cl.
*B60C 25/05* (2006.01)
*B60C 25/14* (2006.01)
*B23P 19/04* (2006.01)
*B60B 31/00* (2006.01)

(52) U.S. Cl.
CPC ............. *B60C 25/05* (2013.01); *B60C 25/0512* (2013.04); *B60C 25/145* (2013.04); *B60C 25/0569* (2013.04); *B60B 31/00* (2013.01)
USPC ....................................................... 157/1.17

(58) Field of Classification Search
USPC ............. 157/1, 1.1, 1.2, 1.17; 29/430, 894.31
See application file for complete search history.

(56) References Cited

U.S. PATENT DOCUMENTS

| 2,665,747 A | 1/1954 | Harrison |
| 2,816,604 A | 12/1957 | Greenley et al. |
| 2,817,394 A | 12/1957 | Kriebel, Jr. et al. |

(Continued)

FOREIGN PATENT DOCUMENTS

| JP | 11105515 A | 4/1999 |
| JP | 2001041291 A | 2/2001 |

(Continued)

OTHER PUBLICATIONS

International Search Report and Written Opinion for Application No. PCT/US2012/055403 dated Feb. 26, 2013.

*Primary Examiner* — David B Thomas
(74) *Attorney, Agent, or Firm* — Honigman Miller Schwartz and Cohn LLP

(57) ABSTRACT

An apparatus for processing a tire and a wheel for forming a tire-wheel assembly is disclosed. The apparatus includes at least one linear mounter sub-station that couples the tire with the wheel for forming the tire-wheel assembly. The apparatus also includes a transporting device that transports one of the wheel and the tire along a linear path that traverses the at least one linear mounter sub-station. The component of the at least one linear mounter sub-station resists, but does not prevent, movement of one of the tire and the wheel relative the other of the tire and the wheel along the linear path in order to spatially manipulate one of the tire and the wheel relative the other of the tire and the wheel in order to at least partially couple the tire with the wheel for forming the tire-wheel assembly. A method is also disclosed.

18 Claims, 34 Drawing Sheets

(56) References Cited

U.S. PATENT DOCUMENTS

| | | | |
|---|---|---|---|
| 2,900,018 A | 8/1959 | Harrison | |
| 2,907,379 A | 10/1959 | Tuttle | |
| 3,545,463 A * | 12/1970 | Mueller | 157/1.24 |
| 4,420,026 A * | 12/1983 | Goiseau | 157/1.24 |
| 4,621,671 A | 11/1986 | Kane et al. | |
| 4,830,079 A | 5/1989 | Onuma | |
| 4,834,159 A | 5/1989 | Burger | |
| 4,858,667 A | 8/1989 | Igari et al. | |
| 5,094,284 A * | 3/1992 | Curcuri | 157/1.17 |
| 5,170,828 A | 12/1992 | Curcuri | |
| 6,125,904 A | 10/2000 | Kane et al. | |
| 7,069,644 B2 * | 7/2006 | Pellerin et al. | 29/802 |
| 7,143,890 B2 * | 12/2006 | Pellerin et al. | 198/373 |
| 7,584,775 B2 | 9/2009 | Nomura | |
| 7,664,576 B2 | 2/2010 | Ichinose et al. | |
| 7,699,087 B2 * | 4/2010 | Rogalla et al. | 157/1.1 |
| 8,191,600 B2 * | 6/2012 | Lawson et al. | 157/1.1 |
| 8,567,453 B2 * | 10/2013 | Donnay et al. | 141/38 |
| 2013/0168028 A1 * | 7/2013 | Lawson et al. | 157/1.1 |
| 2013/0168029 A1 * | 7/2013 | Lawson et al. | 157/1.17 |

FOREIGN PATENT DOCUMENTS

| | | |
|---|---|---|
| JP | 2002087033 A | 3/2002 |
| JP | 2011011702 | 1/2011 |
| KR | 101997000197 | 2/1997 |
| WO | WO-2004071791 A1 | 8/2004 |

* cited by examiner

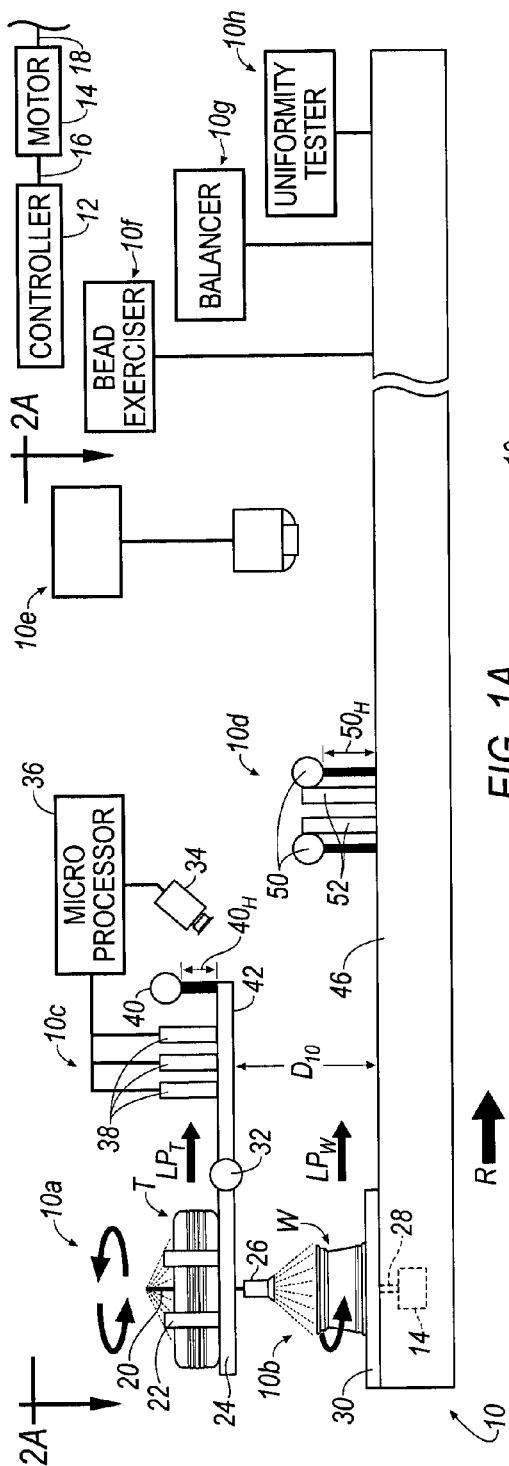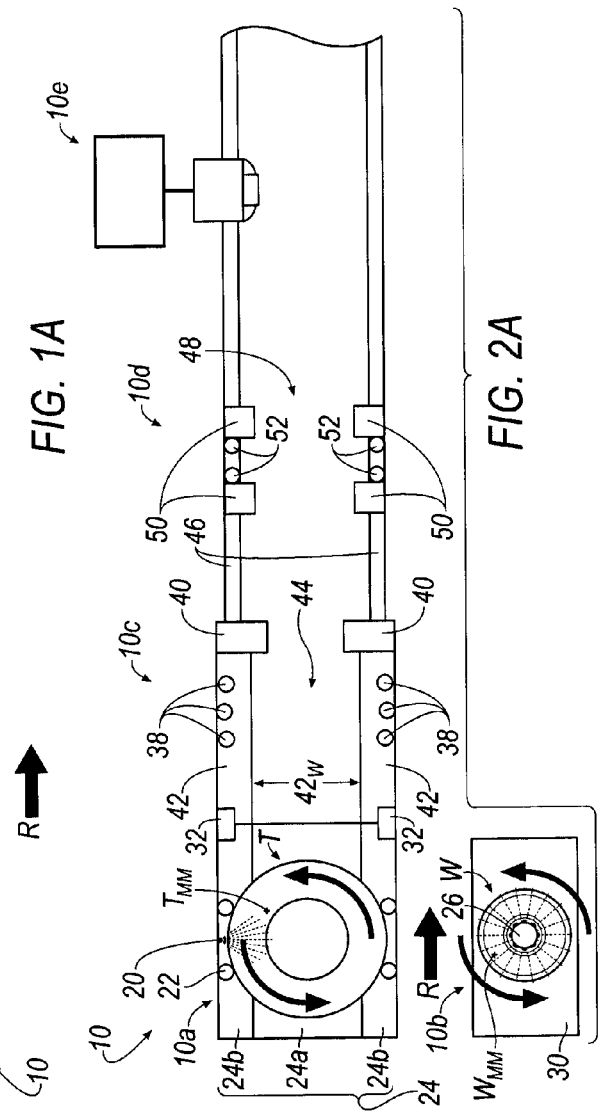
FIG. 1A
FIG. 2A

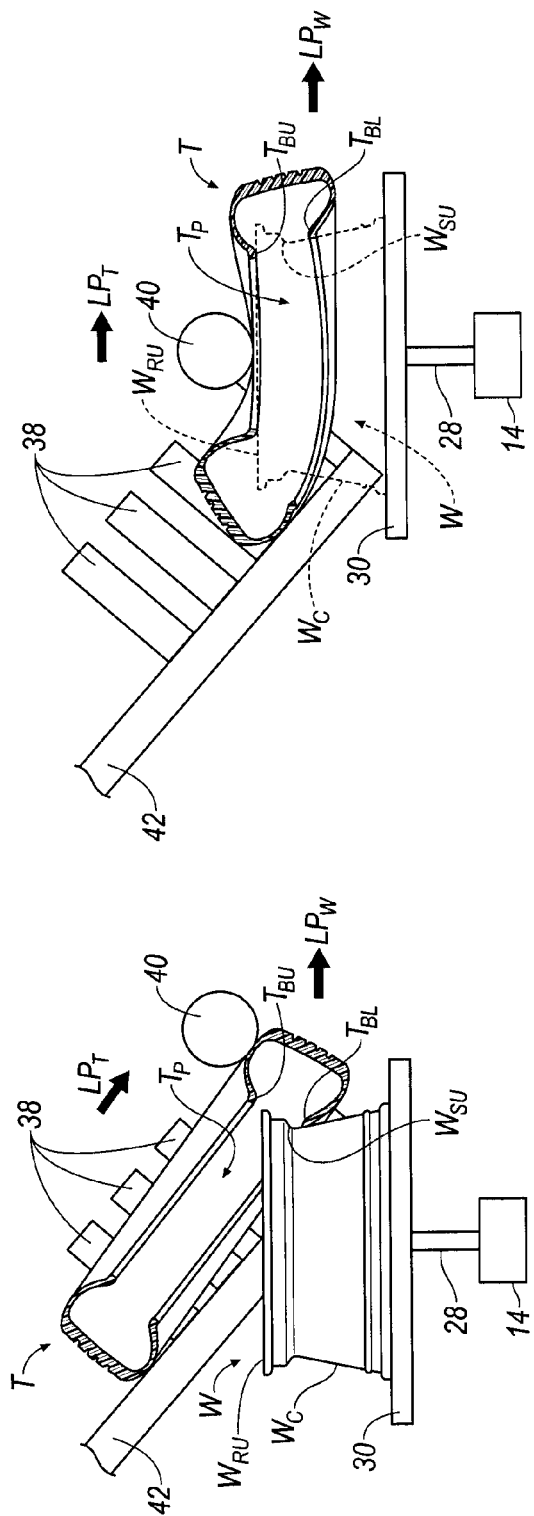
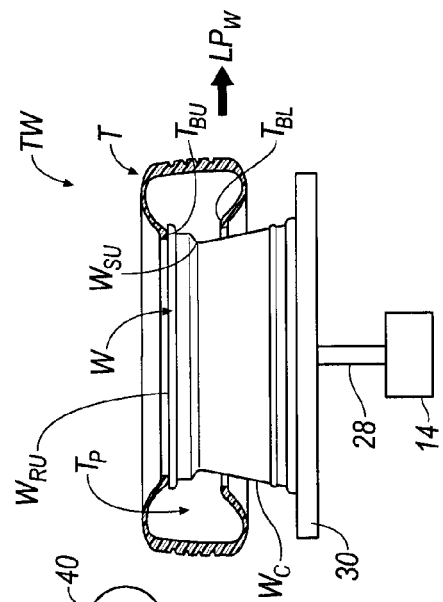

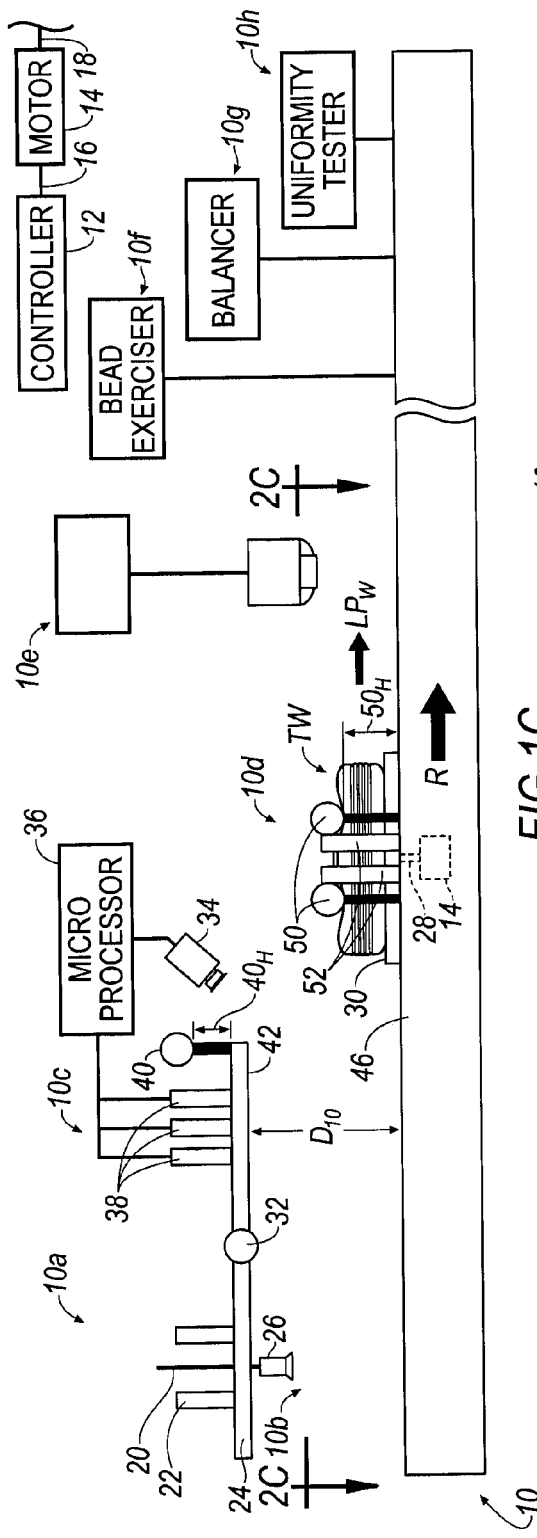
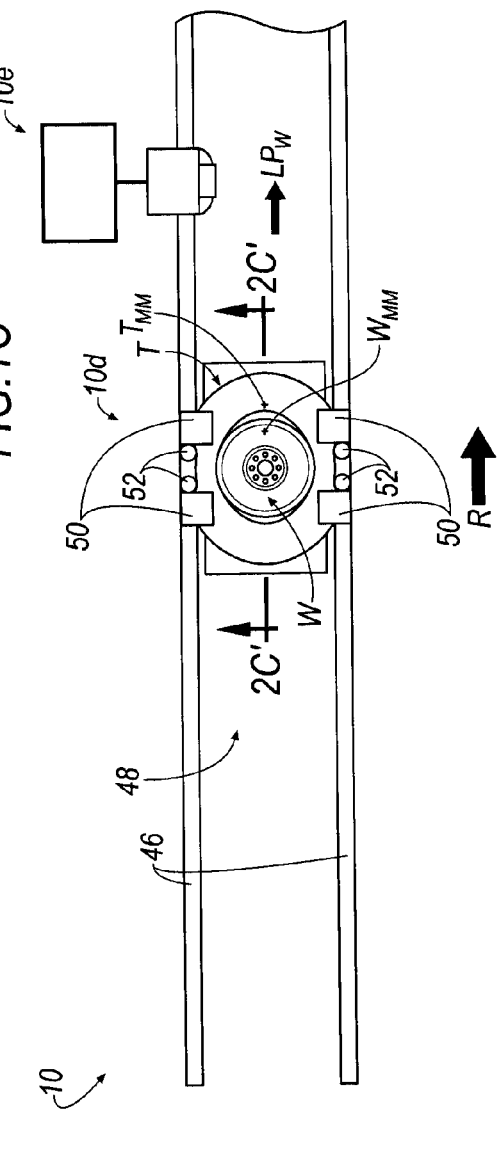
FIG. 1C
FIG. 2C

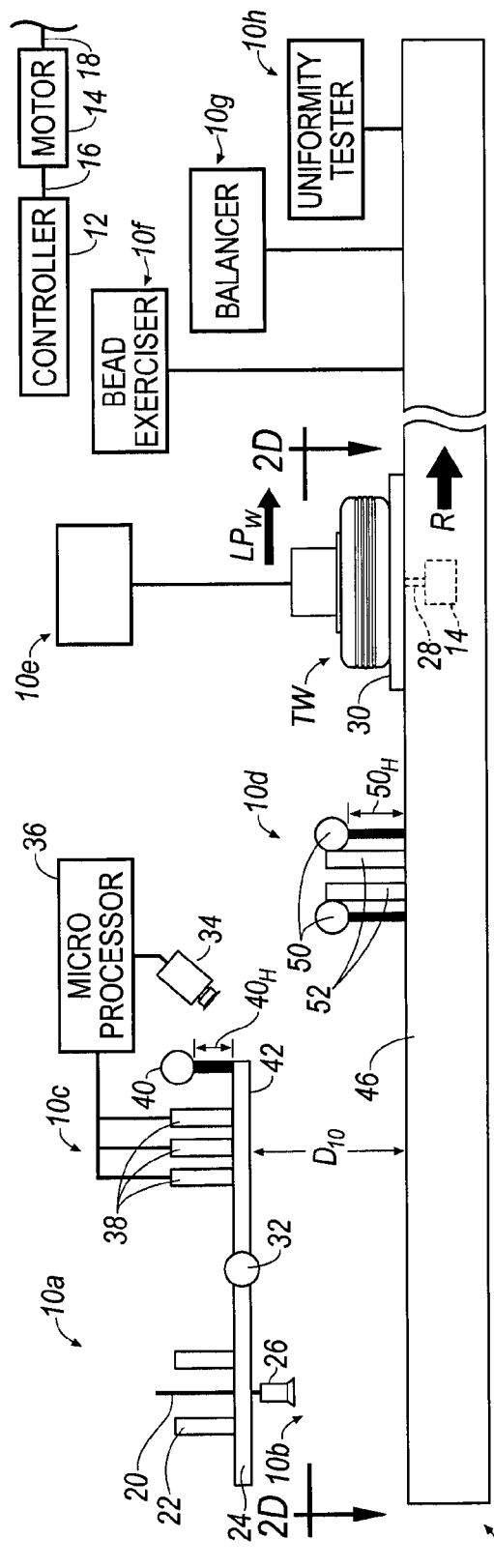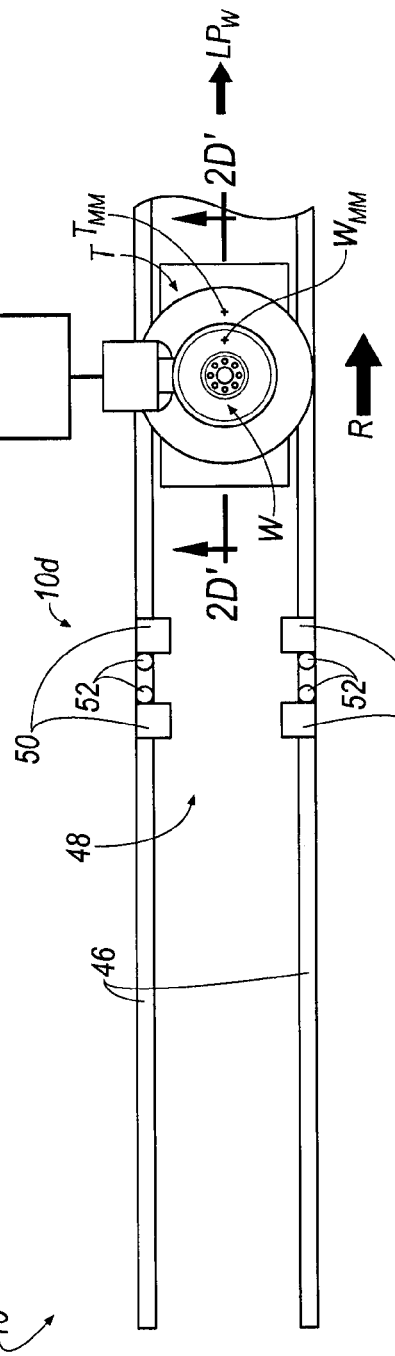
FIG. 1D
FIG. 2D

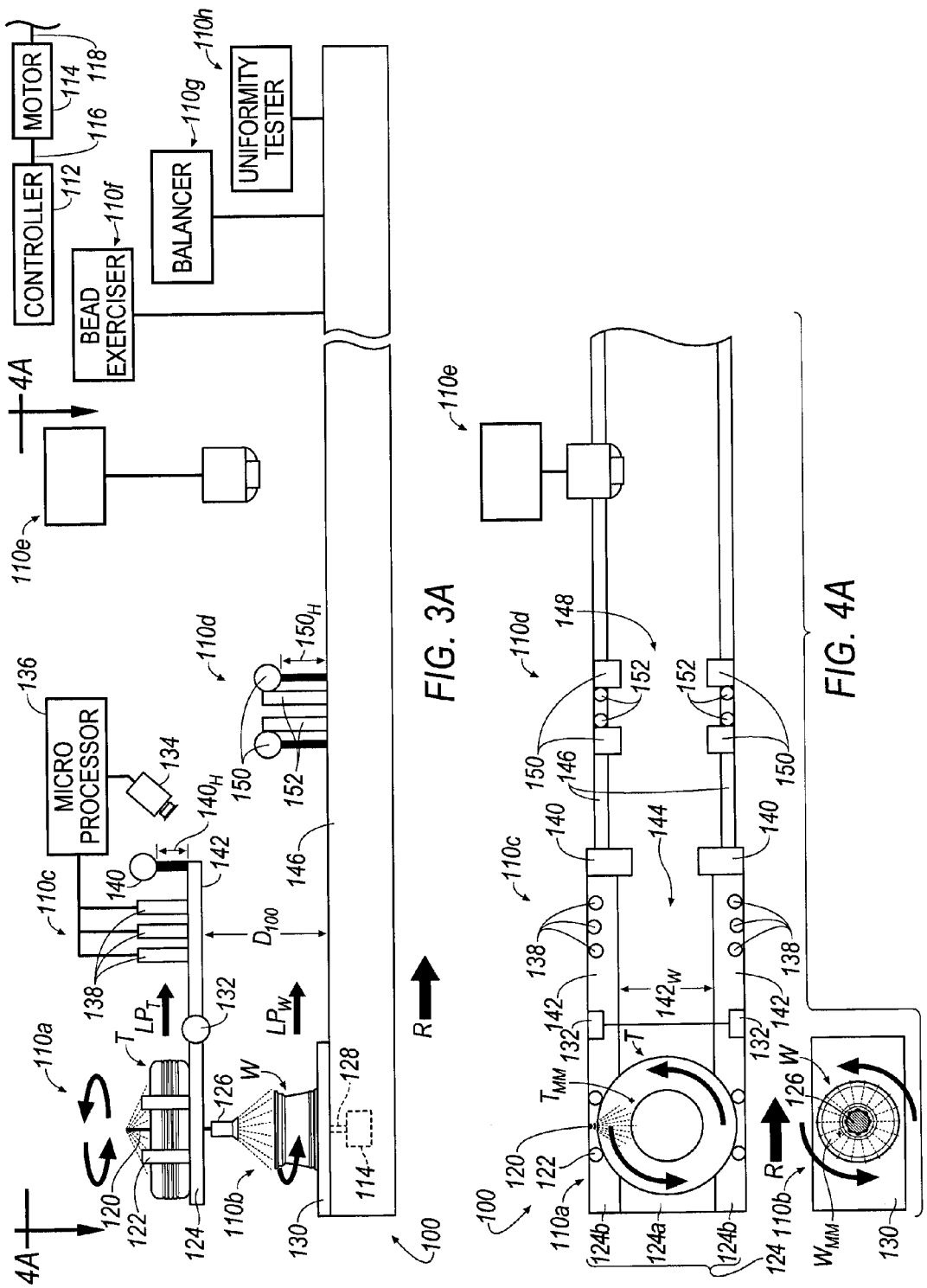

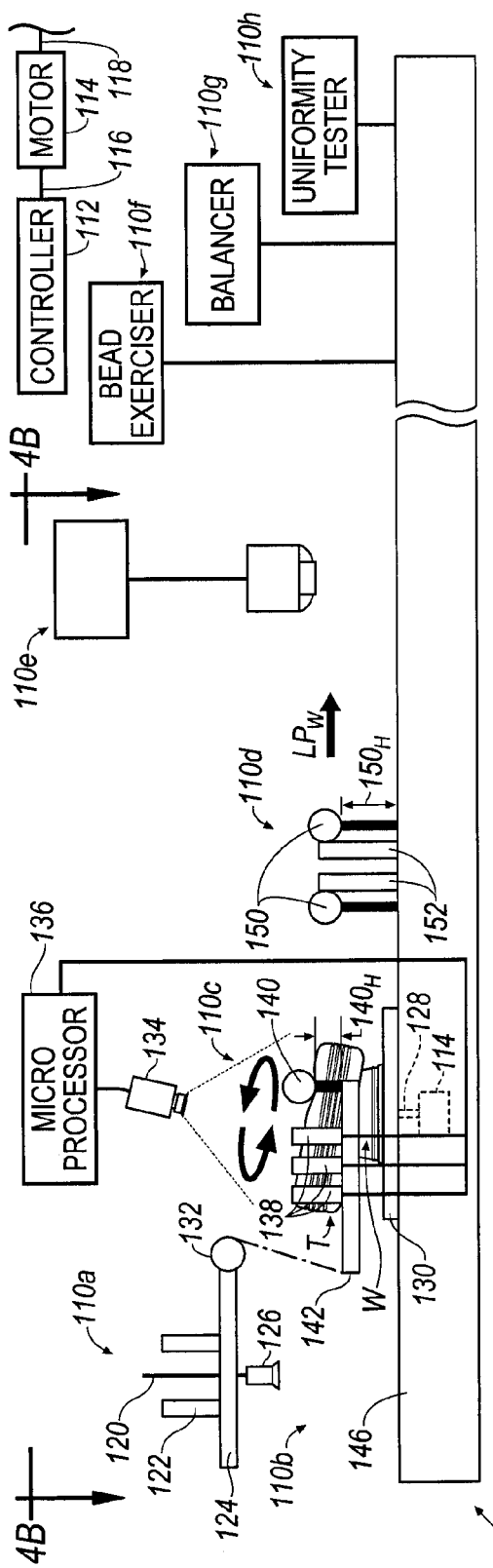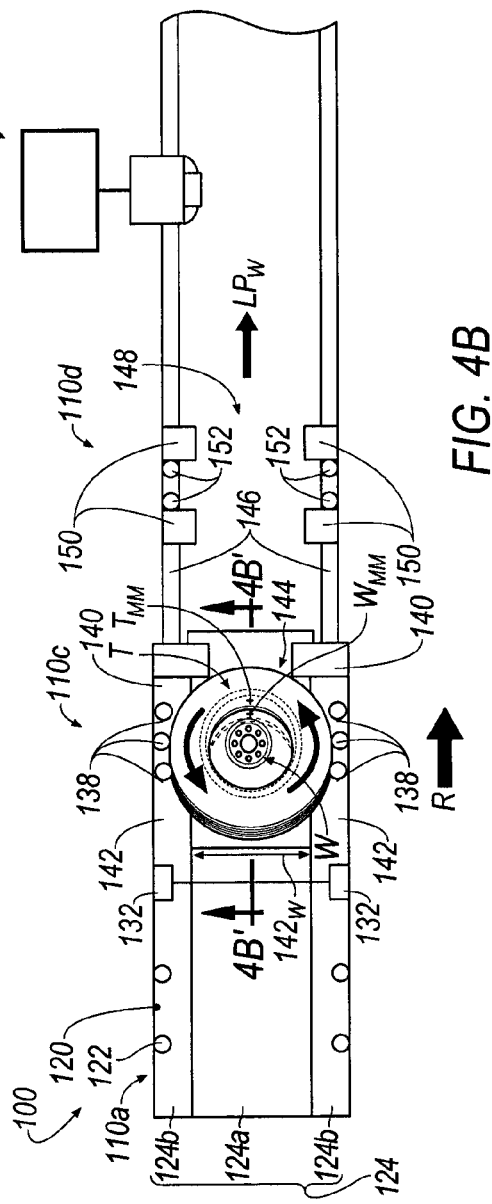
FIG. 3B
FIG. 4B

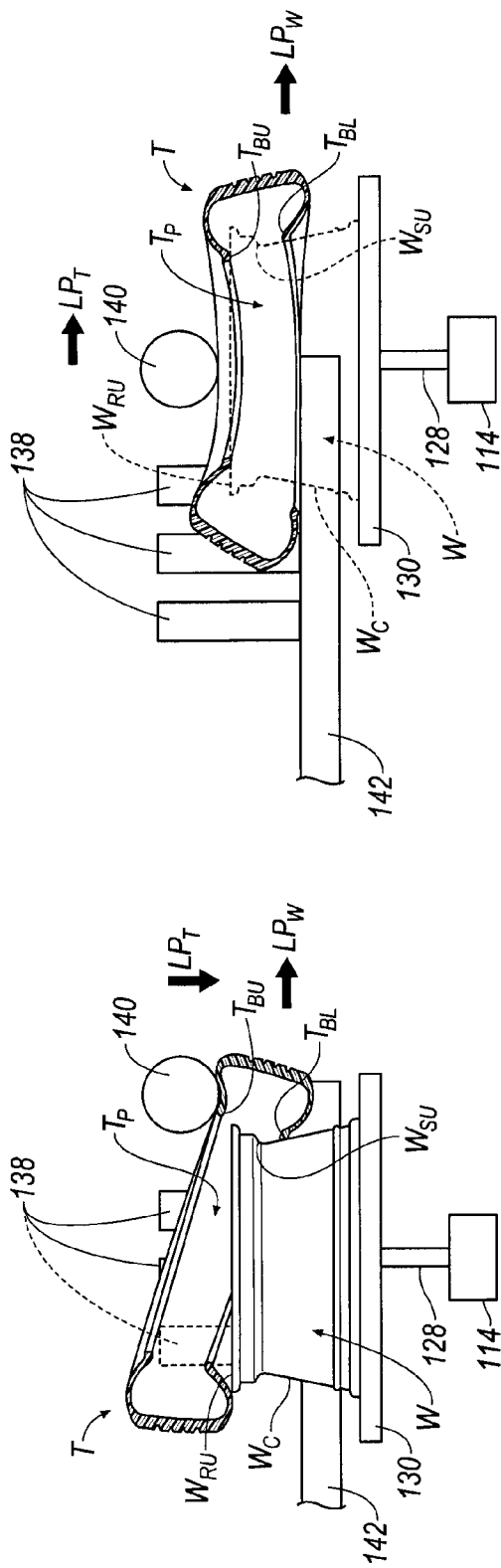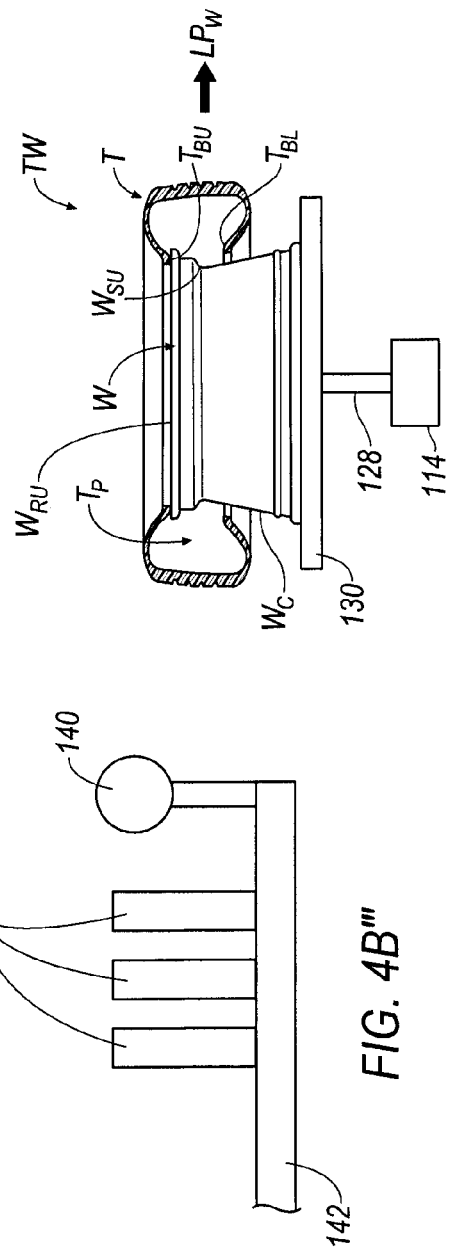

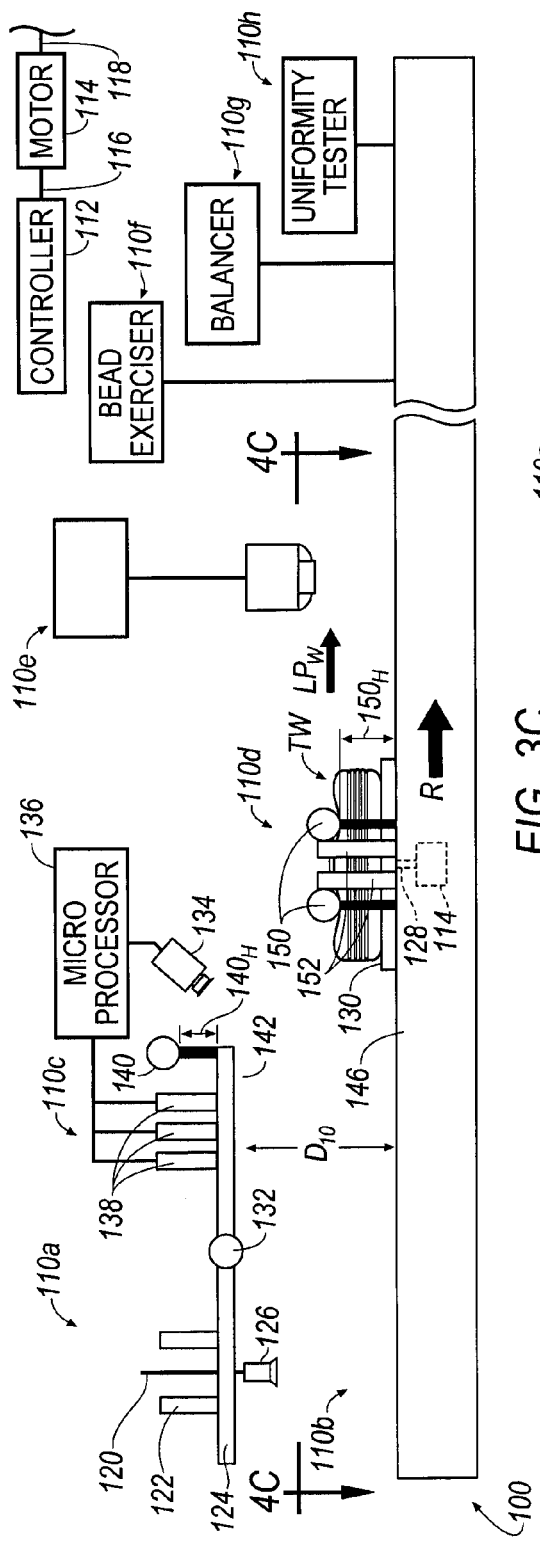
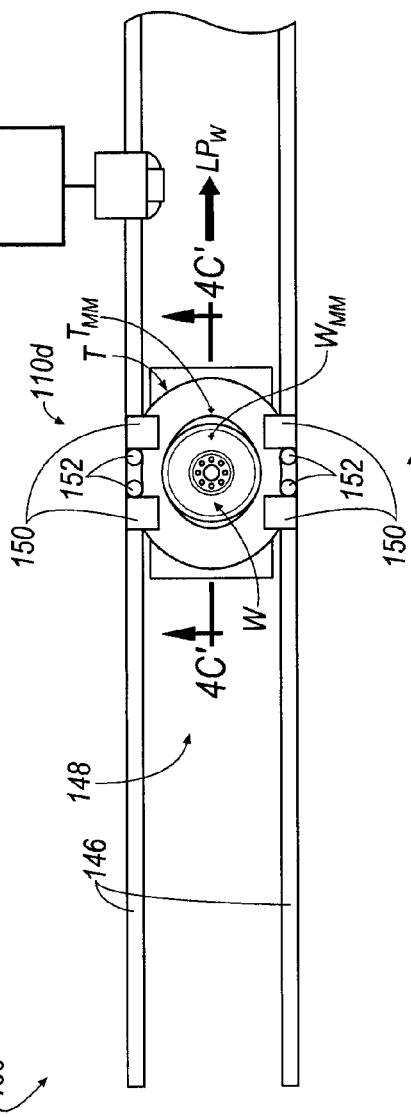
FIG. 3C
FIG. 4C

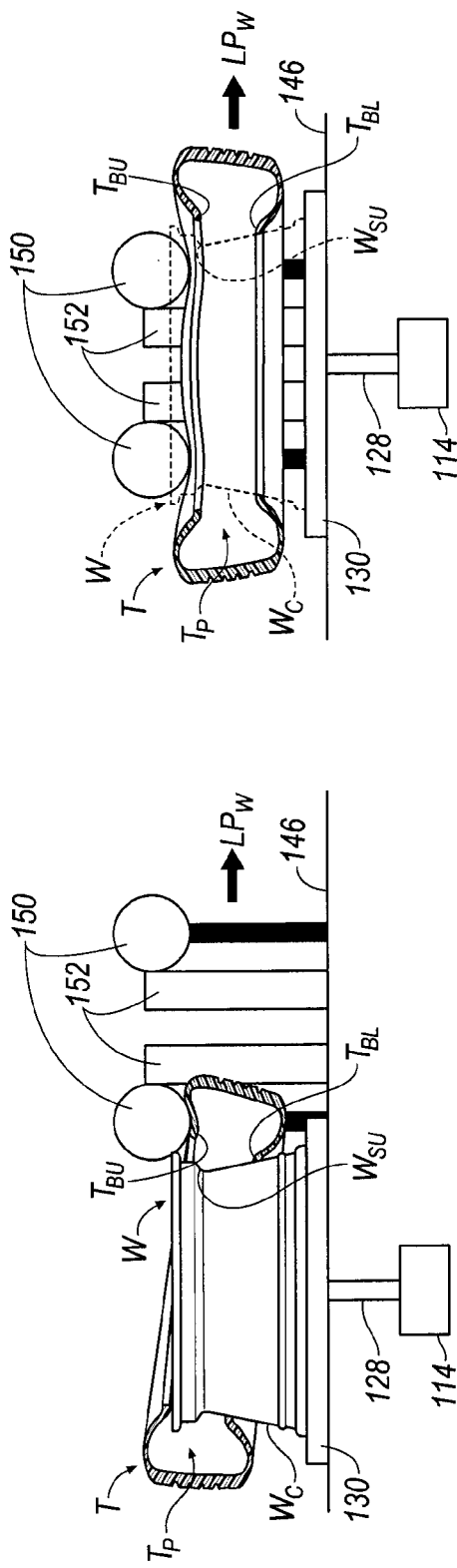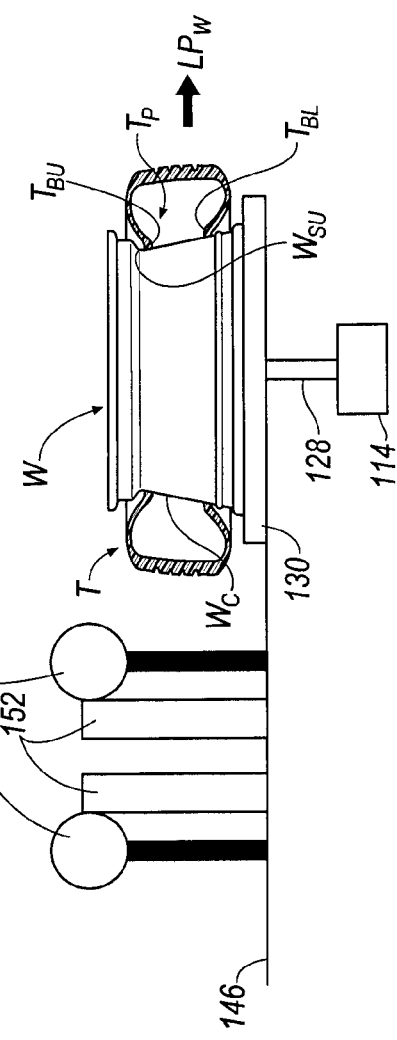
FIG. 4C'
FIG. 4C''
FIG. 4C'''

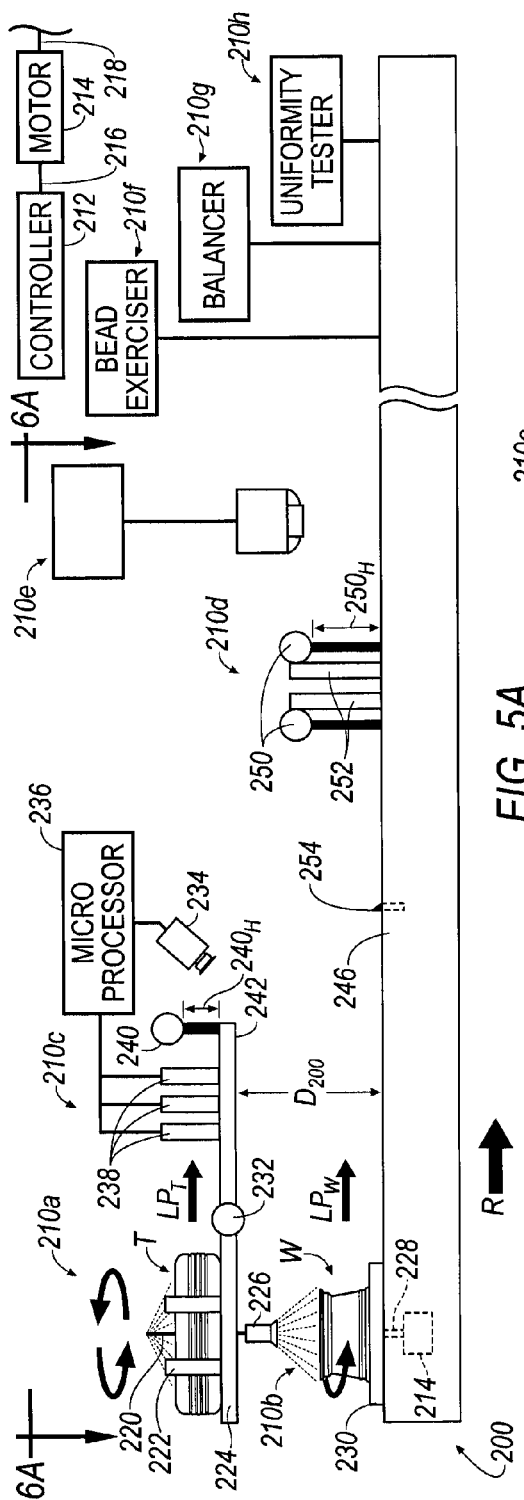
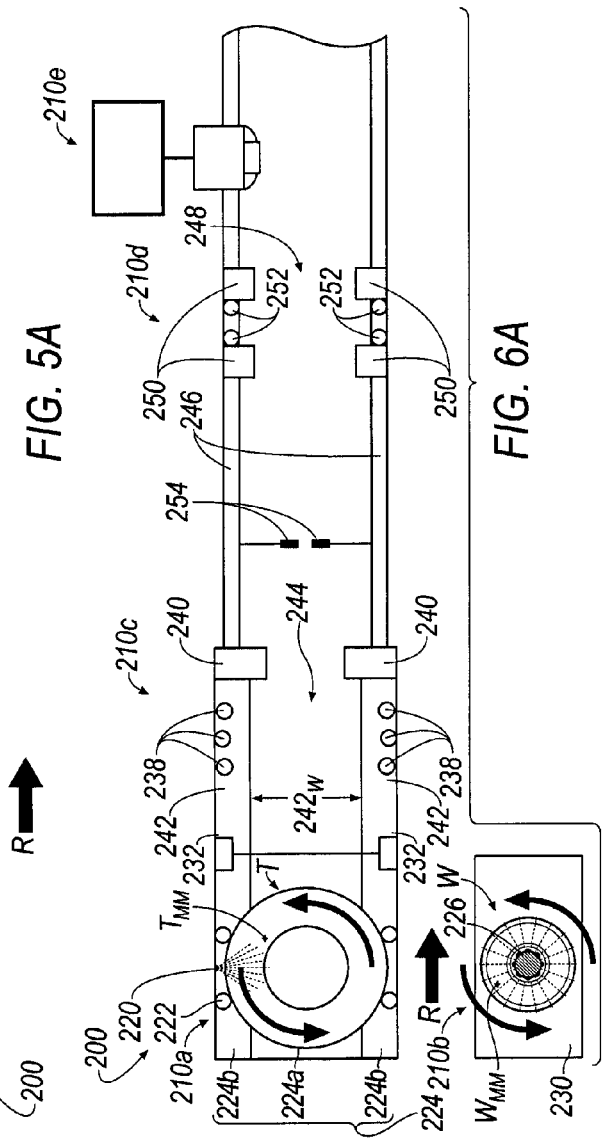
FIG. 5A
FIG. 6A

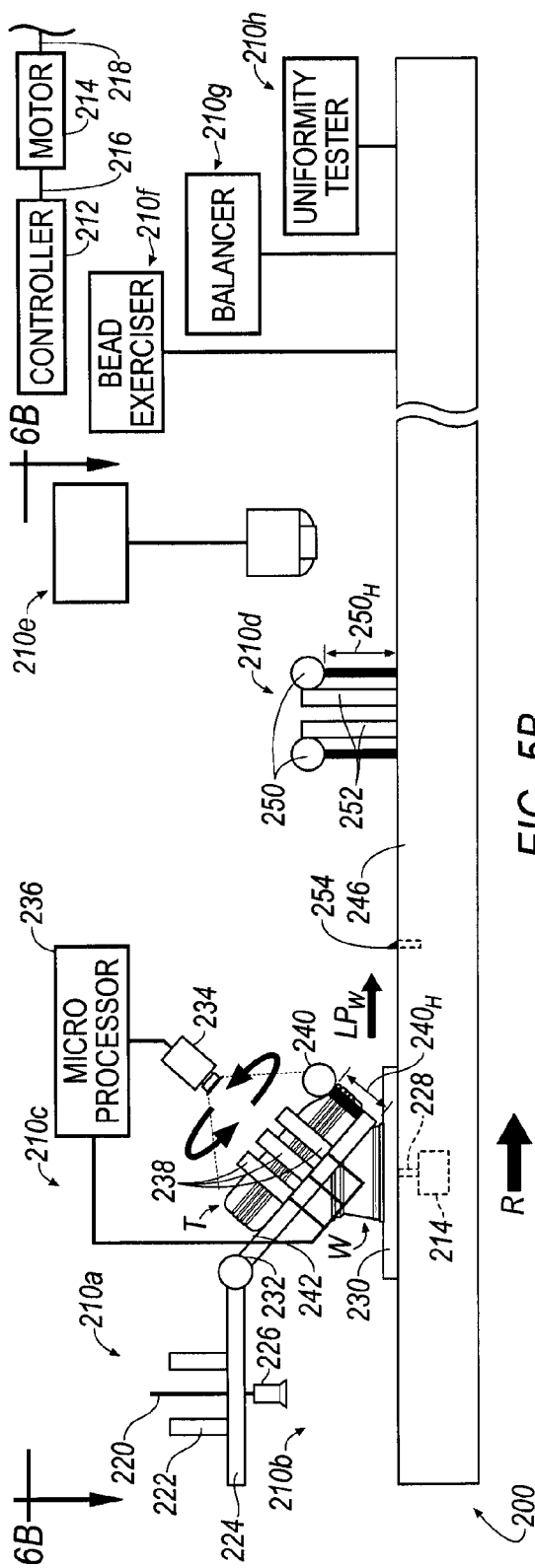
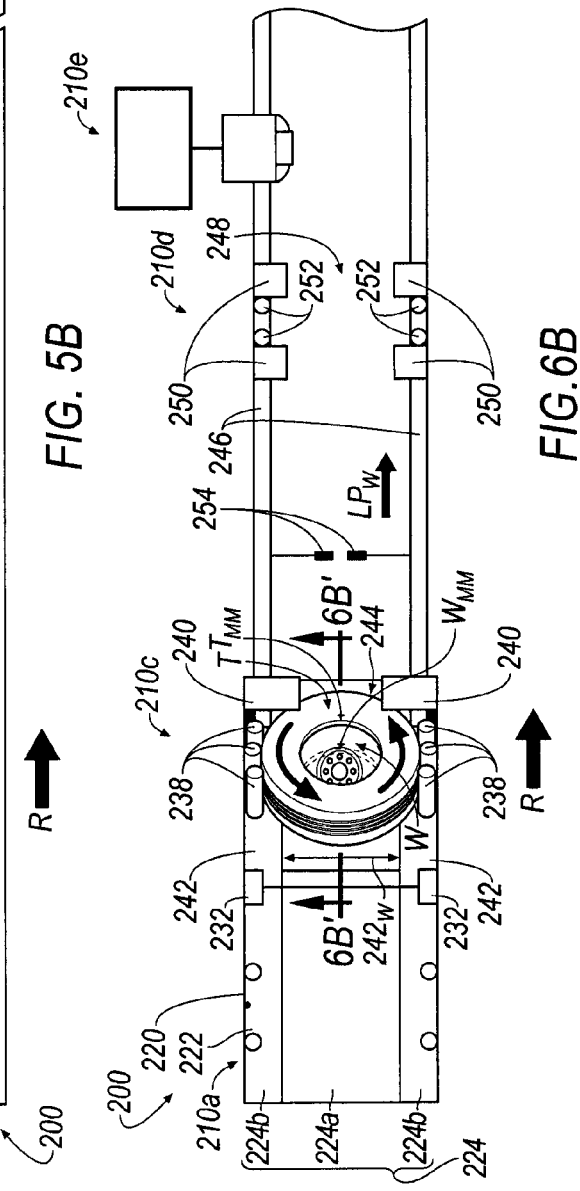
FIG. 5B
FIG. 6B

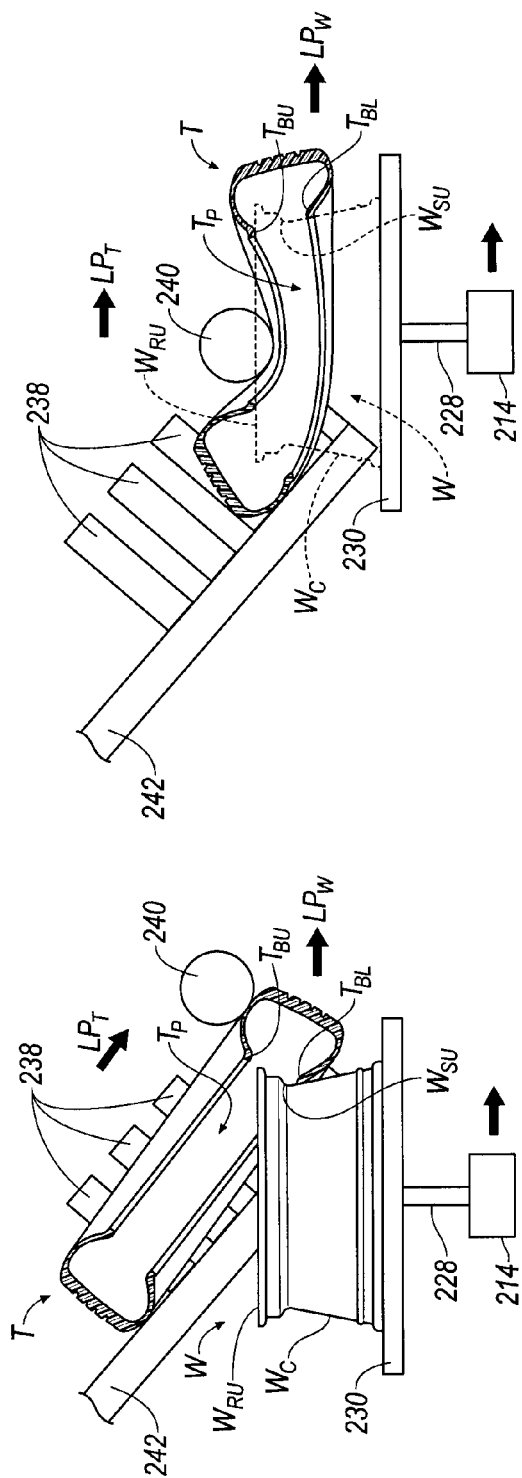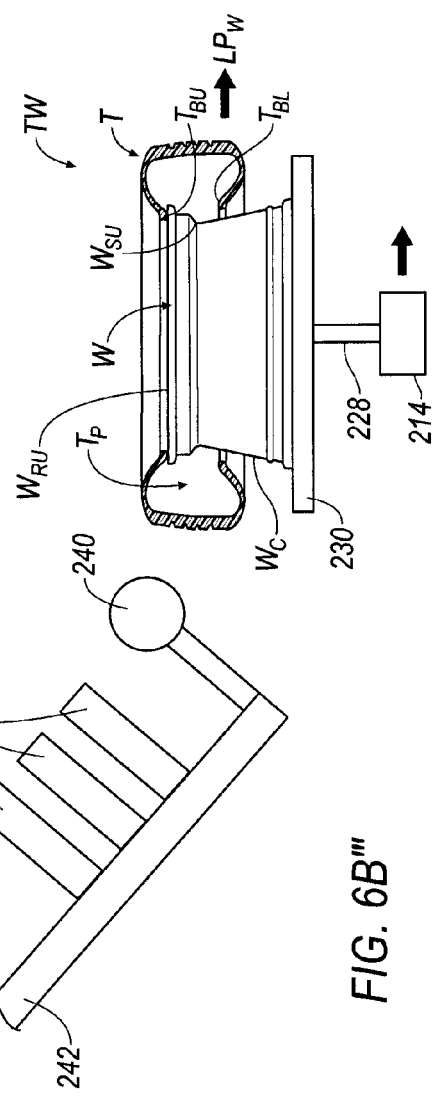
FIG. 6B'
FIG. 6B''
FIG. 6B'''

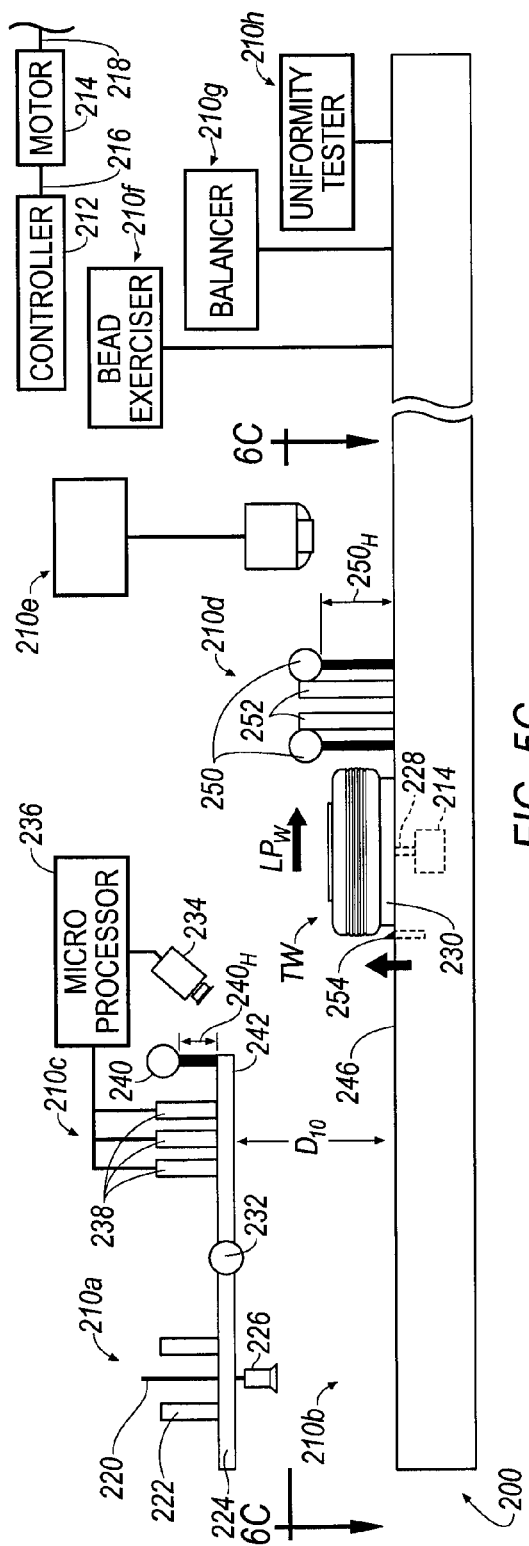
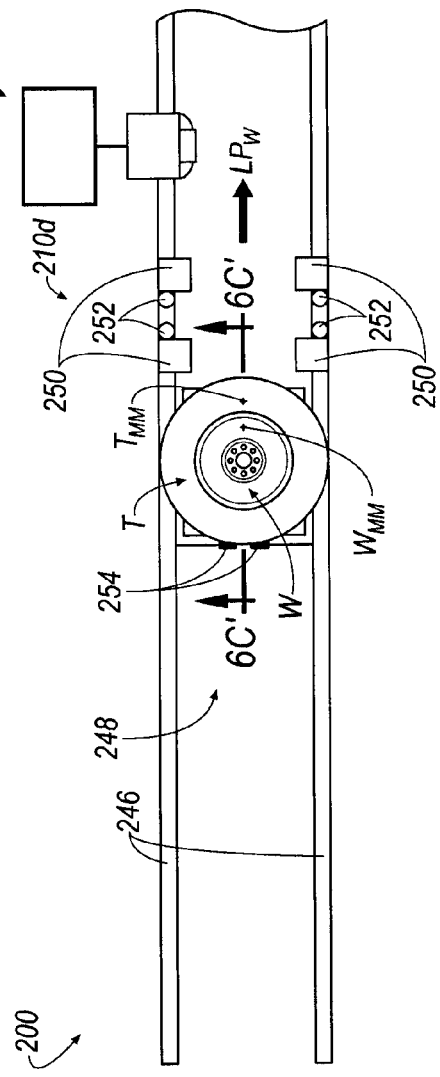
FIG. 5C
FIG. 6C

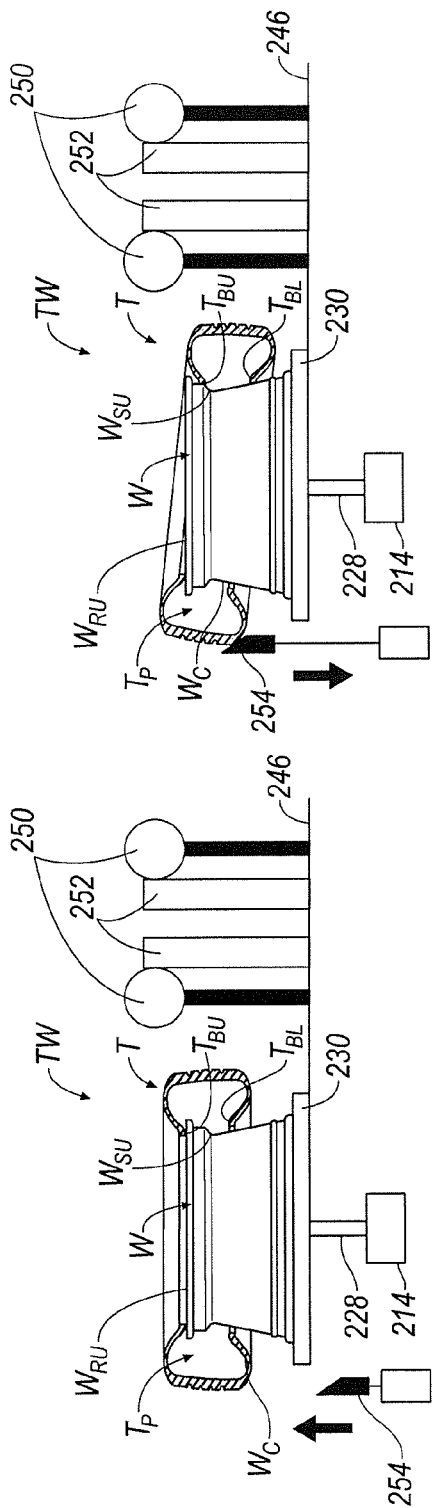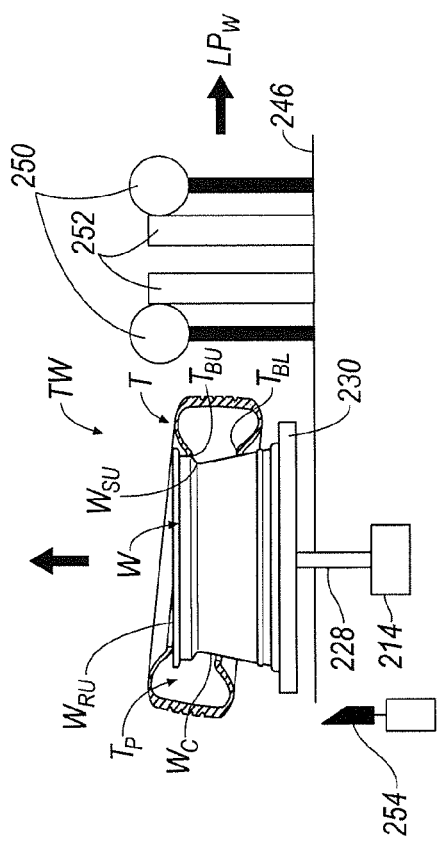
FIG. 6C'
FIG. 6C''
FIG. 6C'''

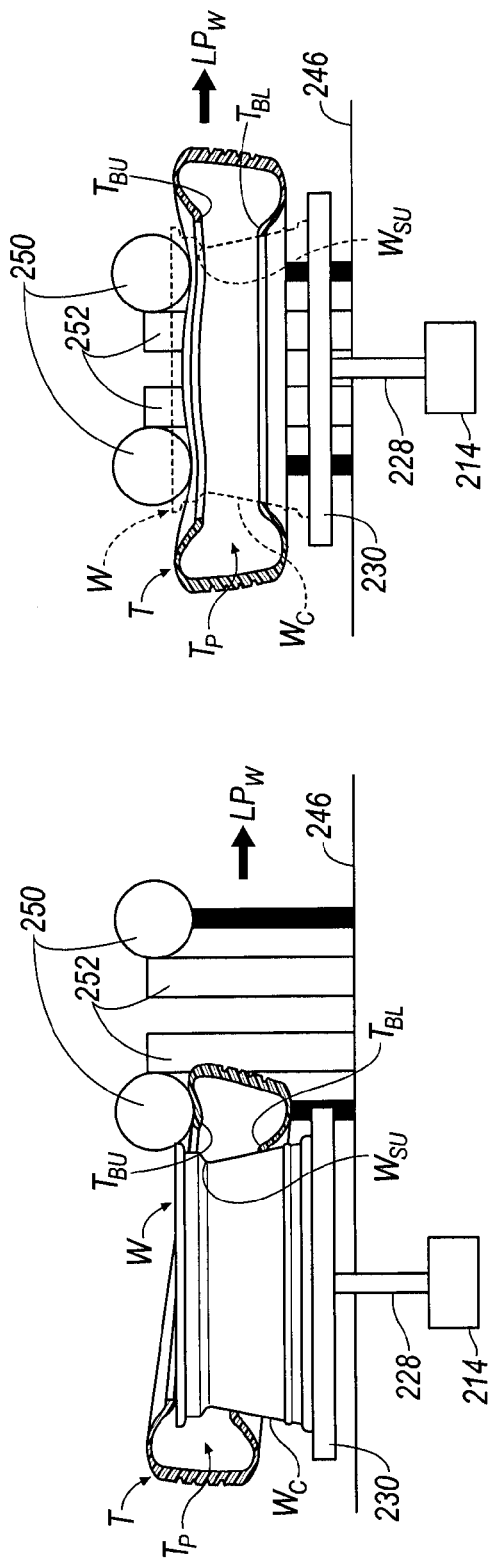
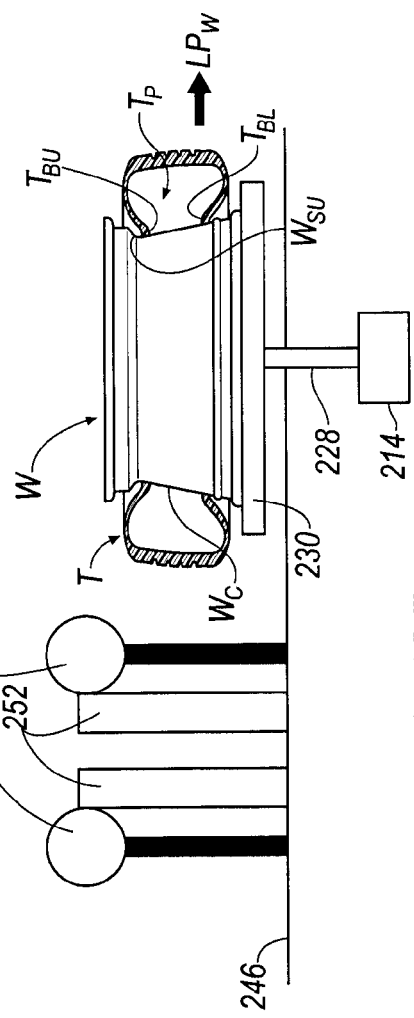
FIG. 6D'
FIG. 6D''
FIG. 6D'''

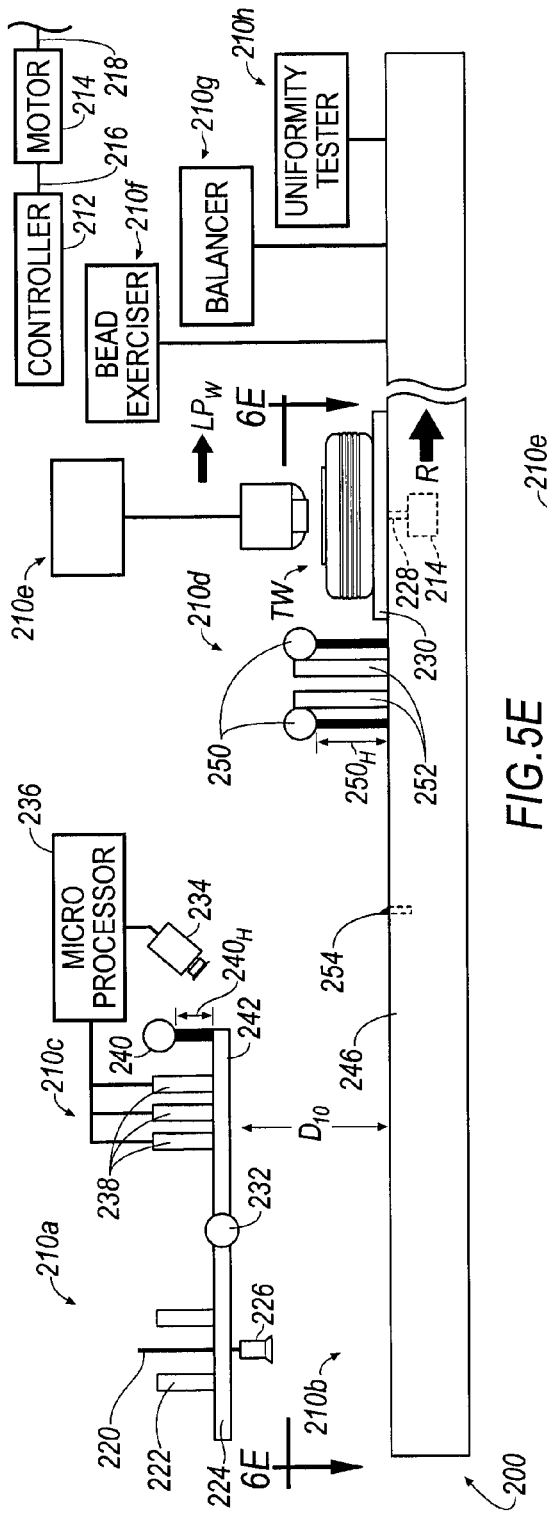
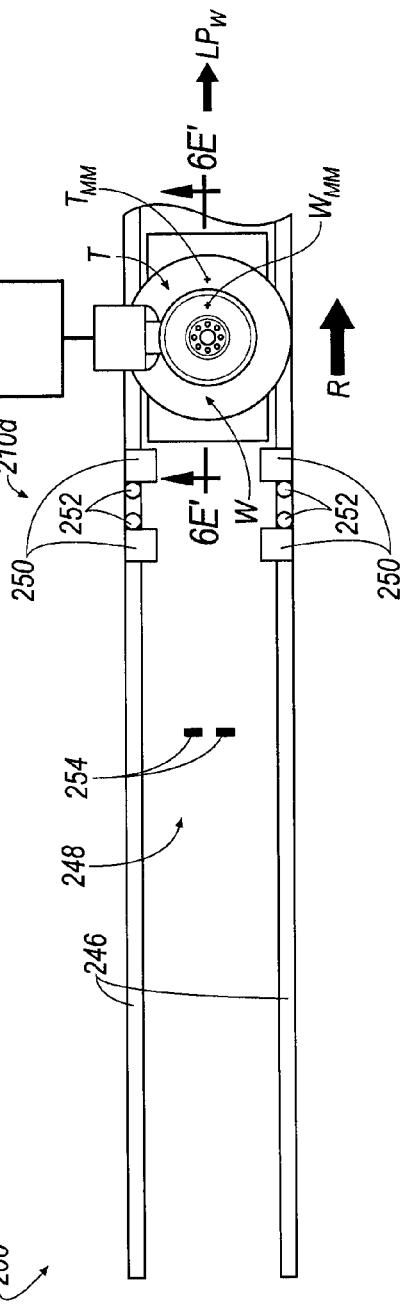
FIG.5E
FIG. 6E

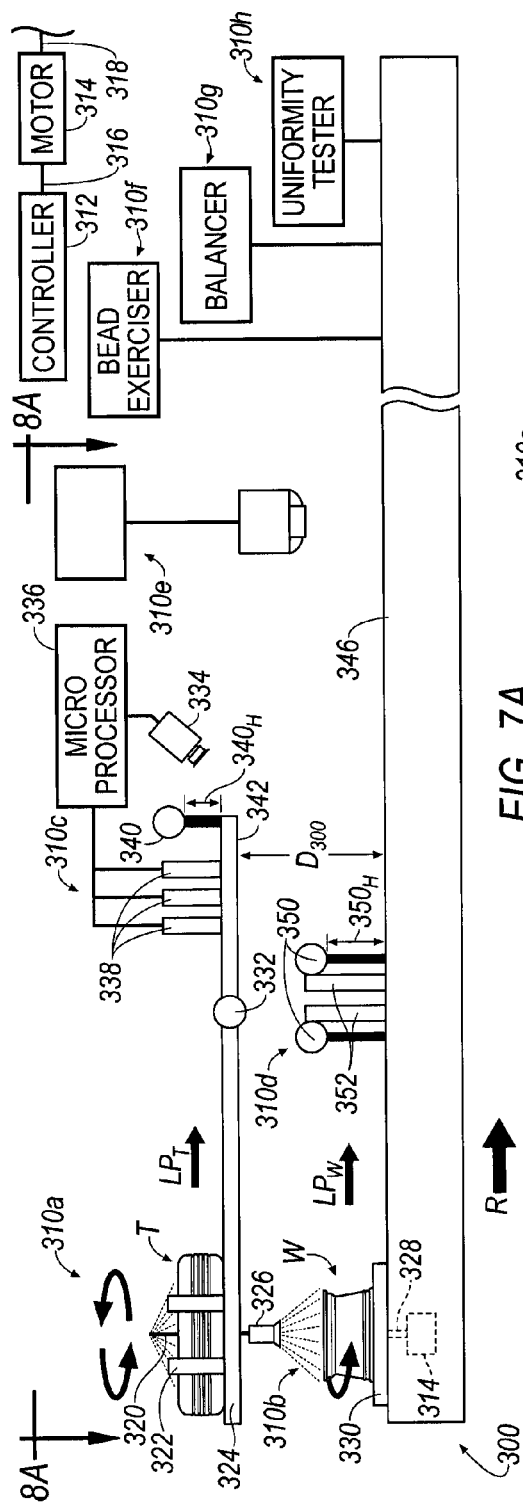
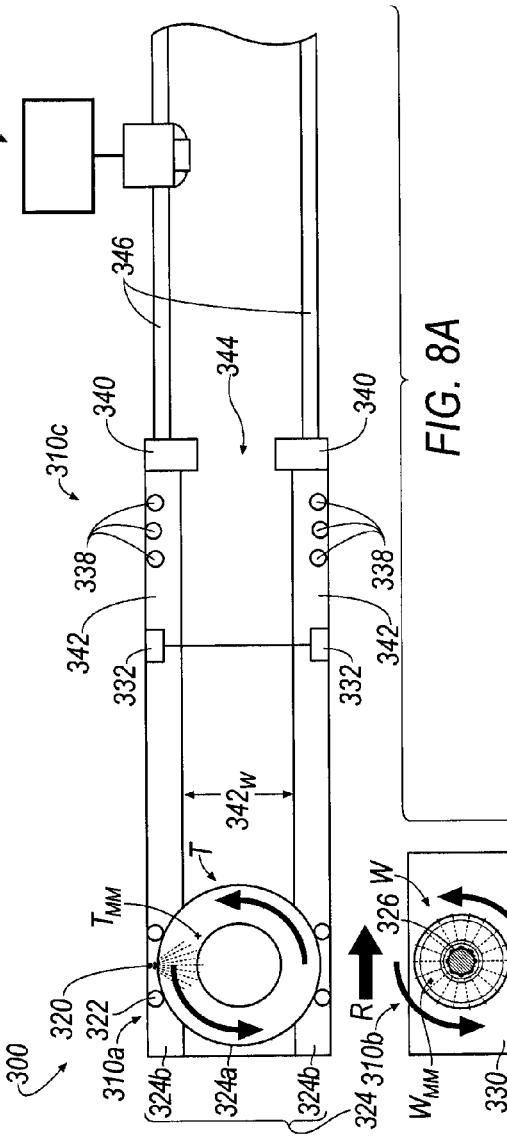
FIG. 7A
FIG. 8A

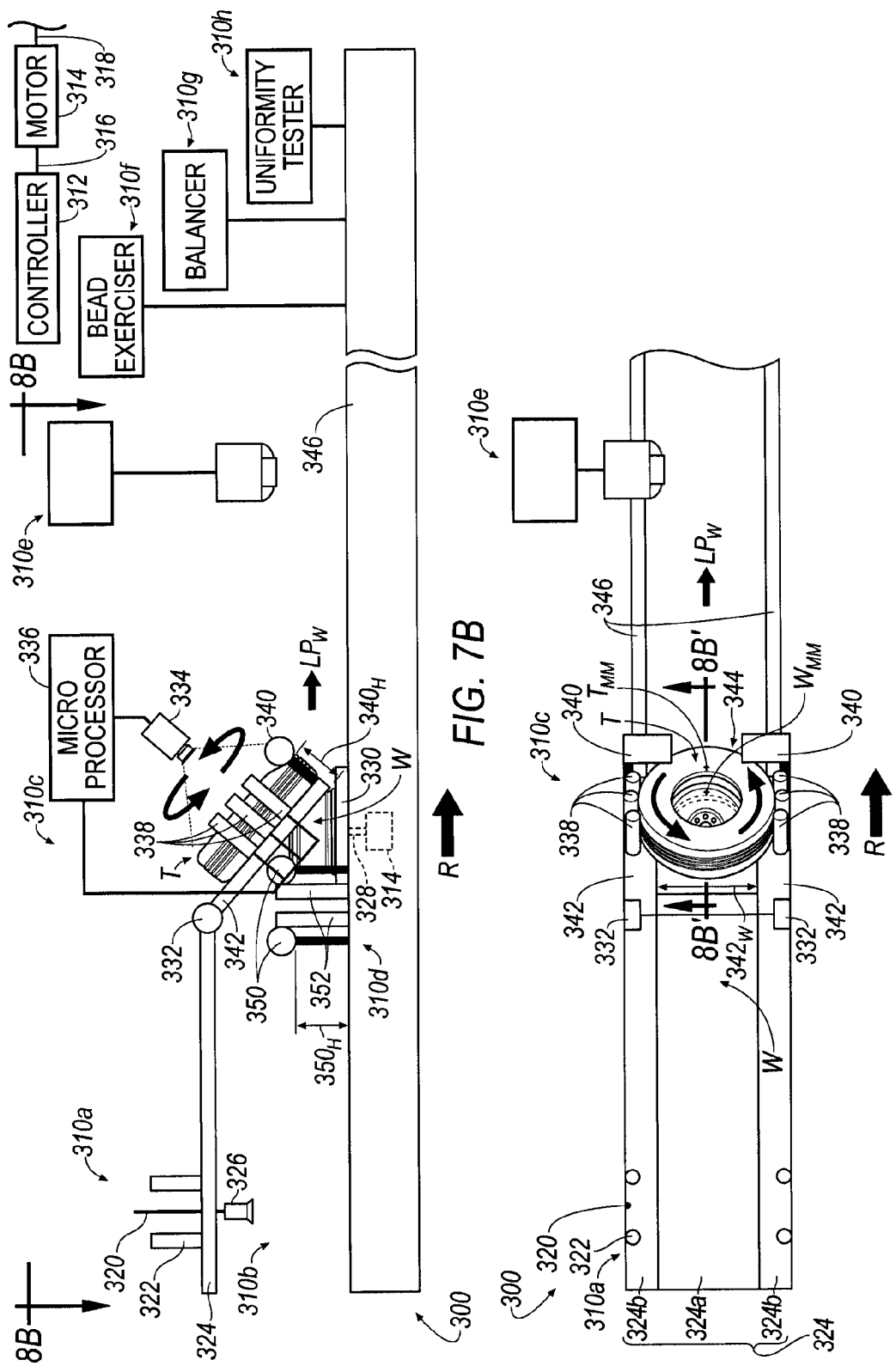

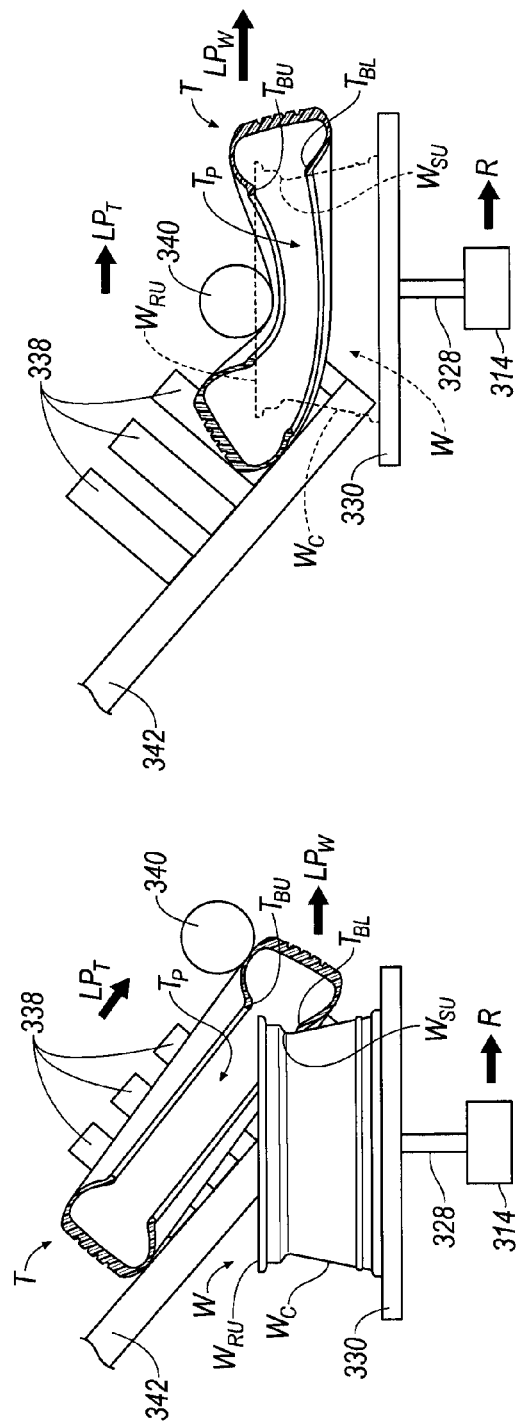
FIG. 8B"
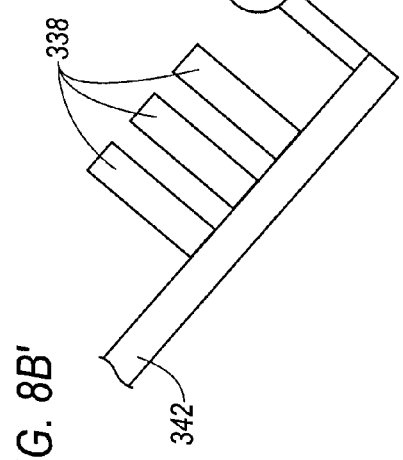
FIG. 8B'
FIG. 8B'''

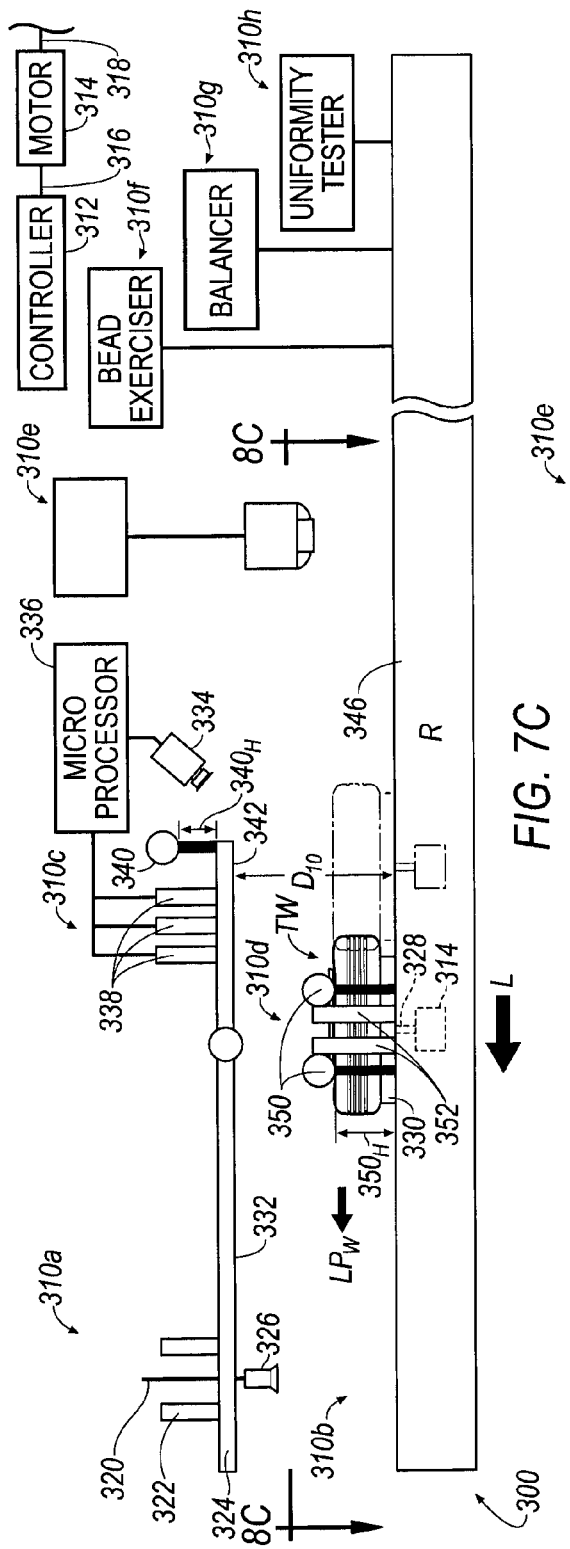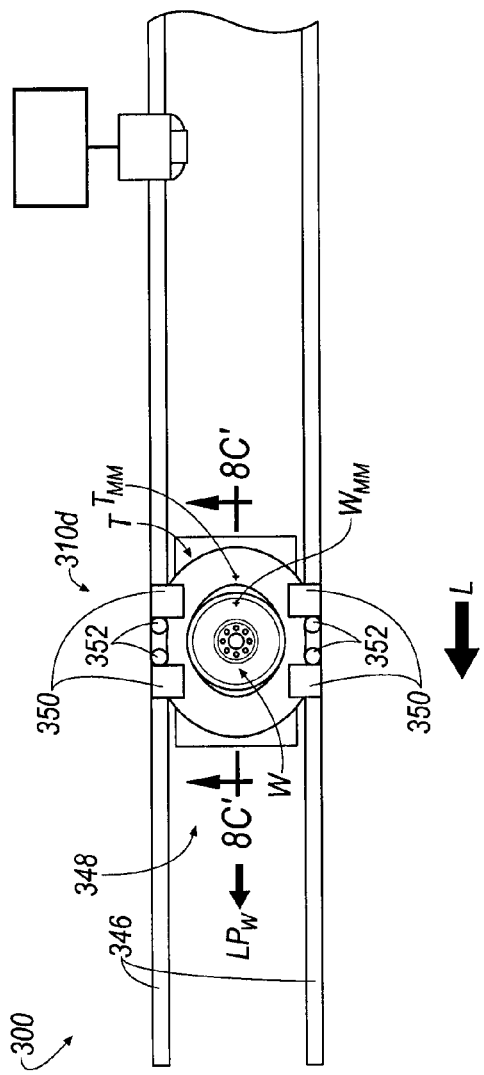
FIG. 7C
FIG. 8C

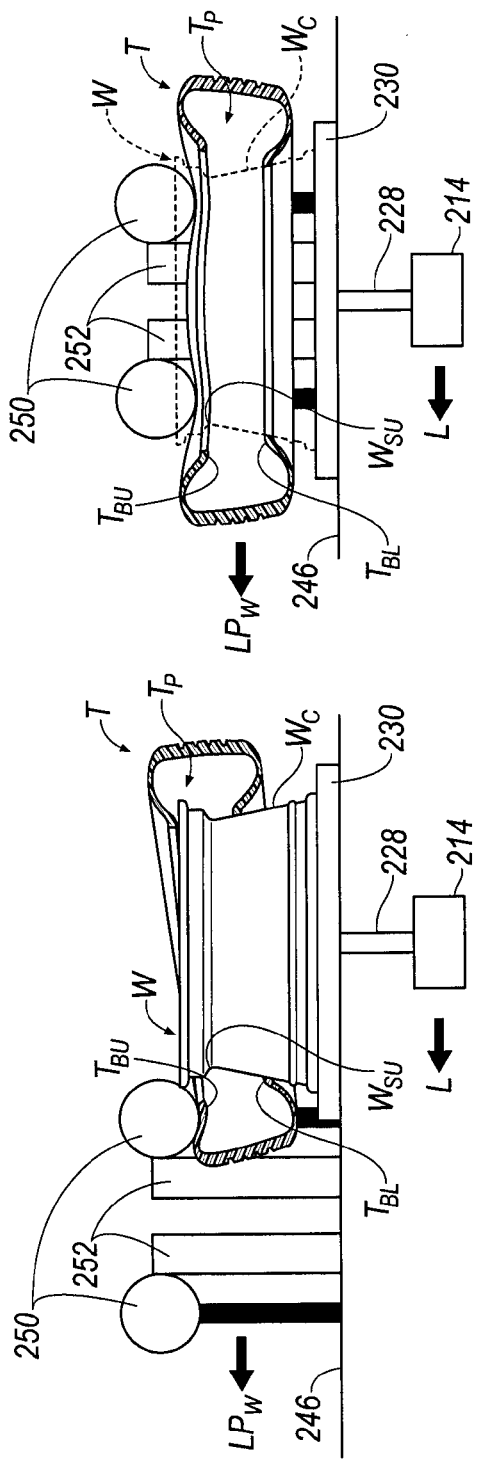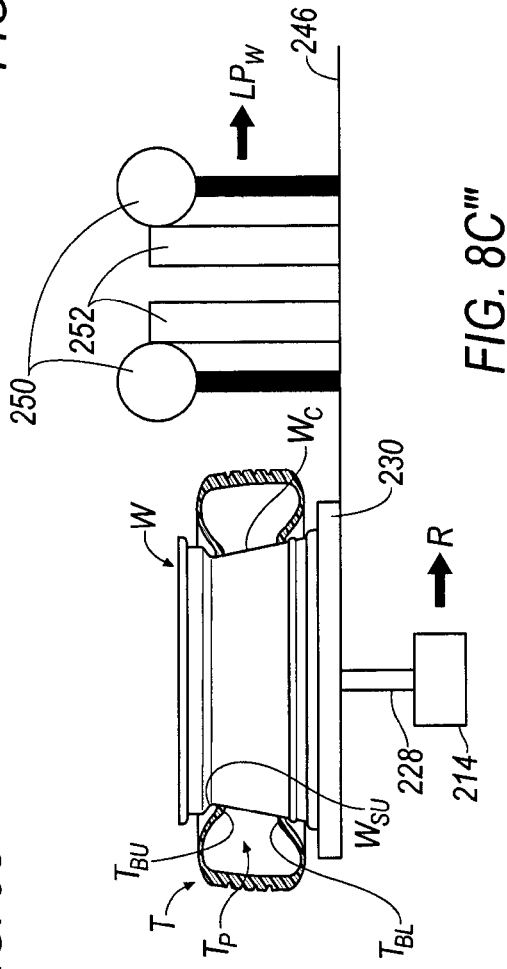

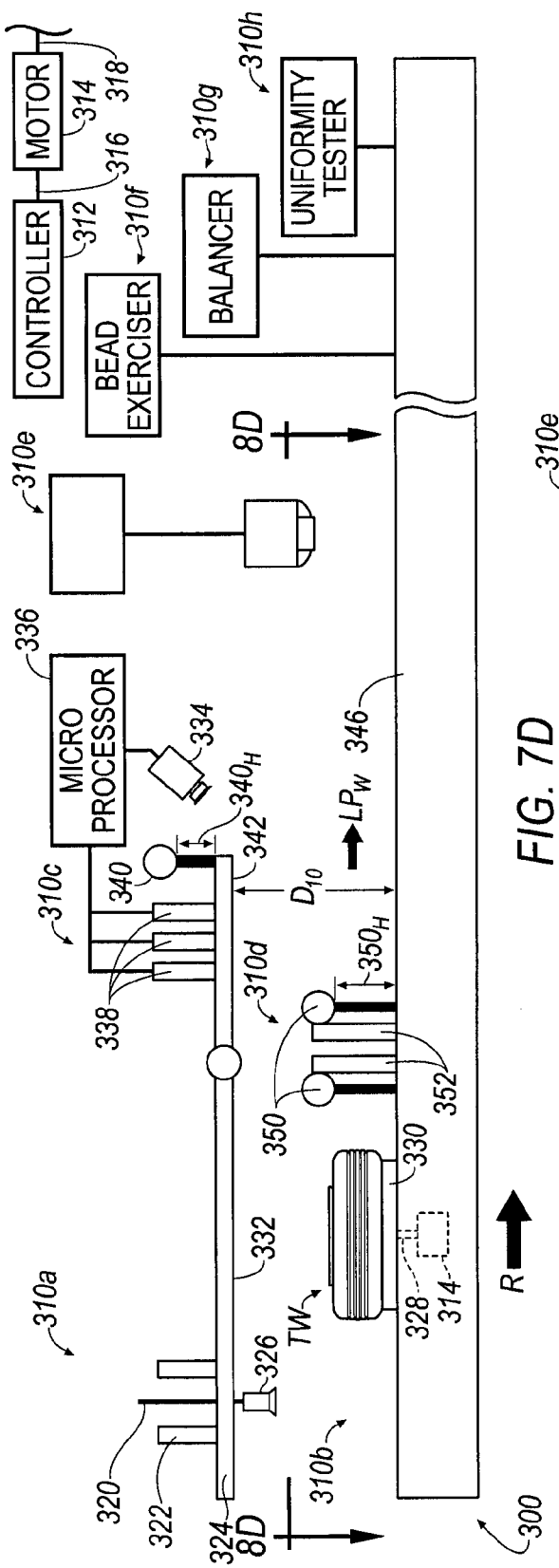
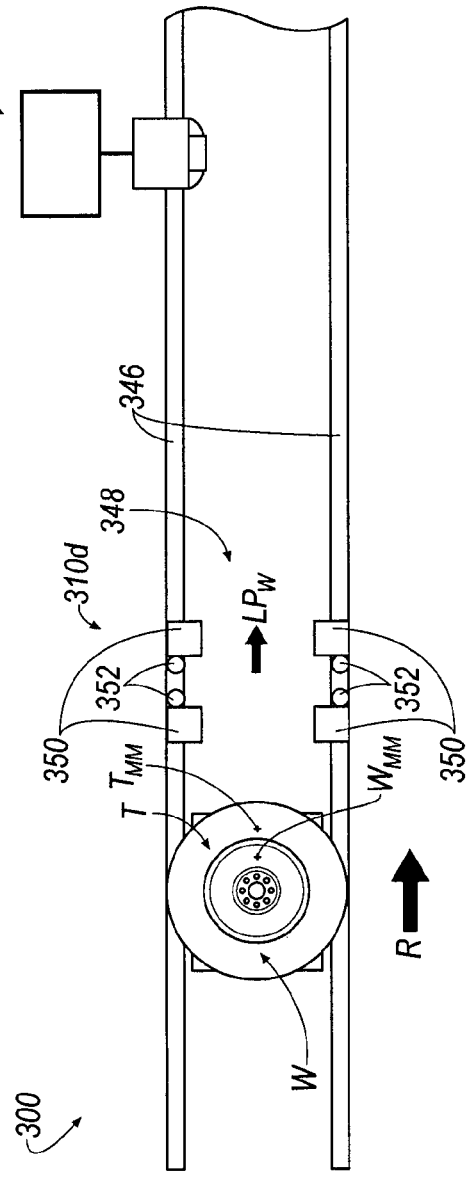
FIG. 7D
FIG. 8D

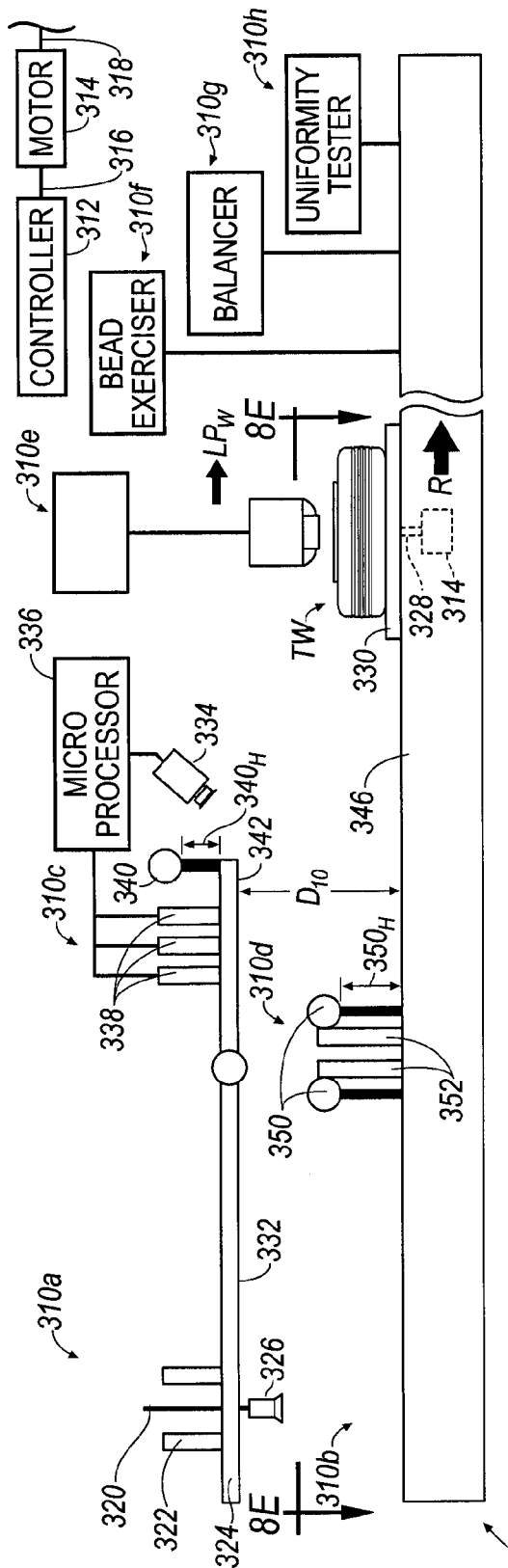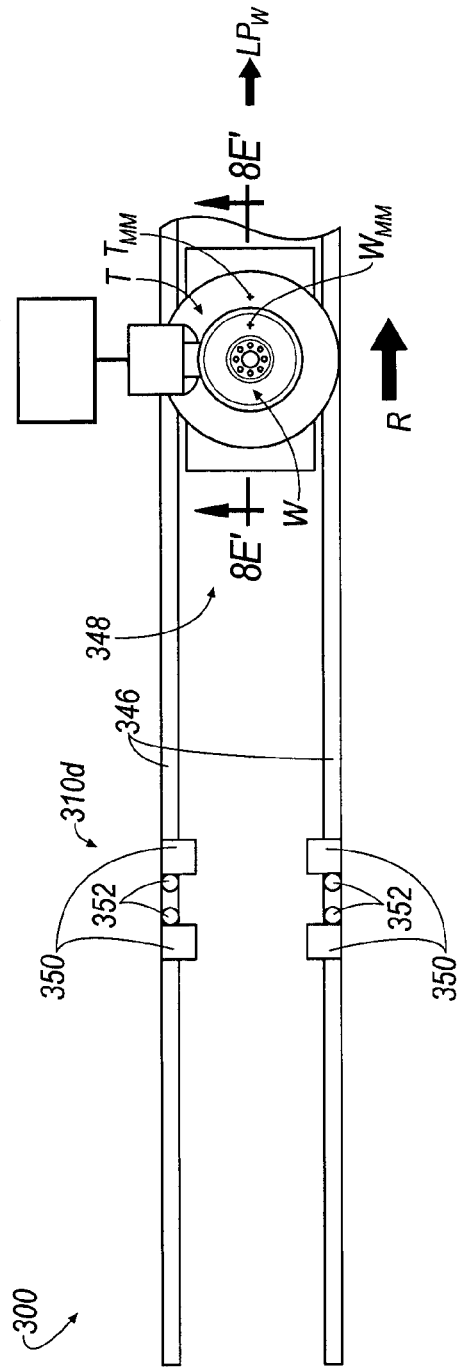
FIG. 7E
FIG. 8E

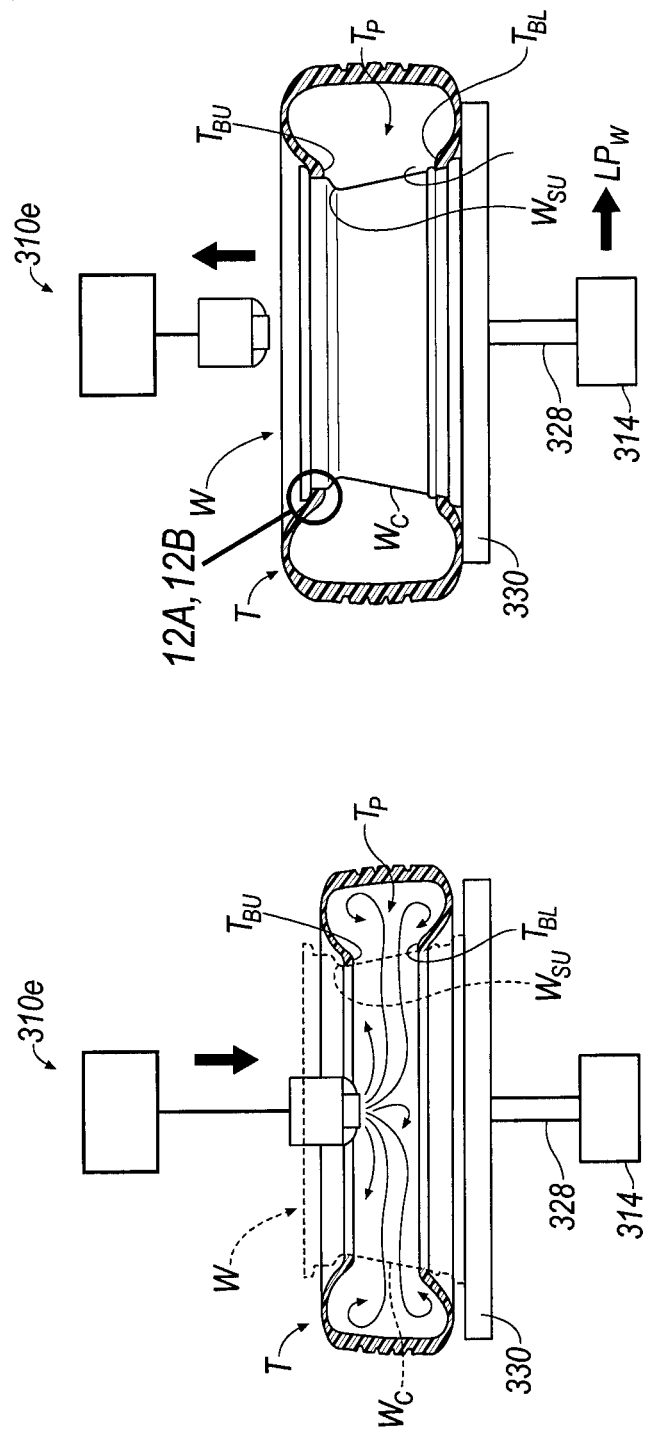

SYSTEM AND METHOD FOR PROCESSING A TIRE-WHEEL ASSEMBLY

CROSS-REFERENCE TO RELATED APPLICATIONS

This U.S. patent application claims priority to U.S. Provisional Application 61/535,745 filed on Sep. 16, 2011, the disclosure of which is considered part of the disclosure of this application and is hereby incorporated by reference in its entirety.

FIELD OF THE INVENTION

The disclosure relates to tire-wheel assemblies and to a system and method for assembling a tire-wheel assembly.

DESCRIPTION OF THE RELATED ART

It is known in the art to assemble a tire-wheel assembly in several steps. Usually, conventional methodologies that conduct such steps require a significant capital investment and human oversight. The present invention overcomes drawbacks associated with the prior art by setting forth a simple system and method for assembling a tire-wheel assembly.

BRIEF DESCRIPTION OF THE DRAWINGS

The disclosure will now be described, by way of example, with reference to the accompanying drawings, in which:

FIG. 1A is side view of an apparatus for processing a tire and a wheel in accordance with an exemplary embodiment of the invention.

FIG. 1C is another side view of the apparatus of FIG. 1B for processing a tire and a wheel in accordance with an exemplary embodiment of the invention.

FIG. 1D is another side view of the apparatus of FIG. 1C for processing a tire and a wheel in accordance with an exemplary embodiment of the invention.

FIG. 2A is a top view of the apparatus according to line 2A-2A of FIG. 1A.

FIGS. 2B'-2B''' are cross-sectional views of the tire and the wheel as well as a side view of a portion of the apparatus according to line 2B'-2B' of FIG. 2B.

FIGS. 2C'-2C''' are cross-sectional views of the tire and the wheel as well as a side view of a portion of the apparatus according to line 2C'-2C' of FIG. 2C.

FIGS. 2D'-2D'' are cross-sectional views of the tire and the wheel as well as a side view of a portion of the apparatus according to line 2D'-2D' of FIG. 2D.

FIG. 3A is side view of an apparatus for processing a tire and a wheel in accordance with an exemplary embodiment of the invention.

FIG. 3B is another side view of the apparatus of FIG. 3A for processing a tire and a wheel in accordance with an exemplary embodiment of the invention.

FIG. 3C is another side view of the apparatus of FIG. 3B for processing a tire and a wheel in accordance with an exemplary embodiment of the invention.

FIG. 4A is a top view of the apparatus according to line 4A-4A of FIG. 3A.

FIG. 4B is a top view of the apparatus according to line 4B-4B of FIG. 3B.

FIGS. 4B'-4B''' are cross-sectional views of the tire and the wheel as well as a side view of a portion of the apparatus according to line 4B'-4B' of FIG. 4B.

FIG. 4C is a top view of the apparatus according to line 4C-4C of FIG. 3C.

FIGS. 4C'-4C''' are cross-sectional views of the tire and the wheel as well as a side view of a portion of the apparatus according to line 4C'-4C' of FIG. 4C.

FIGS. 4D'-4D'' are cross-sectional views of the tire and the wheel as well as a side view of a portion of the apparatus according to line 4D'-4D' of FIG. 4D.

FIG. 5A is side view of an apparatus for processing a tire and a wheel in accordance with an exemplary embodiment of the invention.

FIG. 5B is another side view of the apparatus of FIG. 5A for processing a tire and a wheel in accordance with an exemplary embodiment of the invention.

FIG. 5C is another side view of the apparatus of FIG. 5B for processing a tire and a wheel in accordance with an exemplary embodiment of the invention.

FIG. 5E is another side view of the apparatus of FIG. 5D for processing a tire and a wheel in accordance with an exemplary embodiment of the invention.

FIG. 6A is a top view of the apparatus according to line 6A-6A of FIG. 5A.

FIG. 6B is a top view of the apparatus according to line 6B-6B of FIG. 5B.

FIGS. 6B'-6B' are cross-sectional views of the tire and the wheel as well as a side view of a portion of the apparatus according to line 6B'-6B' of FIG. 6B.

FIG. 6C is a top view of the apparatus according to line 6C-6C of FIG. 5C.

FIGS. 6C'-6C' are cross-sectional views of the tire and the wheel as well as a side view of a portion of the apparatus according to line 6C'-6C' of FIG. 6C.

FIGS. 6D'-6D''' are cross-sectional views of the tire and the wheel as well as a side view of a portion of the apparatus according to line 6D'-6D' of FIG. 6D.

FIGS. 6E'-6E'' are cross-sectional views of the tire and the wheel as well as a side view of a portion of the apparatus according to line 6E'-6E' of FIG. 6E.

FIG. 7A is side view of an apparatus for processing a tire and a wheel in accordance with an exemplary embodiment of the invention.

FIG. 7B is another side view of the apparatus of FIG. 7A for processing a tire and a wheel in accordance with an exemplary embodiment of the invention.

FIG. 7C is another side view of the apparatus of FIG. 7B for processing a tire and a wheel in accordance with an exemplary embodiment of the invention.

FIG. 7D is another side view of the apparatus of FIG. 7C for processing a tire and a wheel in accordance with an exemplary embodiment of the invention.

FIG. 7E is another side view of the apparatus of FIG. 7D for processing a tire and a wheel in accordance with an exemplary embodiment of the invention.

FIG. 8A is a top view of the apparatus according to line 8A-8A of FIG. 7A.

FIG. 8B is a top view of the apparatus according to line 8B-8B of FIG. 7B.

FIGS. 8B'-8B''' are cross-sectional views of the tire and the wheel as well as a side view of a portion of the apparatus according to line 8B'-8B' of FIG. 8B.

FIG. 8C is a top view of the apparatus according to line 8C-8C of FIG. 7C.

FIGS. 8C'-8C' are cross-sectional views of the tire and the wheel as well as a side view of a portion of the apparatus according to line 8C'-8C' of FIG. 8C.

FIG. 8D is a top view of the apparatus according to line 8D-8D of FIG. 7D.

FIG. 8E is a top view of the apparatus according to line 8E-8E of FIG. 7E.

FIGS. 8E'-8E'' are cross-sectional views of the tire and the wheel as well as a side view of a portion of the apparatus according to line 8E'-8E' of FIG. 8E.

DETAILED DESCRIPTION OF THE INVENTION

Figure 1B:
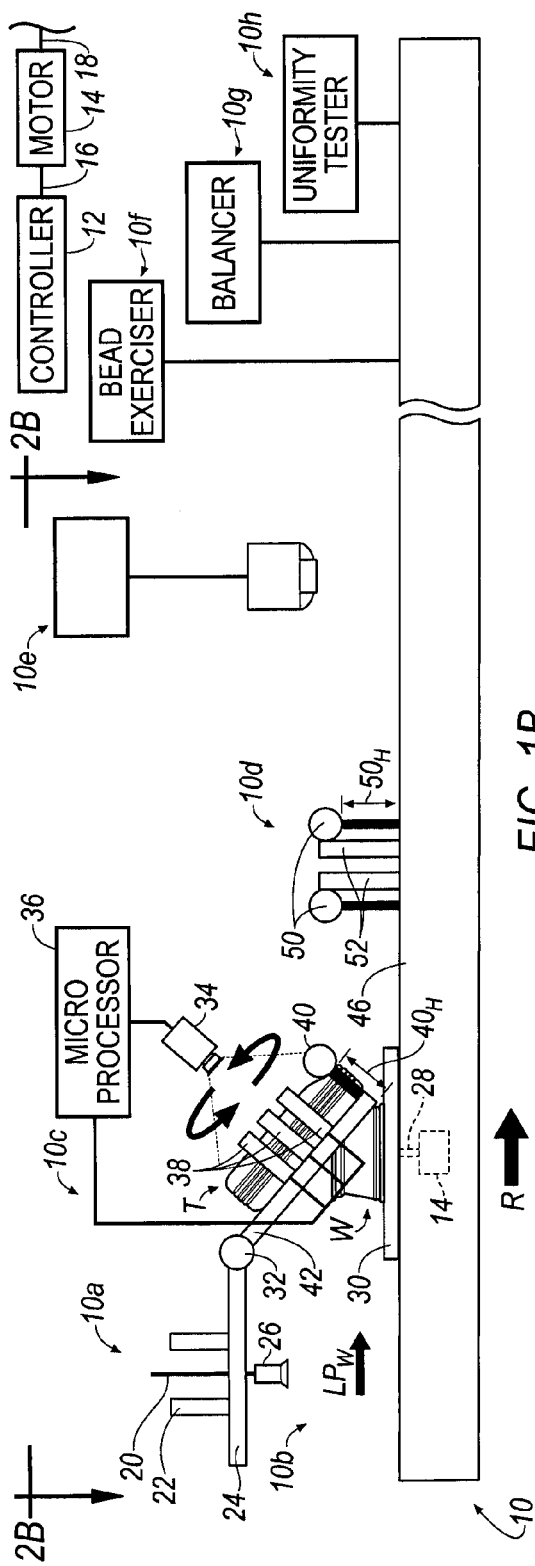
FIG. 1B is another side view of the apparatus of FIG. 1A for processing a tire and a wheel in accordance with an exemplary embodiment of the invention.

The Figures illustrate exemplary embodiments of apparatuses and methods for assembling a tire-wheel assembly. Based on the foregoing, it is to be generally understood that the nomenclature used herein is simply for convenience and the terms used to describe the invention should be given the broadest meaning by one of ordinary skill in the art.

Prior to describing embodiments of the invention, reference is made to FIGS. 9A-9D, which illustrate an exemplary tire, T. Further, in describing embodiments of the invention in the present disclosure, reference may be made to the "upper," "lower," "left," "right" and "side" of the tire, T; although such nomenclature may be utilized to describe a particular portion or aspect of the tire, T, such nomenclature may be adopted due to the orientation of the tire, T, with respect to structure (e.g., of one or more components of the apparatus 10, 100, 200, 300) that supports/engages the tire, T. Accordingly, the above nomenclature should not be utilized to limit the scope of the claimed invention and is utilized herein for exemplary purposes in describing an embodiment of the invention.

In an embodiment, the tire, T, includes an upper sidewall surface, $T_{SU}$ (see, e.g., FIG. 9A), a lower sidewall surface, $T_{SL}$ (see, e.g., FIG. 9D), and a tread surface, $T_T$ (see, e.g., FIGS. 9B-9C), that joins the upper sidewall surface, $T_{SU}$, to the lower sidewall surface, $T_{SL}$. Referring to FIG. 9B, the upper sidewall surface, $T_{SU}$, may rise away from the tread surface, $T_T$, to a peak and subsequently descend at a slope to terminate at and form a circumferential upper bead, $T_{BU}$; similarly, the lower sidewall surface, $T_{SL}$, may rise away from the tread surface, $T_T$, to a peak and subsequently descend at a slope to terminate at and form a circumferential lower bead, $T_{BL}$. The tread surface, $T_T$, may also define a height, $T_H$, of the tire, T, that extends between the upper sidewall surface, $T_{SU}$, and the lower sidewall surface, $T_{SL}$.

As seen in FIG. 9B, when the tire, T, is in a relaxed, unbiased state, the upper bead, $T_{BU}$, forms a circular, upper tire opening, $T_{OU}$; similarly, when the tire, T, is in a relaxed, unbiased state, the lower bead, $T_{BL}$, forms a circular, lower tire opening, $T_{OL}$. It will be appreciated that when an external force (as seen in, e.g., FIGS. 2B'2B''', 2C'-2C''', 4B'-4B''', 4C'-4C''', 6B'-6B''', 6D'-6D''', 8B'-8B''', 8C'-8C''') is applied to the tire, T, the tire, T, may be physically manipulated, and, as a result, one or more of the upper tire opening, $T_{OU}$, and the lower tire opening, $T_{OL}$, may be temporality upset such that one or more of the upper tire opening, $T_{OU}$, and the lower tire opening, $T_{OL}$, is/are not entirely circular, but, may, for example, be manipulated to include an oval shape.

Referring to FIG. 9B, when in the relaxed, unbiased state, each of the upper tire opening, $T_{OU}$, and the lower tire opening, $T_{OL}$, form, respectively, an upper tire opening diameter, $T_{OU-D}$, and a lower tire opening diameter, $T_{OL-D}$. Further, as seen in FIGS. 9A-9B, when in the relaxed, unbiased state, the upper sidewall surface, $T_{SU}$, and the lower sidewall surface, $T_{SL}$, define the tire, T, to include a tire diameter, $T_D$.

Figure 9A:
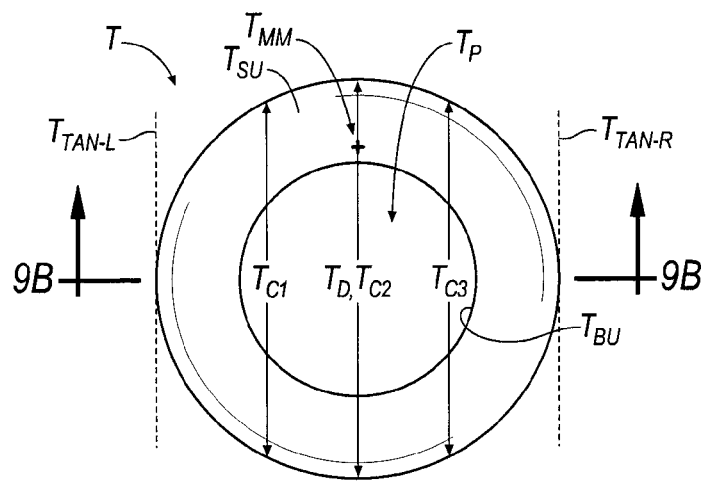
FIG. 9A is a top view of an exemplary tire.
Figure 9B:
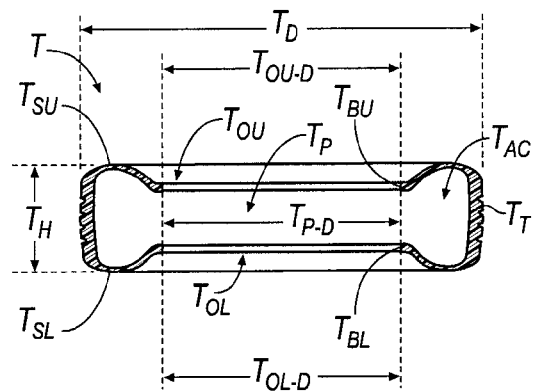
FIG. 9B is a cross-sectional view of the tire according to line 9B-9B of FIG. 9A.
Figure 9C:
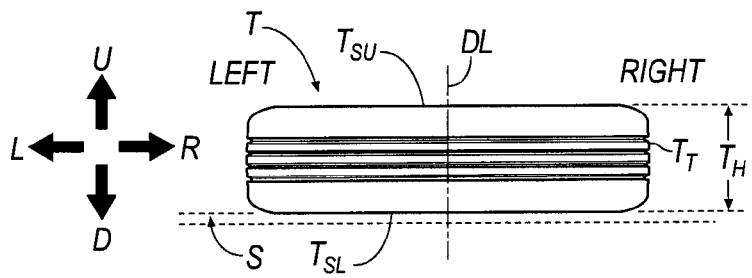
FIG. 9C is a side view of the tire of FIG. 9A.
Figure 9D:
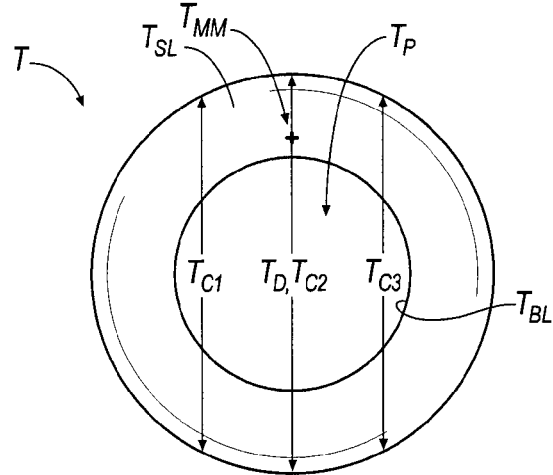
FIG. 9D is a bottom view of the tire of FIG. 9A.

Referring to FIGS. 9A-9B and 9D, the tire, T, also includes a passage, $T_P$. Access to the passage, $T_P$, is permitted by either of the upper tire opening, $T_{OU}$, and the lower tire opening, $T_{OL}$. Referring to FIG. 9B, when the tire, T, is in a relaxed, unbiased state, the upper tire opening, $T_{OU}$, and the lower tire opening, $T_{OL}$, define the passage, $T_P$, to include a diameter, $T_{P-D}$. Referring also to FIG. 9B, the tire, T, includes a circumferential air cavity, $T_{AC}$, that is in communication with the passage, $T_P$. After joining the tire, T, to a wheel, W, pressurized air is deposited into the circumferential air cavity, $T_{AC}$, for inflating the tire, T.

Further, when the tire, T, is arranged adjacent structure or a wheel, W (see, e.g., FIGS. 10A-10B), as described in the following disclosure, the written description may reference a "left" portion or a "right" portion of the tire, T. Referring to FIG. 9C, the tire, T, is shown relative to a support member, S; the support member, S, is provided (and shown in phantom) in order to establish a frame of reference for the "left" portion and the "right" portion of the tire, T. In FIG. 9C, the tire, T, is arranged in a "non-rolling" orientation such that the tread surface, $T_T$, is not disposed adjacent the phantom support member, S, but, rather the lower sidewall surface, $T_{SL}$, is disposed adjacent the phantom support member, S. A center diving line, DL, equally divides the "non-rolling" orientation of the tire, T, in half in order to generally indicate a "left" portion of the tire, T, and a "right" portion of the tire, T.

As discussed above, reference is made to several diameters, $T_{P-D}$, $T_{OU-D}$, $T_{OL-D}$ of the tire, T. According to geometric theory, a diameter passes through the center of a circle, or, in the present disclosure, the axial center of the tire, T, which may alternatively be referred to as an axis of rotation of the tire, T. Geometric theory also includes the concept of a chord, which is a line segment that whose endpoints both lie on the circumference of a circle; according to geometric theory, a diameter is the longest chord of a circle.

In the following description, the tire, T, may be moved relative to structure; accordingly, in some instances, a chord of the tire, T, may be referenced in order to describe an embodiment of the invention. Referring to FIG. 9A, several chords of the tire, T, are shown generally at $T_{C1}$, $T_{C2}$ (i.e., the tire diameter, $T_D$) and $T_{C3}$.

The chord, $T_{C1}$, may be referred to as a "left" tire chord. The chord, $T_{C3}$, may be referred to as a "right" tire chord. The chord, $T_{C2}$, may be equivalent to the tire diameter, $T_D$, and be referred to as a "central" chord. Both of the left and right tire chords, $T_{C1}$, $T_{C3}$, include a geometry that is less than central chord, $T_{C3}$,/tire diameter, $T_D$.

In order to reference the location of the left chord, $T_{C1}$, and the right chord, $T_{C3}$, reference is made to a left tire tangent line, $T_{TAN-L}$, and a right tire tangent line, $T_{TAN-R}$. The left chord, $T_{C1}$, is spaced apart approximately one-fourth (¼) of the tire diameter, $T_D$, from the left tire tangent line, $T_{TAN-L}$. The right chord, $T_o$, is spaced apart approximately one-fourth (¼) of the tire diameter, $T_D$, from the right tire tangent line, $T_{TAN-R}$. Each of the left and right tire chords, $T_{C1}$, $T_{C3}$, may be spaced apart about one-fourth (¼) of the tire diameter, $T_D$, from the central chord, $T_{C2}$. The above spacings referenced from the tire diameter, $T_D$, are exemplary and should not be meant to limit the scope of the invention to approximately a one-fourth (¼) ratio; accordingly, other ratios may be defined, as desired.

Further, as will be described in the following disclosure, the tire, T, may be moved relative to structure. Referring to FIG. 9C, the movement may be referenced by an arrow, U, to indicate upwardly movement or an arrow, D, to indicate downwardly movement. Further, the movement may be referenced by an arrow, L, to indicate left or rearwardly movement or an arrow, R, to indicate right or forwardly movement.

Figure 10A:
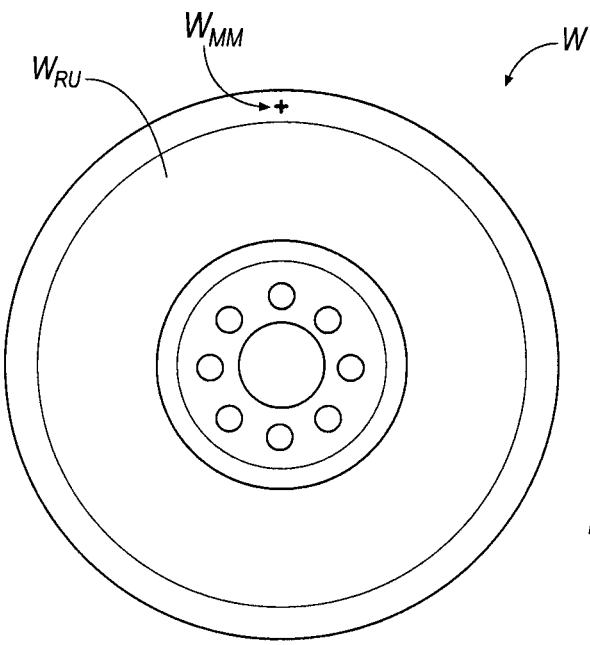
FIG. 10A is a top view of an exemplary wheel.
Figure 10B:
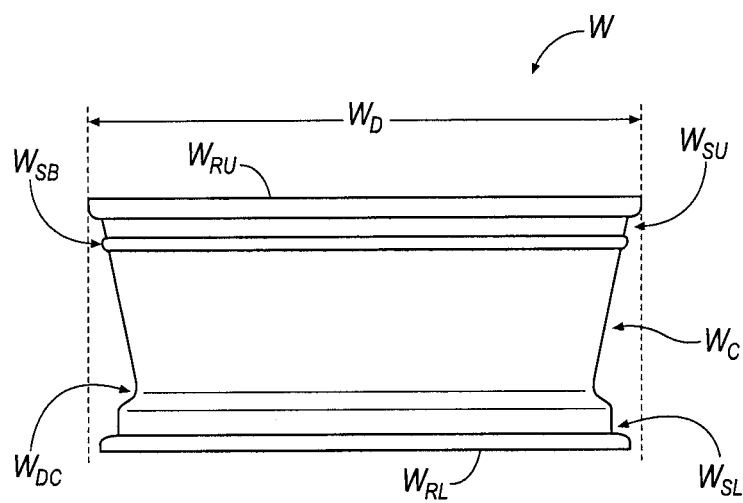
FIG. 10B is a side view of the wheel of FIG. 10A.

Prior to describing embodiments of the invention, reference is made to FIGS. 10A-10B, which illustrate an exemplary wheel, W. Further, in describing embodiments of the invention in the present disclosure, reference may be made to the "upper," "lower," "left," "right" and "side" of the wheel, W; although such nomenclature may be utilized to describe a particular portion or aspect of the wheel, W, such nomenclature may be adopted due to the orientation of the wheel, W, with respect to structure (e.g., of one or more components of the apparatus 10, 100, 200, 300) that supports/engages the wheel, W. Accordingly, the above nomenclature should not be utilized to limit the scope of the claimed invention and is utilized herein for exemplary purposes in describing an embodiment of the invention.

In an embodiment, the wheel, W, includes an upper rim surface, $W_{RU}$, a lower rim surface, $W_{RL}$, and an outer circumferential surface, $W_C$, that joins the upper rim surface, $W_{RU}$, to the lower rim surface, $W_{RL}$. Referring to FIG. 10B, upper rim surface, $W_{RU}$, forms a wheel diameter, $W_D$. The wheel diameter, $W_D$, may be non-constant about the circumference, $W_C$, from the upper rim surface, $W_{RU}$, to the lower rim surface, $W_{RL}$. The wheel diameter, $W_D$, formed by the upper rim surface, $W_{RU}$, may be largest diameter of the non-constant diameter about the circumference, $W_C$, from the upper rim surface, $W_{RU}$, to the lower rim surface, $W_{RL}$. The wheel diameter, $W_D$, is approximately the same as, but slightly greater than the diameter, $T_{P-D}$, of the passage, $T_P$, of the tire, T; accordingly, once the wheel, W, is disposed within the passage, $T_P$, the tire, T, may flex and be frictionally-secured to the wheel, W, as a result of the wheel diameter, $W_D$, being approximately the same as, but slightly greater than the diameter, $T_{P-D}$, of the passage, $T_P$, of the tire, T.

The outer circumferential surface, $W_C$, of the wheel, W, further includes an upper bead seat, $W_{SU}$, and a lower bead seat, $W_{SL}$. The upper bead seat, $W_{SU}$, forms a circumferential cusp, corner or recess that is located proximate the upper rim surface, $W_{RU}$. The lower bead seat, $W_{SL}$, forms a circumferential cusp, corner or recess that is located proximate the lower rim surface, $W_{RL}$. Upon inflating the tire, T, the pressurized air causes the upper bead, $T_{BU}$, to be disposed adjacent and "seat" in the upper bead seat, $W_{SU}$; similarly, upon inflating the tire, T, the pressurized air causes the lower bead, $T_{BL}$, to be disposed adjacent and "seat" in the lower bead seat, $W_{SL}$. In some circumstances, after inflation of the tire, T, entrapments, E (see, e.g., FIG. 12A), such as, for example, contaminants, lubricant or the like, may be trapped between the bead, $T_{BU}/T_{BL}$, of the tire, T, and the bead seat $W_{SU}/W_{SL}$ of the wheel, W; the entrapments, E, may be removed after the inflated tire-wheel assembly, TW, is subjected to a bead exerciser (see, e.g., 10f, 110f, 210f, 310f).

The non-constant diameter of the outer circumference, $W_C$, of the wheel, W, further forms a wheel "drop center," $W_{DC}$. A wheel drop center, $W_{DC}$, may include the smallest diameter of the non-constant diameter of the outer circumference, $W_C$, of the wheel, W. Functionally, the wheel drop center, $W_{DC}$, may assist in the mounting of the tire, T, to the wheel, W.

The non-constant diameter of the outer circumference, $W_C$, of the wheel, W, further forms an upper "safety bead," $W_{SB}$. In an embodiment, the upper safety bead may be located proximate the upper bead seat, $W_{SU}$. In the event that pressurized air in the circumferential air cavity, $T_{AC}$, of the tire, T, escapes to atmosphere, the upper bead, $T_{BU}$, may "unseat" from the upper bead seat, $W_{SU}$; because of the proximity of the safety bead, $W_{SB}$, the safety bead, $W_{SB}$, may assist in the mitigation of the "unseating" of the upper bead, $T_{BU}$, from the upper bead seat, $W_{SU}$, by assisting in the retaining of the upper bead, $T_{BU}$, in a substantially seated orientation relative to the upper bead seat, $W_{SU}$. In some embodiments, the wheel, W, may include a lower safety bead (not shown); however, upper and/or lower safety beads may be included with the wheel, W, as desired, and are not required in order to practice the invention described in the following disclosure.

With reference now to FIGS. 9A and 10A, physical attributes of the tire, T, and the wheel, W, are described. It should be noted that the discussed physical attributes may be inherent aspects/characteristics of each of the tire, T, and the wheel, W, which may arise from, for example, a manufacturing technique (e.g., molding, casting or the like) of each of the tire, T, and the wheel, W.

As seen in FIG. 9A, the tire, T, may include an inherent physical attribute that is referred to as a "high point of radial force variation" (see $T_{MM}$). When the tire, T, is in use, the high point of radial force variation may be described as a region of the tire, T, where there is a fluctuation in force that appears in the rotating axis of the tire, T, when a specific load is applied, and, when the tire, T, is rotated at a specific speed.

Referring to FIG. 10A, the wheel, W, may include an inherent physical attribute that is referred to as a "point of minimum radial run out" (see $W_{MM}$). To a certain extent, about every wheel, W, may be manufactured with an inherent imperfection (which may arise from, for example, material distribution and/or flow of material during the manufacturing process of the wheel, W). Accordingly, the imperfection of the wheel, W, may result in the wheel, W, being "out-of-round," or, having a "run-out" (i.e., the wheel, W, therefore, may include the aforementioned "point of minimum radial run out").

Figure 11:
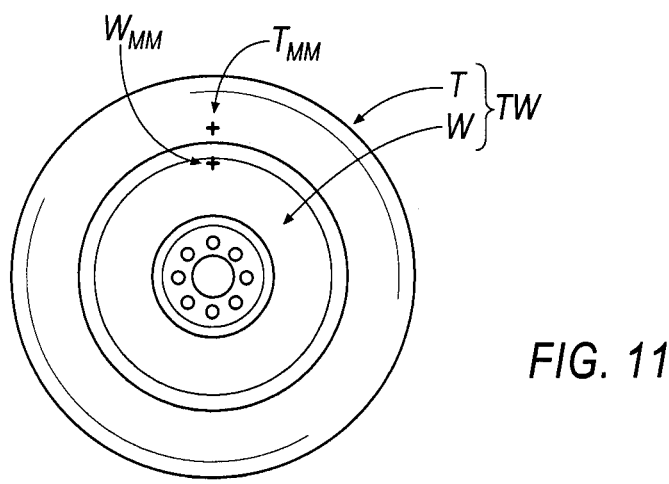
FIG. 11 is a top view of the tire of FIGS. 9A-9D joined to the wheel of FIGS. 10A-10B.

When the tire, T, and the wheel, W, are joined (i.e., mounted) together as seen in FIG. 11, it may be desirable to align (or match) the high point of radial force variation, $T_{MM}$, of the tire, T, with the point of minimum radial run out, $W_{MM}$, of the wheel, W. The alignment or "matching" described above may, for example, improve stability of a vehicle to which a tire-wheel assembly, TW, is joined to and/or mitigate abnormal tread-wear patterns to the tire, T. The alignment or "matching" of the high point of radial force variation of the tire, T, with the point of minimum radial run out of the wheel, W, may be referred to as a "uniformity method" of "match mounting."

If, however, one or more of the high point of radial force variation, $T_{MM}$, of the tire, T, and the point of minimum radial run out, $W_{MM}$, of the wheel, W, are not determined or identified by, for example, an original equipment supplier, at the time the tire, T, and the wheel, W, are to be joined (i.e., mounted) together, one (e.g., a person or business entity) may have to determine or locate a point of lightest weight (see $T_{MM}$) of the tire, T, and/or a point of heaviest weight (see $W_{MM}$) of the wheel, W; upon determining/locating the above-described lightest/heaviest points, a substantially similar alignment/"matching" is conducted as described above prior to joining (i.e., mounting) the tire, T, and the wheel, W. In some circumstances, if a valve-stem hole (see $W_{MM}$) is provided on the wheel, W, the point of lightest weight of the tire, T, may be aligned with the valve stem hole on the wheel, W (rather than aligning the point of lightest weight of the tire, T, with the point of heaviest weight of the wheel, W). The alignment of the point of lightest weight of the tire, T, with the valve stem hole/point of heaviest weight of the wheel, W, may be referred to as a "weight method" of "match mounting."

For purposes of describing an embodiment of either of the "uniformity method" or the "weight method" of "match mounting," reference is made to FIGS. 9A, 10A and 11 where: 1) a region of the tire, T, is identified by the reference numeral "$T_{MM}$" and 2) a region of the wheel, W, is identified by the reference numeral "$W_{MM}$." The subscript "MM" for each of the reference numerals $T_{MM}$ and $W_{MM}$ may generally stand for "match mark," and, may be utilized in one of the "uniformity method" or "weight method" for "match mounting" the tire, T, and the wheel, W, together to form a "match-mounted" tire-wheel assembly, TW. Accordingly, if a "uniformity method" is employed in the described match mounting embodiment: 1) the reference numeral "$T_{MM}$" may stand for a region of high point of radial force variation of the tire, T, and 2) the reference numeral $W_{MM}$ may stand for a region of point of minimum radial run out of the wheel, W. Alternatively, if a "weight method" is employed in the described match mounting embodiment: 1) the reference numeral "$T_{MM}$" may stand for a point of lightest weight of the tire, T, and 2) the reference numeral $W_{MM}$ may stand for a point of heaviest weight of the wheel, W, or, a location of a valve stem hole of the wheel, W.

In describing one or more of the match mounting embodiments of the invention, the illustrated "dot" or "spot" seen in the Figures that the reference signs, $T_{MM}$, and, $W_{MM}$, point to should not be construed to be limited to a physical/visible/tactile markings on one or more of the tire, T, and the wheel, W. In some conventional match-marking/match-mounting systems/methodologies, the tire, T, and the wheel, W, may include, for example, a physical marking, object or the like, such as, for example, a paint dot, a tag, a sticker, an engraving, an embossment or the like that is applied to or formed in, upon or within a surface or body portion of one or more of a tire, T, and a wheel, W. However, in one or more alternative embodiments of the present invention, match-mounting techniques may not include any kind of or type of a physical/visible/tactile marking applied to either of the tire, T, and the wheel, W; accordingly, one of, or, many benefits realized by the present invention may be that additional material, time or steps associated with the application and/or formation of the physical marking, object or the like upon one or more of the tire, T, and the wheel, W, is obviated, thereby realizing a cost and/or time savings benefit in the assembling of a tire-wheel assembly, TW.

If a physical marking, object or the like is not included on either of the tire, T, and the wheel, W, the spatial region of where the physical marking, object or the like may otherwise be located may be initially unknown to a processing apparatus (e.g., the apparatus 10, 100, 200, 300), but, after one or more processing steps, the spatial region of where the physical marking, object or the like would otherwise by located may become known to/detected/learned by, for example, a computer or microprocessor (see, e.g., 36, 136, 236, 336) associated with, for example, the apparatus (e.g., the apparatus 10, 100, 200, 300). Accordingly, although the Figures include an illustrated "dot" or "spot" that is identified by the reference signs, $T_{MM}$, and, $W_{MM}$, the illustration of the "dot" or "spot" is provided in the Figures for convenience for the purpose of the reader's edification and not to otherwise suggest that one or more of the tire, T, and the wheel, W, includes a physical/visible/tactile marking or object. Thus, in some embodiments, each of the reference signs, $T_{MM}$, and, $W_{MM}$, may be referred to as a "virtual match mark region" in the following disclosure due to the fact that the spatial regions of the tire, T, and the wheel, W, may not physically marked or include an object, but, rather, are detected/determined/learned by one or more components of the apparatus.

Referring to FIGS. 1A-2A, an apparatus 10 including a plurality of processing sub-stations 10a-10h is shown according to an embodiment. Regarding the view of FIG. 2A, the sub-station 10b is represented in a top view but shown next to the sub-station 10a due to the fact that the sub-station 10a would obscure the sub-station 10b from a true top view representation.

The sub-station 10a may be utilized for preparing a tire, T, prior to a subsequent processing act conducted by one or more of the sub-stations 10c-10h for forming an tire-wheel assembly, TW. The "preparing" act conducted by the sub-station 10a may include lubricating the tire, T, with a lubricant (e.g., a soap) in order to reduce friction between the tire, T, and a wheel, W, during subsequent mounting steps at sub-stations 10c, 10d.

The sub-station 10b may be utilized for "preparing" a wheel, W, prior to a subsequent processing act conducted by one or more of the sub-stations 10c-10h for forming a tire-wheel assembly, TW. The "preparing" act conducted by the sub-station 10b may include lubricating the wheel, W, with a lubricant (e.g., a soap) in order to reduce friction between the wheel, W, and the tire, T, during subsequent mounting steps at sub-stations 10c, 10d.

The sub-stations 10c-10d may be utilized for processing a tire-wheel assembly, TW. The "processing" act conducted by the sub-stations 10c and 10d may include the act of "joining" or "mounting" a tire, T, to a wheel, W, for forming an un-inflated tire-wheel assembly, TW; the act of "joining" or "mounting" may mean to physically couple, connect or marry the tire, T, and wheel, W, such that the wheel, W, may be referred to as a male portion that is inserted into a passage, $T_P$, of the tire, T, being a female portion.

The "processing" act conducted by the sub-station 10e may include the act of "inflating" the tire-wheel assembly, TW; the act of "inflating" may include directing air into the circumferential air cavity, $T_{AC}$, of the tire, T, of the tire-wheel assembly, TW. As a result of the act of "inflating," the upper bead, $T_{BU}$, and the lower bead, $T_{BL}$, of the tire, T, may be disposed (or "seated") adjacent the upper bead seat, $W_{SU}$, and the lower bead seat, $W_{SL}$, of the wheel, W.

The "processing" act conducted by the sub-station 10f may include the act of "exercising" the tire, T, relative the wheel, W, in order to fully seat the upper bead, $T_{BU}$, and the lower bead, $T_{BL}$, of the tire, T, adjacent the upper bead seat, $W_{SU}$, and the lower bead seat, $W_{SL}$, of the wheel, W, respectively. In some circumstances, entrapments, E (see, e.g., FIG. 12A), such as, for example: air bubbles, lubricant/soap, impurities or the like may be undesirably located between a bead, $T_{BU}$/$T_{BL}$, of the tire, T, and the seat, $W_{SU}$/$W_{SL}$, of the wheel, W; by "exercising" (which may include one or more of the acts of vibrating, vacuuming, or the like) one or more of the tire, T, and the wheel, W, the entrapments, E, may be removed/withdrawn from the tire-wheel assembly, TW, such that one or more of the upper bead, $T_{BU}$, and the lower bead, $T_{BL}$, of the tire, T, may be fully seated adjacent one or more of the upper bead seat, $W_{SU}$, and the lower bead seat, $W_{SL}$, of the wheel, W.

The "processing" act conducted by the sub-station 10g may include balancing the inflated tire-wheel assembly, TW. The "processing" act conducted by the substation 10h may include testing the uniformity of the balanced tire-wheel assembly, TW. The balancing and testing-of-uniformity acts may include determining the un/balance of the inflated tire-wheel assembly, TW, and adding one or more weights to the tire-wheel assembly, TW, until the inflated tire-wheel assembly, TW, is balanced. Any desirable balancing apparatus and uniformity testing apparatus may be utilized for carrying out the above-described processing steps at the sub-stations 10g, 10h.

Referring now to FIGS. 1A-2A, an embodiment of the invention is described. The tire, T, and the wheel, W, are moved in one direction (i.e., according to the illustrated embodiment, in a forwardly/rightwardly direction, R). The wheel, W, for example, may move along a linear path, $LP_W$, from the sub-station 10b to the sub-station 10c-10h. The tire, T, may also move along a linear path, $LP_T$, from the sub-station 10a to the sub-station 10c; however, the linear path of the tire, T, intersects with and merges into the linear path, $LP_W$, of the wheel, W, by way of the sub-station 10c (see, e.g., FIG. 1B). As a result of the generally linear movement of the tire, T, and the wheel, W, at least a portion (see, e.g., sub-stations 10c, 10d) of the apparatus 10 may be referred to as a "linear mounter."

The apparatus 10 may be operated automatically or manually according to the following implementations. In some embodiments, the apparatus 10 may include a controller 12 (e.g., a computer including one or more of a processor, memory or the like to permit automatic/automated control over the apparatus 10) and one or more motors 14 for actuating and/or causing movement of one or more components of the sub-stations 10a-10h. The controller 12 may be connected to the one or motors 14 by one or more cable or leads 16. The one or more motors 14 may be connected to the one or more sub-stations 10a-10h by one or more cables or leads 18. Alternatively or in addition to automatic/automated operation by the controller, 12, operation of the apparatus 10 may result from one or more of a manual, operator input (e.g., by way of a joystick, depression of a button or the like).

As seen in FIGS. 1A and 2A, the sub-station 10a prepares the tire, T, by depositing a lubricant or soap upon the tire, T; accordingly, in an embodiment, the sub-station 10a may be referred to as a tire lubricating sub-station. The tire lubricating sub-station 10a may include a dispenser 20 that sprays or wipes the lubricant or soap upon one or more regions of the tire, T, such as, for example, the upper bead, $T_{BU}$, and the lower bead, $T_{BL}$, of the tire, T. The tire lubricating sub-station 10a may also include one or more tire rotating devices 22 for rotating the tire, T, during the lubricating step for the purpose of lubricating one or more regions of the tire, T, that may not be in the spraying direction or coating reach of the dispenser 20.

The tire lubricating sub-station 10a may also include a tire transporting device 24 for moving the tire, T, along the linear path, $LP_T$, from the tire lubricating sub-station 10a to the substation 10c. The dispenser 20 and the one or more tire rotating devices 22 may be attached to and extend away from the tire transporting device 24.

Referring to FIG. 2A, the tire transporting device 24 may include a central conveyor portion 24a (such as, for example, a conveyor belt) that is flanked by support members 24b. The dispenser 20 and the one or more tire rotating devices 22 are attached to and extend away from the support members 24b.

As seen in FIGS. 1A and 2A, the sub-station 10b prepares the wheel, W, by depositing a lubricant or soap upon the wheel, W; accordingly, in an embodiment, the sub-station 10b may be referred to as a wheel lubricating sub-station. The wheel lubricating sub-station 10b may include a dispenser 26 that showers/sprays or wipes the lubricant or soap upon one or more regions of the wheel, W, such as, for example, the upper bead seat, $W_{SU}$, and the lower bead seat, $W_{SL}$, of the wheel, W. The wheel lubricating sub-station 10b may also include one or more wheel rotating devices 28 for rotating the wheel, W, during the lubricating step for the purpose of lubricating one or more regions of the wheel, W, that are not in the spraying direction or coating reach of the dispenser 26.

The wheel lubricating sub-station 10b may also include a wheel transporting device 30 such as, for example, a transporting platen or cart for moving the wheel, W, along the linear path, $LP_W$, from the wheel lubricating sub-station 10b to the sub-station 10c. The one or more tire rotating devices 28 may be attached to the wheel transporting device 30; in an embodiment, a motor 14 may be arranged underneath the wheel transporting device 30, and, the rotating device 28 may extend away from the motor 14 and through the wheel transporting device 30 such that a distal end (not shown) of the rotating device 28 may be attached to an inner periphery/inner circumference of the wheel, W. The dispenser 26 may be attached to and be suspended over the wheel, W, by a lower surface of the tire transporting device 24.

Figure 2B:
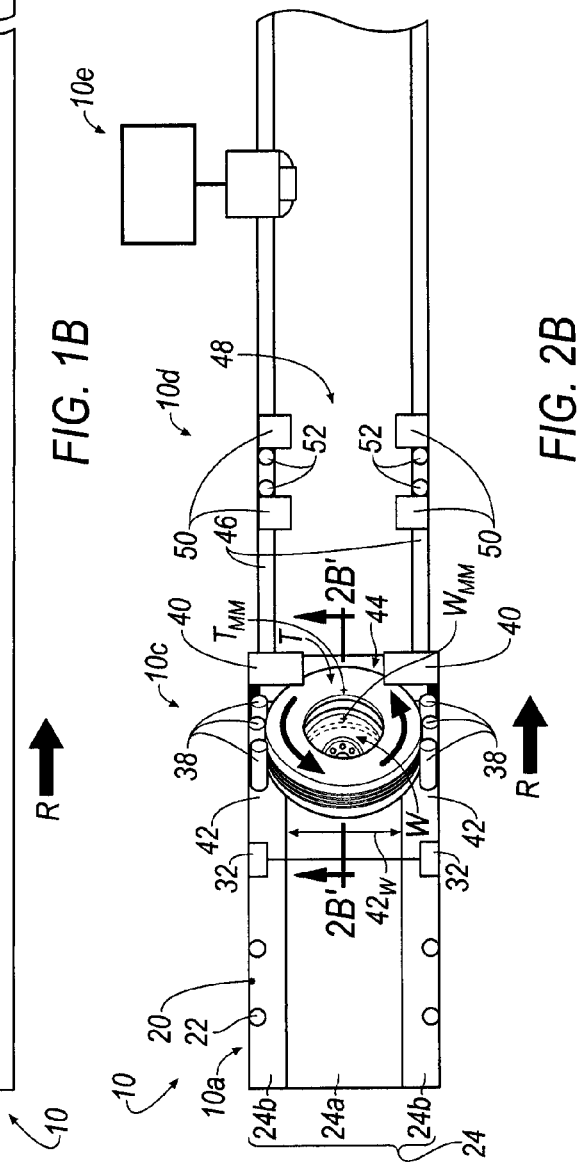
FIG. 2B is a top view of the apparatus according to line 2B-2B of FIG. 1B.

As seen in FIGS. 1B, 2B and 2B'-2B''', sub-station 10c is shown conducting a processing step that may be referred to as a first mounting step; therefore, the sub-substation 10c may be referred to as a first mounting sub-station 10c. Prior to describing an embodiment of the components of the first mounting sub-station 10c, the orientation of the first mounting sub-station 10c relative to the tire lubricating sub-station 10a and the wheel lubricating substation 10b is described according to an embodiment.

As described above in FIG. 1A, the tire lubricating sub-station 10a and the first mounting sub-station 10c generally define the linear path, $LP_T$, of the tire, T. The tire-lubricating sub-station 10a is connected to the first mounting sub-station 10c by a pivot joint 32. Additionally, in an embodiment, both of the tire lubricating sub-station 10a and the first mounting sub-station 10c are arranged above the wheel lubricating sub-station 10b at a spaced-apart distance, $D_{10}$, such that the linear path, $LP_T$, of the tire, T, and the linear path, $LP_W$, of the wheel, W, are initially parallel and do not intersect with one another.

However, as seen in FIG. 1B, the controller 12 and motor 14 may communicate with the pivot joint 32 in order to permit a portion of the linear path, $LP_T$, of the tire, T, defined by the first mounting sub-station 10c to be temporarily interrupted such that the portion of the linear path, $LP_T$, of the tire, T, defined by the first mounting sub-station 10c intersects with the linear path, $LP_W$, of the wheel W. Because the linear paths, $LP_T$, $LP_W$, of each of the tire, T, and the wheel, W, intersect, and, because both of the tire, T, and the wheel, W, are moved in one/the same direction (that is forwardly/rightwardly, R), the tire, T, and the wheel, W, may be at least partially coupled/joined at the first mounting sub-station 10c. Further, as will be described in the following embodiment, the forwardly/rightwardly, R, movement imparted to the tire, T, and the wheel, W, results in the partial coupling/joining of the tire, T, and the wheel, W, without the assistance of spatially manipulatable mounting equipment, such as, for example a robotic arm that is joined to, for example, the wheel, W, which would spatially move and force the wheel, W, into the passage, $T_P$, of the tire, T.

Referring to FIGS. 1A-2B, the first mounting sub-station 10c includes a match-mark imaging camera 34, a microprocessor 36, a tire rotating device 38, a tire-linear-movement interference member 40 and a pair of tire lower sidewall surface support members 42 that are spaced apart by a width $42_W$ (see FIGS. 2A, 2B) that forms a gap 44 (see FIGS. 2A, 2B) between the tire sidewall support members 42. The pivot joint 32 pivotally connects the tire support members 24b of the lubricating sub-station 10a to the support members 42 of the first mounting sub-station 10c. The tire-linear-movement interference member 40 may be spaced-apart by a height, $40_H$, from the pair of tire lower sidewall surface support members 42; the height, $40_H$, is substantially equal to but less than the height, $T_H$, of the tire, T.

The tire rotating device 38 may include a plurality of roller members that extend away from approximately about a central portion of the upper surface of the tire lower sidewall surface support members 42. The tire-linear-movement interference member 40 may be located at and extend away from approximately about a distal end of the upper surface of the of the tire lower sidewall surface support members 42. The match-mark imaging camera 34 may be arranged above and over the tire lower sidewall surface support members 42. The microprocessor 36 is connected to the match-mark imaging camera 34. The microprocessor 36 is communicatively-coupled to the motor 14, and, the motor 14 is connected to the tire rotating device 38 (i.e., the microprocessor 36 is connected to the tire rotating device 38 by way of the motor 14).

Functionally, both of the tire, T, and the wheel, W, are advanced forwardly/rightwardly, R, at about the same speed such that the tire, T, and the wheel, W, arrive in a substantially axially-aligned orientation at the first mounting sub-station 10c prior to actuation of the pivot joint 32 by the controller 12 and the motor 14. The tire, T, may be advanced to and deposited upon the first mounting sub-station 10c as a result of the driving movement of the conveyor 24a, and, about concurrently, the wheel, W, may be advanced underneath the first mounting substation 10c by the wheel transporting device 30 in order to maintain substantially axial alignment of the wheel, W, with the tire, T.

When substantially all of the lower sidewall surface, $T_{SL}$, of the tire, T, is arranged upon the tire sidewall support members 42, the wheel, W, may be substantially axially-aligned with the tire, T, such that the wheel, W, is aligned with the gap 44 and is viewable through both of the gap 44 and the passage, $T_P$, of the tire, T, by the match-mark imaging camera 34.

Then, the match-mark imaging camera 34 obtains/images match-marks, $T_{MM}$, $W_{MM}$, of both of the tire, T, and the wheel, W. The imaged match-marks, $T_{MM}$, $W_{MM}$, of both of the tire, T, and the wheel, W, are then sent to and subsequently interpreted by the microprocessor 36. After interpreting the imaged match-marks, $T_{MM}$, $W_{MM}$, of both of the tire, T, and the wheel, W, the microprocessor 36 determines if and how much the tire, T, should be rotated by the tire rotating devices 38 in order to align the match-marks, $T_{MM}$, $W_{MM}$, of both of the tire, T, and the wheel, W. If the microprocessor 36 determines that the tire, T, should be rotated, the microprocessor 36 sends a signal to the motor 14, which, in turn causes/drives rotation of the tire rotating devices 38 in order to rotate the tire, T, for aligning the match-mark, $T_{MM}$, of the tire, T, with the match-mark, $W_{MM}$, of the wheel, W.

After the match-marks, $T_{MM}$, $W_{MM}$, of both of the tire, T, and the wheel, W, have been aligned, the controller 12 causes the motor 14 to actuate the pivot joint 32, which causes the tire sidewall support members 42 to pivot relative to and no longer be linearly-aligned with the support members 24b, thereby disrupting the linear path, $LP_T$, of the tire, T, thereby causing the linear path, $LP_T$, of the tire, T, to intersect with the linear path, $LP_W$, of the wheel, W.

Once the pivot joint 32 has been actuated, the lower sidewall surface, $T_{LS}$, of the tire, T, should no longer be arranged upon the conveyor 24a, and, with the assistance of gravity, one or more of the tread surface, $T_T$, and a portion of the upper sidewall surface, $T_{SU}$, of the tire, T, may be disposed adjacent the tire-linear-movement interference member 40 in order to, in part, prevent the tire, T, from sliding off of the tire sidewall support members 42. Further, once the pivot joint 32 has been actuated, and, because the wheel, W, is substantially axially-aligned with the tire, T (and, due to the diameter, $W_D$, of the wheel, W, being approximately equal to but slightly less than the width 42w that forms the gap 44 between the tire sidewall support members 42), a portion of the wheel, W, may be arranged within the passage, $T_P$, of the tire, T; referring to FIG. 2B', the portion of the wheel, W, arranged within the passage, $T_P$, of the tire, T, may also result in a portion of the outer circumferential surface, $W_C$, of the wheel, W, proximate the upper bead seat, $W_{SU}$, being arranged adjacent the lower bead, $T_{BL}$, of the tire, T.

Referring to FIGS. 2B' and 2B", as the wheel, W, is advanced forwardly/rightwardly, R, along the linear path, $LP_W$, of the wheel, W, by the wheel transporting device 30, the contact of the wheel, W, with the tire, T, results in the wheel, W, imparting movement to the tire, T, forwardly/rightwardly, R, along the linear path, $LP_W$, of the wheel, W. Although the wheel, W, imparts the movement to the tire, T, in the forwardly/rightwardly, R, along the linear path, $LP_W$, of the wheel, W, the tire-linear-movement interference member 40 resists, but does not prevent, movement of the tire, T, in the forwardly/rightwardly, R, along the linear path, $LP_W$, of the wheel, W; accordingly, as seen in FIG. 2B", 2B''', the tire-linear-movement interference member 40 temporarily deforms the tire, T, which results in the tire, T, being spatially manipulated about the wheel, W (such that, e.g., the chords, $T_{C1}$, $T_{C2}/T_D$, $T_{C3}$, of the tire, T, are temporarily upset (i.e., expanded)), in order to permit the lower bead, $T_{BL}$, of the tire, T, to be wrapped about the outer circumferential surface, $W_C$, of the wheel, W, in order to partially join/mount the tire, T, to the wheel, W, as seen in FIG. 2B'''. The wheel transporting device 30 also includes a wheel-retaining member (not shown) that counteracts the resistance imparted to the tire, T, by the tire-linear-movement interference member 40, which would otherwise be imparted to the wheel, W, in order to permit both of the tire, T, and the wheel, W, to continued forwardly/rightwardly, R, movement along the linear path, $LP_W$, of the wheel, W. Once the tire, T, is completely passed by the tire-linear-movement interference member 40 as seen in FIG. 2B''', the tire, T, deforms back into its at-rest/unbiased orientation prior to contacting the tire-linear-movement interference member 40 and is partially joined/mounted to the wheel, W; further, as seen in FIG. 2B''', the upper bead, $T_{BU}$, may be disposed over/adjacent the upper rim surface, $W_{RU}$, of the wheel, W.

Figure 2C:
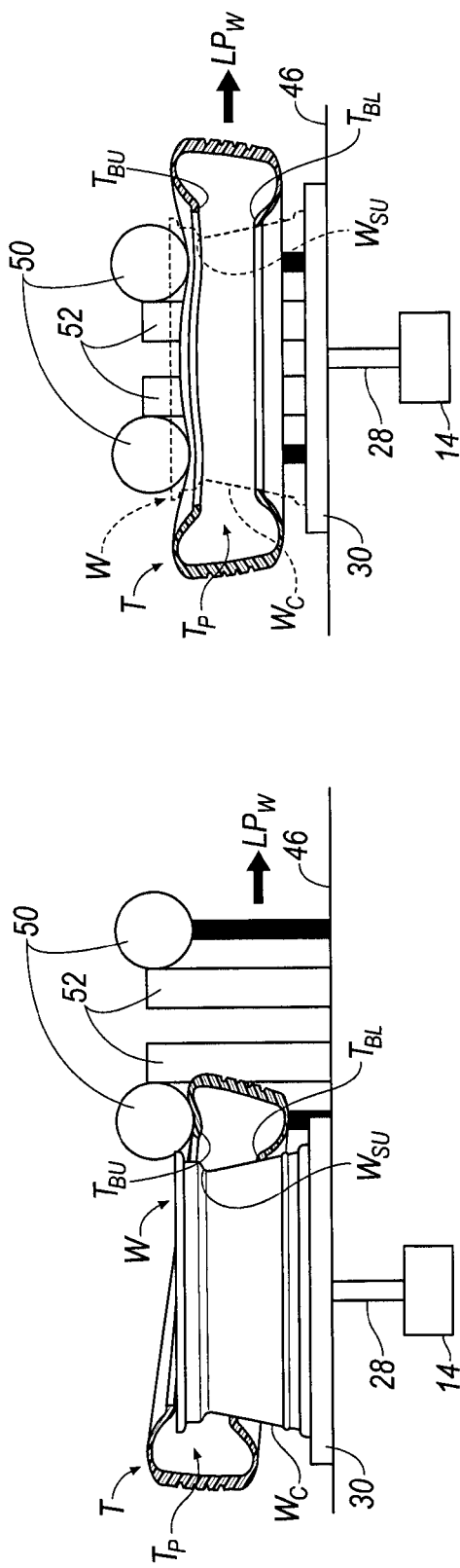
FIG. 2C is a top view of the apparatus according to line 2C-2C of FIG. 1C.
Figure 2C:
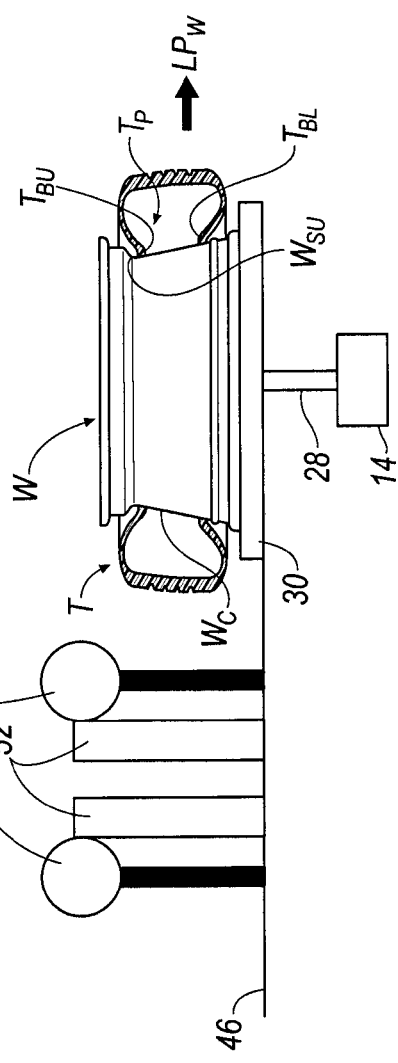
Figure 2C:
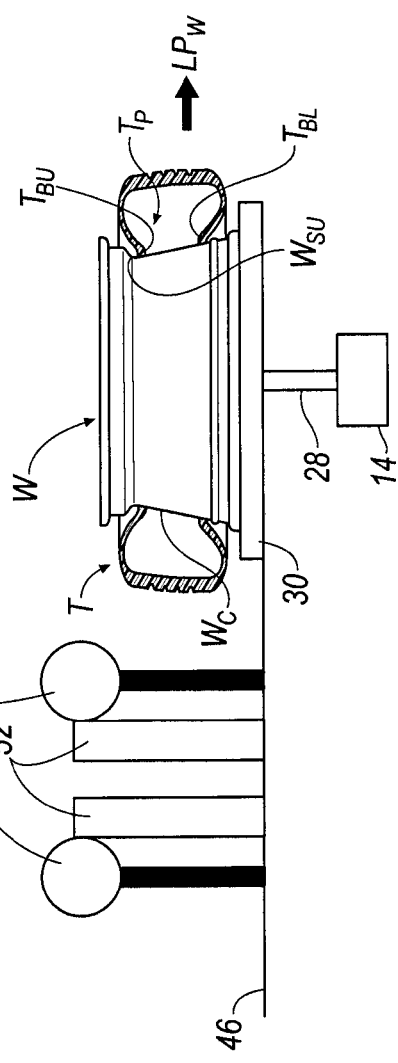

Referring to FIGS. 1C, 2C and 2C'-2C''', once the tire, T, is partially joined/mounted to the wheel, W, as described above, the wheel transporting device 30 continues to move both of the wheel, W, and the tire, T, along the linear path, $LP_W$, of the wheel, W, in the forwardly/rightwardly direction, R, toward the sub-station 10d. The sub-station 10d is shown conducting a processing step that may be referred to as a second mounting step; therefore, the sub-substation 10d may be referred to as a second mounting sub-station 10d.

As seen in FIGS. 1C and 2C, the second mounting sub-station 10d may include parallel support members 46 defining a gap 48. The transporting device 30 is movably-arranged within the gap 48 along the linear path, $LP_W$, of the wheel, W. The second mounting sub-station 10d may further comprise a pair of tire-linear-movement interference members 50 and one or more tire-tread-surface-contacting guide members 52 connected to and extending away from each support member defining the parallel support members 46. Like the tire-linear-movement interference member 40, the two pairs of tire-linear-movement interference members 50 may be spaced-apart by a height, $50_H$ (see FIG. 1C), from the parallel support members 46; the height, $50_H$, is substantially equal to but less than the height, $T_H$, of the tire, T.

Referring to FIGS. 2C' and 2C'', as the tire, T, and the wheel, W, are advanced forwardly/rightwardly, R, along the linear path, $LP_W$, of the wheel, W, by the wheel transporting device 30, the two pairs of tire-linear-movement interference members 50 of the second mounting sub-station 10d may come into contact with and resists, but does not prevent, movement of the tire, T, as the tire, T, is carried upon the wheel, W, in the forwardly/rightwardly, R, direction along the linear path, $LP_W$, of the wheel, W.

As the tire, T, is moved past the two pairs of tire-linear-movement interference members 50, the two pairs of tire-linear-movement interference members 50 are brought into contact with the upper sidewall surface, $T_{SU}$, of the tire, T; when the two pairs of tire-linear-movement interference members 50 come into contact with the upper sidewall surface, $T_{SU}$, of the tire, T, the two pairs of tire-linear-movement interference members 50 exerts a downwardly force upon the tire, T, thereby temporarily deforming the tire, T, which results in the tire, T, being spatially manipulated about the wheel, W (such that, e.g., the chords, $T_{C1}$, $T_{C2}/T_D$, $T_{C3}$, of the tire, T, are temporarily upset (i.e., expanded)), in order to permit the upper bead, $T_{BU}$, of the tire, T, to be wrapped about the outer circumferential surface, $W_C$, of the wheel, W, in order to complete the joining/mounting of the tire, T, to the wheel, W, as seen in FIG. 2C''' (due to both of the upper bead, $T_{BU}$, and the lower bead, $T_{BL}$, of the tire, T, being wrapped about the entire outer circumferential surface, $W_C$, of the wheel, W). During the temporary deforming process of the tire, T, as described above, the one or more tire-tread-surface-contacting guide members 52 may engage the tread surface, $T_T$, of the tire, T, in order to assist in maintaining a substantially equal distribution of forces applied to the tire, T, as the tire, T, is advanced by the wheel, W, along the linear path, $LP_W$, of the wheel, W.

As explained above, the wheel transporting device 30 also includes a wheel-retaining member (not shown) that counteracts the resistance imparted to the tire, T, by the two pairs of tire-linear-movement interference members 50, which would otherwise be imparted to the wheel, W, in order to permit both of the tire, T, and the wheel, W, to continued forwardly/rightwardly, R, along the linear path, $LP_W$, of the wheel, W. Once the tire, T, is completely passed by the two pairs of tire-linear-movement interference members 50 as seen in FIG. 2C''', the tire, T, deforms back into its substantially at-rest/substantially unbiased orientation prior to contacting the two pairs of tire-linear-movement interference members 50 such that the tire, T, may be said to be mounted to the wheel, W, thereby forming a non-inflated tire-wheel assembly, TW.

Figure 2D:
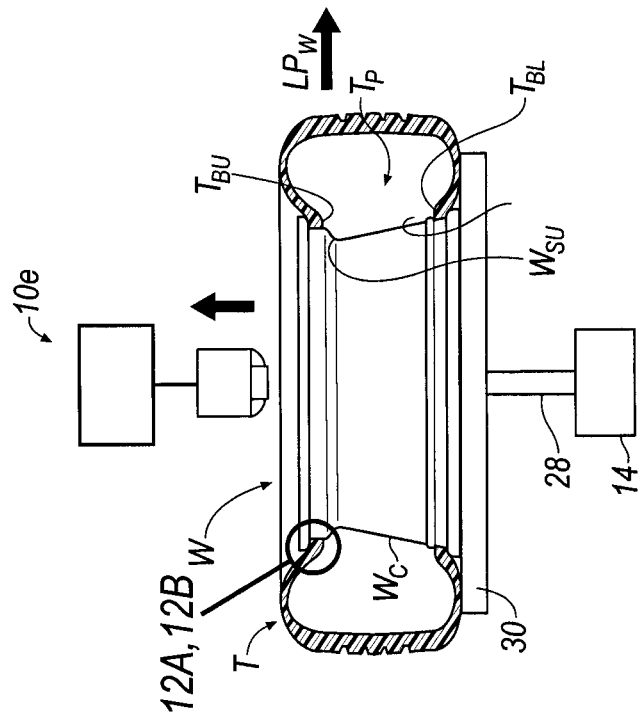
FIG. 2D is a top view of the apparatus according to line 2D-2D of FIG. 1D.
Figure 2D:
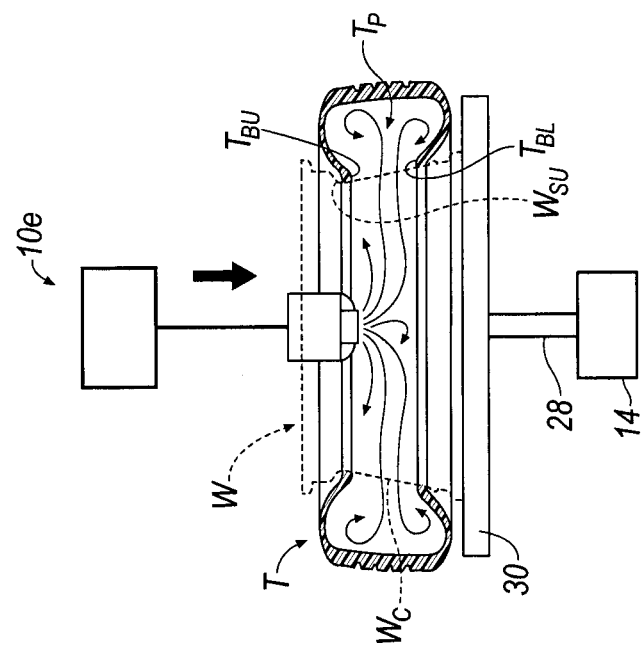

Referring to FIGS. 1D, 2D and 2D'-2D'', the non-inflated tire-wheel assembly, TW, is advanced to the inflating sub-station 10e by the wheel transporting device 30. As explained above, the inflating sub-station 10e may engage the non-inflated tire-wheel assembly, TW, and perform the act of inflating the non-inflated tire-wheel assembly, TW, in order to direct air into the circumferential air cavity, $T_{AC}$, of the tire, T, of the non-inflated tire-wheel assembly, TW. As a result of the act of inflating conducted by the inflating sub-station 10e, the upper bead, $T_{BU}$, and the lower bead, $T_{BL}$, of the tire, T, may be disposed (or "seated") adjacent the upper bead seat, $W_{SU}$, and the lower bead seat, $W_{SL}$, of the wheel, W, such that the non-inflated tire-wheel assembly, TW, may now be referred to as an inflated tire-wheel assembly, TW.

Figure 12B:
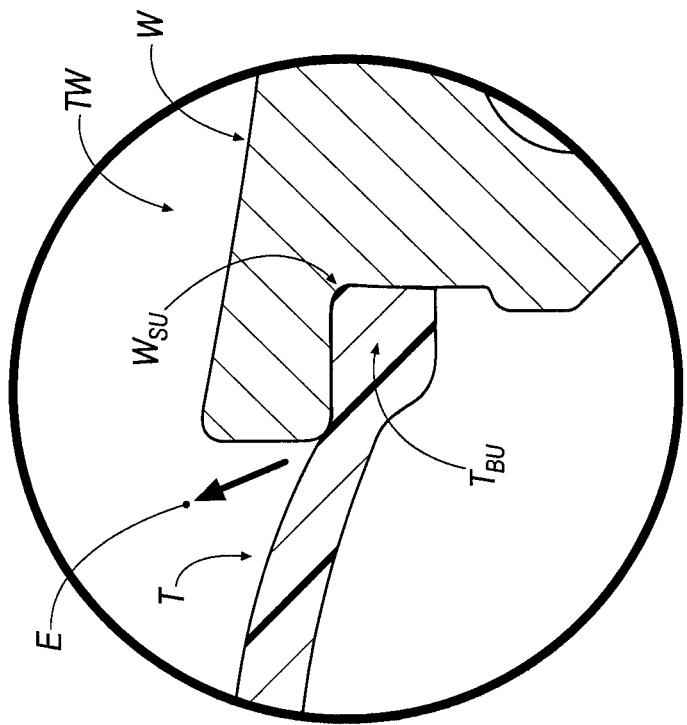
FIG. 12B is another enlarged, cross-sectional view of the inflated tire-wheel assembly of FIG. 12A without with entrapment according to line 12A, 12B of FIGS. 2D'', 4D'', 6E'' and 8E''.
Figure 12A:
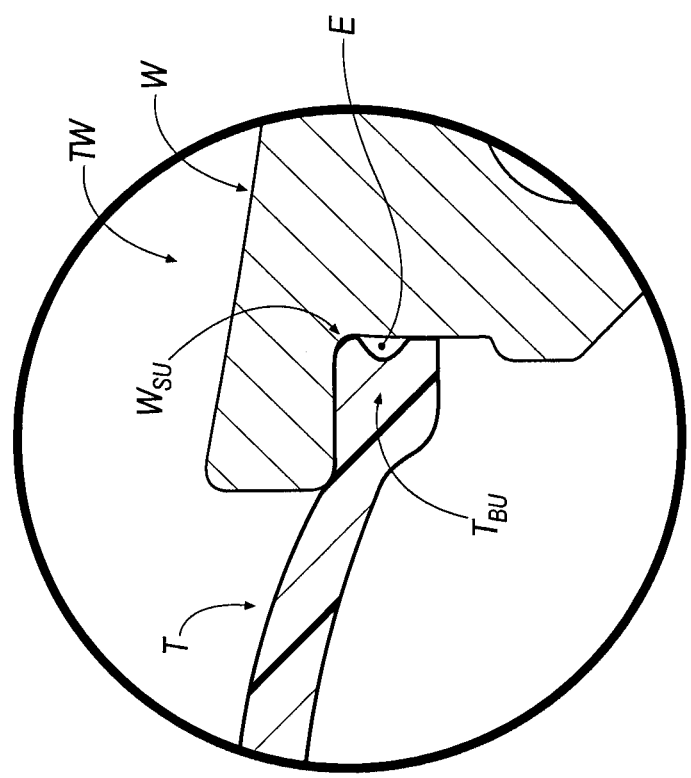
FIG. 12A is an enlarged, cross-sectional view of a portion of an inflated tire-wheel assembly including an entrapment according to line 12A, 12B of FIGS. 2D'', 4D'', 6E'' and 8E''

Once the tire-wheel assembly, TW, is inflated at the inflating sub-station 10e, the inflated tire-wheel assembly, TW, is advanced by the wheel transporting device 30 to the sub-station 10f. The processing act conducted by the sub-station 10f may include the act of "exercising" the tire, T, relative the wheel, W, in order to fully seat the upper bead, $T_{BU}$, and the lower bead, $T_{BL}$, of the tire, T, adjacent the upper bead seat, $W_{SU}$, and the lower bead seat, $W_{SL}$, of the wheel, W, respectively. Accordingly, the inflating sub-station 10e may be referred to as an exercising sub-station. As explained above, in some circumstances, entrapments, E (see, e.g., FIG. 12A), such as, for example: air bubbles, lubricant/soap, impurities or the like may be undesirably located between a bead, $T_{BU}$, $T_{BL}$, of the tire, T, and the seat, $W_{SU}/W_{SL}$, of the wheel, W, after the inflating procedure conducted by the inflating sub-station 10e; by "exercising" (which may include the exercising sub-station contacting the inflated tire-wheel assembly, TW, and imparting one or more of the acts of vibrating, vacuuming, or the like to the inflated tire-wheel assembly, TW), the entrapments, E, may be removed/withdrawn (as seen in FIG. 12B in reference to FIG. 12A) from the inflated tire-wheel assembly, TW, such that one or more of the upper bead, $T_{BU}$, and the lower bead, $T_{BL}$, of the tire, T, may be fully seated adjacent one or more of the upper bead seat, $W_{SU}$, and the lower bead seat, $W_{SL}$, of the wheel, W.

Once the tire-wheel assembly, TW, is exercised at the exercising sub-station 10f, the inflated tire-wheel assembly, TW, is advanced by the wheel transporting device 30 to the sub-stations 10g and 10h. The processing act conducted by the sub-station 10g may include balancing the inflated tire-wheel assembly, TW. The processing act conducted by the substation 10h may include testing the uniformity of the balanced tire-wheel assembly, TW. The balancing and testing-of-uniformity acts may include determining the un/balance of the inflated tire-wheel assembly, TW, and adding one or more weights to the tire-wheel assembly, TW, until the inflated tire-wheel assembly, TW, is balanced. Any desirable balancing apparatus and uniformity testing apparatus may be utilized for carrying out the above-described processing steps at the sub-stations 10g, 10h.

Referring to FIGS. 3A-4A, an apparatus 100 including a plurality of processing sub-stations 110a-110h is shown according to an embodiment. Regarding the view of FIG. 4A, the sub-station 110b is represented in a top view but shown next to the sub-station 110a due to the fact that the sub-station 110a would obscure the sub-station 110b from a true top view representation.

The sub-station 110a may be utilized for preparing a tire, T, prior to a subsequent processing act conducted by one or more of the sub-stations 110c-110h for forming an tire-wheel assembly, TW. The "preparing" act conducted by the sub-station 110a may include lubricating the tire, T, with a lubricant (e.g., a soap) in order to reduce friction between the tire, T, and a wheel, W, during subsequent mounting steps at sub-stations 110c, 110d.

The sub-station 110b may be utilized for "preparing" a wheel, W, prior to a subsequent processing act conducted by one or more of the sub-stations 110c-110h for forming a tire-wheel assembly, TW. The "preparing" act conducted by the sub-station 110b may include lubricating the wheel, W, with a lubricant (e.g., a soap) in order to reduce friction between the wheel, W, and the tire, T, during subsequent mounting steps at sub-stations 110c, 110d.

The sub-stations 110c-110d may be utilized for processing a tire-wheel assembly, TW. The "processing" act conducted by the sub-stations 110c and 110d may include the act of "joining" or "mounting" a tire, T, to a wheel, W, for forming an un-inflated tire-wheel assembly, TW; the act of "joining" or "mounting" may mean to physically couple, connect or marry the tire, T, and wheel, W, such that the wheel, W, may be referred to as a male portion that is inserted into a passage, $T_P$, of the tire, T, being a female portion.

The "processing" act conducted by the sub-station 110e may include the act of "inflating" the tire-wheel assembly, TW; the act of "inflating" may include directing air into the circumferential air cavity, $T_{AC}$, of the tire, T, of the tire-wheel assembly, TW. As a result of the act of "inflating," the upper bead, $T_{BU}$, and the lower bead, $T_{BL}$, of the tire, T, may be disposed (or "seated") adjacent the upper bead seat, $W_{SU}$, and the lower bead seat, $W_{SL}$, of the wheel, W.

The "processing" act conducted by the sub-station 110f may include the act of "exercising" the tire, T, relative the wheel, W, in order to fully seat the upper bead, $T_{BU}$, and the lower bead, $T_{BL}$, of the tire, T, adjacent the upper bead seat, $W_{SU}$, and the lower bead seat, $W_{SL}$, of the wheel, W, respectively. In some circumstances, entrapments, E (see, e.g., FIG. 12A), such as, for example: air bubbles, lubricant/soap, impurities or the like may be undesirably located between a bead, $T_{BU}$/$T_{BL}$, of the tire, T, and the seat, $W_{SU}$/$W_{SL}$, of the wheel, W; by "exercising" (which may include one or more of the acts of vibrating, vacuuming, or the like) one or more of the tire, T, and the wheel, W, the entrapments, E, may be removed/withdrawn from the tire-wheel assembly, TW, such that one or more of the upper bead, $T_{BU}$, and the lower bead, $T_{BL}$, of the tire, T, may be fully seated adjacent one or more of the upper bead seat, $W_{SU}$, and the lower bead seat, $W_{SL}$, of the wheel, W.

The "processing" act conducted by the sub-station 110g may include balancing the inflated tire-wheel assembly, TW. The "processing" act conducted by the substation 110h may include testing the uniformity of the balanced tire-wheel assembly, TW. The balancing and testing-of-uniformity acts may include determining the un/balance of the inflated tire-wheel assembly, TW, and adding one or more weights to the tire-wheel assembly, TW, until the inflated tire-wheel assembly, TW, is balanced. Any desirable balancing apparatus and uniformity testing apparatus may be utilized for carrying out the above-described processing steps at the sub-stations 110g, 110h.

Referring now to FIGS. 3A-4A, an embodiment of the invention is described. The tire, T, and the wheel, W, are moved in one direction (i.e., according to the illustrated embodiment, in a forwardly/rightwardly direction, R). The wheel, W, for example, may move along a linear path, $LP_W$, from the sub-station 110b to the sub-station 110c-110h. The tire, T, may also move along a linear path, $LP_T$, from the sub-station 110a to the sub-station 110c; however, the linear path of the tire, T, intersects with and merges into the linear path, $LP_W$, of the wheel, W, by way of the sub-station 110c (see, e.g., FIG. 3B). As a result of the generally linear movement of the tire, T, and the wheel, W, at least a portion (see, e.g., sub-stations 110c, 110d) of the apparatus 100 may be referred to as a "linear mounter."

The apparatus 100 may be operated automatically or manually according to the following implementations. In some embodiments, the apparatus 100 may include a controller 112 (e.g., a computer including one or more of a processor, memory or the like to permit automatic/automated control over the apparatus 100) and one or more motors 114 for actuating and/or causing movement of one or more components of the sub-stations 110a-110h. The controller 112 may be connected to the one or motors 114 by one or more cable or leads 116. The one or more motors 114 may be connected to the one or more sub-stations 110a-110h by one or more cables or leads 118. Alternatively or in addition to automatic/automated operation by the controller 112, operation of the apparatus 100 may result from one or more of a manual, operator input (e.g., by way of a joystick, depression of a button or the like).

As seen in FIGS. 3A and 4A, the sub-station 110a prepares the tire, T, by depositing a lubricant or soap upon the tire, T; accordingly, in an embodiment, the sub-station 110a may be referred to as a tire lubricating sub-station. The tire lubricating sub-station 110a may include a dispenser 120 that sprays or wipes the lubricant or soap upon one or more regions of the tire, T, such as, for example, the upper bead, $T_{BU}$, and the lower bead, $T_{BL}$, of the tire, T. The tire lubricating sub-station 110a may also include one or more tire rotating devices 122 for rotating the tire, T, during the lubricating step for the purpose of lubricating one or more regions of the tire, T, that may not be in the spraying direction or coating reach of the dispenser 120.

The tire lubricating sub-station 110a may also include a tire transporting device 124 for moving the tire, T, along the linear path, $LP_T$, from the tire lubricating sub-station 110a to the substation 110c. The dispenser 120 and the one or more tire rotating devices 122 may be attached to and extend away from the tire transporting device 124.

Referring to FIG. 4A, the tire transporting device 124 may include a central conveyor portion 124a (such as, for example, a conveyor belt) that is flanked by support members 124b. The dispenser 120 and the one or more tire rotating devices 122 are attached to and extend away from the support members 124b.

As seen in FIGS. 3A and 4A, the sub-station 110b prepares the wheel, W, by depositing a lubricant or soap upon the wheel, W; accordingly, in an embodiment, the sub-station 110b may be referred to as a wheel lubricating sub-station. The wheel lubricating sub-station 110b may include a dispenser 126 that showers/sprays or wipes the lubricant or soap upon one or more regions of the wheel, W, such as, for example, the upper bead seat, $W_{SU}$, and the lower bead seat, $W_{SL}$, of the wheel, W. The wheel lubricating sub-station 110b may also include one or more wheel rotating devices 128 for rotating the wheel, W, during the lubricating step for the purpose of lubricating one or more regions of the wheel, W, that are not in the spraying direction or coating reach of the dispenser 126.

The wheel lubricating sub-station 110b may also include a wheel transporting device 130 such as, for example, a transporting platen or cart for moving the wheel, W, along the linear path, $LP_W$, from the wheel lubricating sub-station 110b to the sub-station 110c. The one or more tire rotating devices 128 may be attached to the wheel transporting device 130; in an embodiment, a motor 114 may be arranged underneath the wheel transporting device 130, and, the rotating device 128 may extend away from the motor 114 and through the wheel transporting device 130 such that a distal end (not shown) of the rotating device 128 may be attached to an inner periphery/inner circumference of the wheel, W. The dispenser 126 may be attached to and be suspended over the wheel, W, by a lower surface of the tire transporting device 124.

As seen in FIGS. 3B, 4B and 4B'-4B''', sub-station 110c is shown conducting a processing step that may be referred to as a first mounting step; therefore, the sub-substation 110c may be referred to as a first mounting sub-station 110c. Prior to describing an embodiment of the components of the first mounting sub-station 110c, the orientation of the first mounting sub-station 110c relative to the tire lubricating sub-station 110a and the wheel lubricating substation 110b is described according to an embodiment.

As described above in FIG. 3A, the tire lubricating sub-station 110a and the first mounting sub-station 110c generally define the linear path, $LP_T$, of the tire, T. The tire-lubricating sub-station 10a is connected to the first mounting sub-station 110c by a joint 132. Additionally, in an embodiment, both of the tire lubricating sub-station 110a and the first mounting sub-station 110c are arranged above the wheel lubricating sub-station 110b at a spaced-apart distance, $D_{100}$, such that the linear path, $LP_T$, of the tire, T, and the linear path, $LP_W$, of the wheel, W, are initially parallel and do not intersect with one another.

However, as seen in FIG. 3B, the controller 112 and motor 114 may communicate with the joint 132 in order to permit a portion of the linear path, $LP_T$, of the tire, T, defined by the first mounting sub-station 110c to be temporality interrupted such that the portion of the linear path, $LP_T$, of the tire, T, defined by the first mounting sub-station 110c intersects with the linear path, $LP_W$, of the wheel W. Because the linear paths, $LP_T$, $LP_W$, of each of the tire, T, and the wheel, W, intersect, and, because both of the tire, T, and the wheel, W, are moved in one/the same direction (that is forwardly/rightwardly, R), the tire, T, and the wheel, W, may be at least partially coupled/joined at the first mounting sub-station 110c. Further, as will be described in the following embodiment, the forwardly/rightwardly, R, movement imparted to the tire, T, and the wheel, W, results in the partial coupling/joining of the tire, T, and the wheel, W, without the assistance of spatially manipulatable mounting equipment, such as, for example a robotic arm that is joined to, for example, the wheel, W, which would spatially move and force the wheel, W, into the passage, $T_P$, of the tire, T.

Referring to FIGS. 3A-4B, the first mounting sub-station 110c includes a match-mark imaging camera 134, a microprocessor 136, a tire rotating device 138, a tire-linear-movement interference member 140 and a pair of tire lower sidewall surface support members 142 that are spaced apart by a width $142_W$ (see FIGS. 4A, 4B) that forms a gap 144 (see FIGS. 4A, 4B) between the tire sidewall support members 142. The joint 132 permits the tire sidewall support members 124b of the lubricating sub-station 110a to be removably-coupled to the support members 142 of the first mounting sub-station 110c such that the first mounting sub-station 110c may be lowered (i.e. moved toward) the wheel, W, which is arranged upon the wheel transporting device 130. The tire-linear-movement interference member 140 may be spaced-apart by a height, $140_H$, from the pair of tire lower sidewall surface support members 142; the height, $140_H$, is substantially equal to but less than the height, $T_H$, of the tire, T.

The tire rotating device 138 may include a plurality of roller members that extend away from approximately about a central portion of the upper surface of the tire lower sidewall surface support members 142. The tire-linear-movement interference member 140 may be located at and extend away from approximately about a distal end of the upper surface of the of the tire lower sidewall surface support members 142. The match-mark imaging camera 134 may be arranged above and over the tire lower sidewall surface support members 142. The microprocessor 136 is connected to the match-mark imaging camera 134. The microprocessor 136 is communicatively-coupled to the motor 114, and, the motor 114 is connected to the tire rotating device 138 (i.e., the microprocessor 136 is connected to the tire rotating device 138 by way of the motor 114).

Functionally, both of the tire, T, and the wheel, W, are advanced forwardly/rightwardly, R, at about the same speed such that the tire, T, and the wheel, W, arrive in a substantially axially-aligned orientation at the first mounting sub-station 110c prior to actuation of the joint 132 (for disconnecting the tire sidewall support members 124b of the lubricating sub-station 110a from the support members 142 of the first mounting sub-station 110c) by the controller 112 and the motor 114. The tire, T, may be advanced to and deposited upon the first mounting sub-station 110c as a result of the driving movement of the conveyor 124a, and, about concurrently, the wheel, W, may be advanced underneath the first mounting substation 110c by the wheel transporting device 130 in order to maintain substantially axial alignment of the wheel, W, with the tire, T.

When substantially all of the lower sidewall surface, $T_{SL}$, of the tire, T, is arranged upon the tire sidewall support members 142, the wheel, W, may be substantially axially-aligned with the tire, T, such that the wheel, W, is aligned with the gap 144 and is viewable through both of the gap 144 and the passage, $T_P$, of the tire, T, by the match-mark imaging camera 134.

Then, the match-mark imaging camera 134 obtains/images match-marks, $T_{MM}$, $W_{MM}$, of both of the tire, T, and the wheel, W. The imaged match-marks, $T_{MM}$, $W_{MM}$, of both of the tire, T, and the wheel, W, are then sent to and subsequently interpreted by the microprocessor 136. After interpreting the imaged match-marks, $T_{MM}$, $W_{MM}$, of both of the tire, T, and the wheel, W, the microprocessor 136 determines if and how much the tire, T, should be rotated by the tire rotating devices 138 in order to align the match-marks, $T_{MM}$, $W_{MM}$, of both of the tire, T, and the wheel, W. If the microprocessor 136 determines that the tire, T, should be rotated, the microprocessor 136 sends a signal to the motor 114, which, in turn causes/drives rotation of the tire rotating devices 138 in order to rotate the tire, T, for aligning the match-mark, $T_{MM}$, of the tire, T, with the match-mark, $W_{MM}$, of the wheel, W.

After the match-marks, $T_{MM}$, $W_{MM}$, of both of the tire, T, and the wheel, W, have been aligned, the controller 112 causes the motor 114 to actuate the joint 132, which causes the tire sidewall support members 124b of the lubricating sub-station 110a to disconnect from the support members 142 of the first mounting sub-station 110c, thereby disrupting the linear path, $LP_T$, of the tire, T, thereby causing the linear path, $LP_T$, of the tire, T, to intersect with the linear path, $LP_W$, of the wheel, W.

By utilizing the term "disconnecting" with respect to the tire sidewall support members 124b of the lubricating sub-station 110a and the support members 142 of the first mounting sub-station 110c, it should be understood that "disconnected" should mean "dis-linearly-connected" in that the tire sidewall support members 124b of the lubricating sub-station 110a and the support members 142 of the first mounting sub-station 110c are still connected. For example, the support members 124b of the first mounting sub-station 110c may function as an elevator for lowering the tire, T, toward the substantially axially-aligned wheel, W; therefore, although the illustrated embodiment of the invention shown at FIG. 3B may appear to communicate a "disconnecting" of the sub-stations 110a, 110c at the joint 132, the sub-station 110c may still be connected to the sub-station 110a but just not linearly-connected as seen in FIG. 3A.

Once the joint 132 has been actuated, the lower sidewall surface, $T_{LS}$, of the tire, T, should no longer be arranged upon the conveyor 124a, and, the conveyor 124a should impart sufficient forwardly/rightwardly movement, R, to the tire, T, such that one or more of the tread surface, $T_T$, and a portion of the upper sidewall surface, $T_{SU}$, of the tire, T, may be disposed adjacent the tire-linear-movement interference member 140. Further, once the joint 132 has been actuated, and, because the wheel, W, is substantially axially-aligned with the tire, T (and, due to the diameter, $W_D$, of the wheel, W, being approximately equal to but slightly less than the width $142_W$ that forms the gap 144 between the tire sidewall support members 142), a portion of the wheel, W, may be arranged within the passage, $T_P$, of the tire, T; referring to FIG. 4B', the portion of the wheel, W, arranged within the passage, $T_P$, of the tire, T, may also result in a portion of the outer circumferential surface, $W_C$, of the wheel, W, proximate the upper bead seat, $W_{SU}$, being arranged adjacent the lower bead, $T_{BL}$, of the tire, T.

Referring to FIGS. 4B' and 4B'', as the wheel, W, is advanced forwardly/rightwardly, R, along the linear path, $LP_W$, of the wheel, W, by the wheel transporting device 130, the contact of the wheel, W, with the tire, T, results in the wheel, W, imparting movement to the tire, T, forwardly/rightwardly, R, along the linear path, $LP_W$, of the wheel, W. Although the wheel, W, imparts the movement to the tire, T, in the forwardly/rightwardly, R, direction along the linear path, $LP_W$, of the wheel, W, the tire-linear-movement interference member 140 resists, but does not prevent, movement of the tire, T, in the forwardly/rightwardly, R, direction along the linear path, $LP_W$, of the wheel, W; accordingly, as seen in FIG. 4B'', 4B''', the tire-linear-movement interference member 140 temporarily deforms the tire, T, which results in the tire, T, being spatially manipulated about the wheel, W (such that, e.g., the chords, $T_{C1}$, $T_{C2}/T_D$, $T_{C3}$, of the tire, T, are temporarily upset (i.e., expanded)), in order to permit the lower bead, $T_{BL}$, of the tire, T, to be wrapped about the outer circumferential surface, $W_C$, of the wheel, W, in order to partially join/mount the tire, T, to the wheel, W, as seen in FIG. 41B'''. The wheel transporting device 130 also includes a wheel-retaining member (not shown) that counteracts the resistance imparted to the tire, T, by the tire-linear-movement interference member 140, which would otherwise be imparted to the wheel, W, in order to permit both of the tire, T, and the wheel, W, to continued forwardly/rightwardly, R, movement along the linear path, $LP_W$, of the wheel, W. Once the tire, T, is completely passed by the tire-linear-movement interference member 140 as seen in FIG. 4B''', the tire, T, deforms back into its at-rest/unbiased orientation prior to contacting the tire-linear-movement interference member 140 and is partially joined/mounted to the wheel, W; further, as seen in FIG. 4B''', the upper bead, $T_{BU}$, may be disposed over/adjacent the upper rim surface, $W_{RU}$, of the wheel, W.

Referring to FIGS. 3C, 4C and 4C'-4C''', once the tire, T, is partially joined/mounted to the wheel, W, as described above, the wheel transporting device 130 continues to move both of the wheel, W, and the tire, T, along the linear path, $LP_W$, of the wheel, W, in the forwardly/rightwardly direction, R, toward the sub-station 110d. The sub-station 110d is shown conducting a processing step that may be referred to as a second mounting step; therefore, the sub-substation 110d may be referred to as a second mounting sub-station 110d.

As seen in FIGS. 3C and 4C, the second mounting sub-station 110d may include parallel support members 146 defining a gap 148. The transporting device 130 is movably-arranged within the gap 148 along the linear path, $LP_W$, of the wheel, W. The second mounting sub-station 110d may further comprise a pair of tire-linear-movement interference members 150 and one or more tire-tread-surface-contacting guide members 152 connected to and extending away from each support member defining the parallel support members 146. Like the tire-linear-movement interference member 140, the two pairs of tire-linear-movement interference members 150 may be spaced-apart by a height, $150_H$ (see FIG. 3C), from the parallel support members 146; the height, $150_H$, is substantially equal to but less than the height, $T_H$, of the tire, T.

Referring to FIGS. 4C' and 4C'', as the tire, T, and the wheel, W, are advanced forwardly/rightwardly, R, along the linear path, $LP_W$, of the wheel, W, by the wheel transporting device 130, the two pairs of tire-linear-movement interference members 150 of the second mounting sub-station 110d may come into contact with and resists, but does not prevent, movement of the tire, T, as the tire, T, is carried upon the wheel, W, in the forwardly/rightwardly, R, direction along the linear path, $LP_W$, of the wheel, W.

As the tire, T, is moved past the two pairs of tire-linear-movement interference members 150, the two pairs of tire-linear-movement interference members 150 are brought into contact with the upper sidewall surface, $T_{SU}$, of the tire, T; when the two pairs of tire-linear-movement interference members 150 come into contact with the upper sidewall surface, $T_{SU}$, of the tire, T, the two pairs of tire-linear-movement interference members 150 exerts a downwardly force upon the tire, T, thereby temporarily deforming the tire, T, which results in the tire, T, being spatially manipulated about the wheel, W (such that, e.g., the chords, $T_{C1}$, $T_{C2}/T_D$, $T_{C3}$, of the tire, T, are temporarily upset (i.e., expanded)), in order to permit the upper bead, $T_{BU}$, of the tire, T, to be wrapped about the outer circumferential surface, $W_C$, of the wheel, W, in order to complete the joining/mounting of the tire, T, to the wheel, W, as seen in FIG. 4C''' (due to both of the upper bead, $T_{BU}$, and the lower bead, $T_{BL}$, of the tire, T, being wrapped about the entire outer circumferential surface, $W_C$, of the wheel, W). During the temporary deforming process of the tire, T, as described above, the one or more tire-tread-surface-contacting guide members 152 may engage the tread surface, $T_T$, of the tire, T, in order to assist in maintaining a substantially equal distribution of forces applied to the tire, T, as the tire, T, is advanced by the wheel, W, along the linear path, $LP_W$, of the wheel, W.

As explained above, the wheel transporting device 130 also includes a wheel-retaining member (not shown) that counteracts the resistance imparted to the tire, T, by the two pairs of tire-linear-movement interference members 150, which would otherwise be imparted to the wheel, W, in order to permit both of the tire, T, and the wheel, W, to continued forwardly/rightwardly, R, along the linear path, $LP_W$, of the wheel, W. Once the tire, T, is completely passed by the two pairs of tire-linear-movement interference members 150 as seen in FIG. 4C''', the tire, T, deforms back into its substantially at-rest/substantially unbiased orientation prior to contacting the two pairs of tire-linear-movement interference members 150 such that the tire, T, may be said to be mounted to the wheel, W, thereby forming a non-inflated tire-wheel assembly, TW.

Figure 3D:
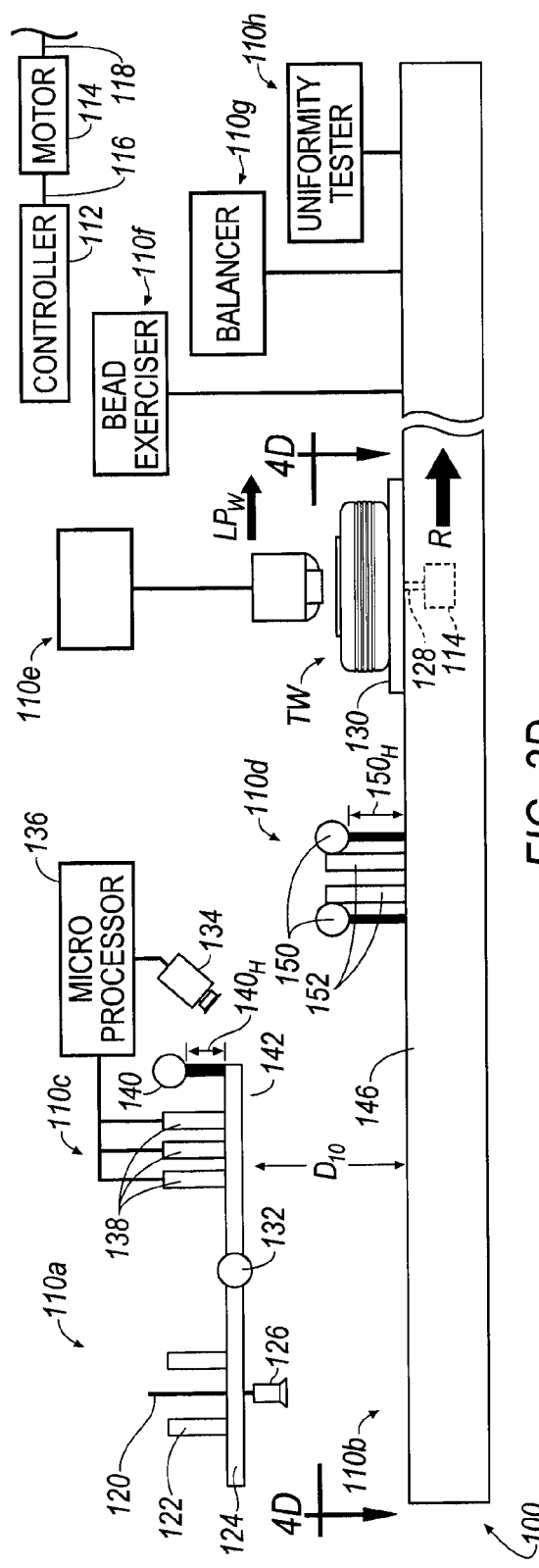
FIG. 3D is another side view of the apparatus of FIG. 3C for processing a tire and a wheel in accordance with an exemplary embodiment of the invention.
Figure 4D:
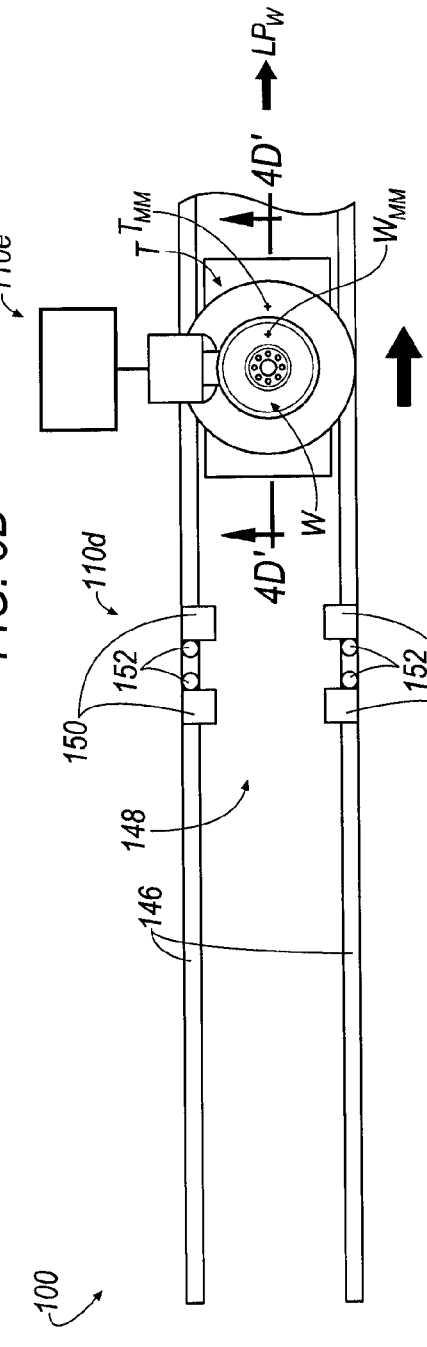
FIG. 4D is a top view of the apparatus according to line 4D-4D of FIG. 3D.
Figure 4D:
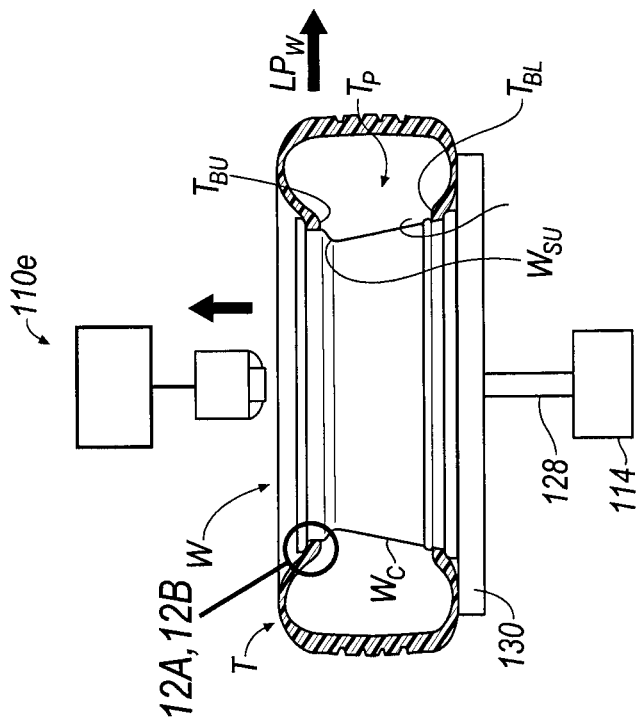
Figure 4D:
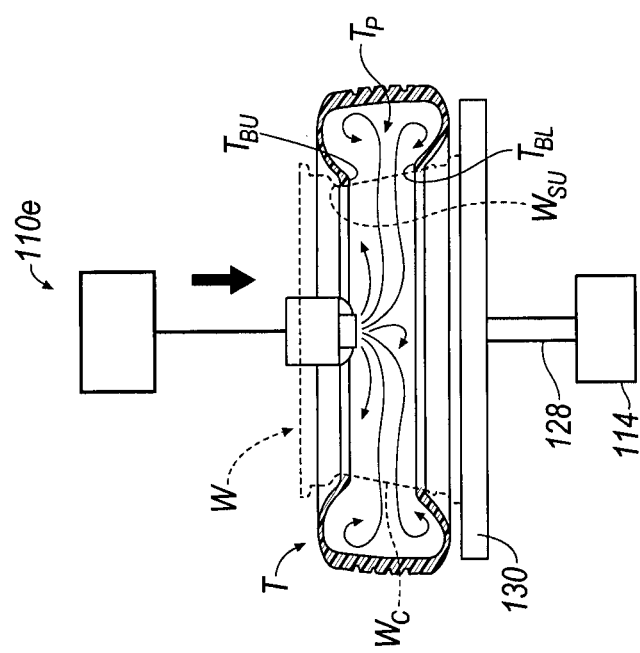

Referring to FIGS. 3D, 4D and 4D'-4D'', the non-inflated tire-wheel assembly, TW, is advanced to the inflating sub-station 110e by the wheel transporting device 130. As explained above, the inflating sub-station 110e may engage the non-inflated tire-wheel assembly, TW, and perform the act of inflating the non-inflated tire-wheel assembly, TW, in order to direct air into the circumferential air cavity, $T_{AC}$, of the tire, T, of the non-inflated tire-wheel assembly, TW. As a result of the act of inflating conducted by the inflating sub-station 110e, the upper bead, $T_{BU}$, and the lower bead, $T_{BL}$, of the tire, T, may be disposed (or "seated") adjacent the upper bead seat, $W_{SU}$, and the lower bead seat, $W_{SL}$, of the wheel, W, such that the non-inflated tire-wheel assembly, TW, may now be referred to as an inflated tire-wheel assembly, TW.

Once the tire-wheel assembly, TW, is inflated at the inflating sub-station 110e, the inflated tire-wheel assembly, TW, is advanced by the wheel transporting device 130 to the sub-station 110f. The processing act conducted by the sub-station 110f may include the act of "exercising" the tire, T, relative the wheel, W, in order to fully seat the upper bead, $T_{BU}$, and the lower bead, $T_{BL}$, of the tire, T, adjacent the upper bead seat, $W_{SU}$, and the lower bead seat, $W_{SL}$, of the wheel, W, respectively. Accordingly, the inflating sub-station 110e may be referred to as an exercising sub-station. As explained above, in some circumstances, entrapments, E (see, e.g., FIG. 12A), such as, for example: air bubbles, lubricant/soap, impurities or the like may be undesirably located between a bead, $T_{BU}/T_{BL}$, of the tire, T, and the seat, $W_{SU}/W_{SL}$, of the wheel, W, after the inflating procedure conducted by the inflating sub-station 110e; by "exercising" (which may include the exercising sub-station contacting the inflated tire-wheel assembly, TW, and imparting one or more of the acts of vibrating, vacuuming, or the like to the inflated tire-wheel assembly, TW), the entrapments, E, may be removed/withdrawn (as seen in FIG. 12B in reference to FIG. 12A) from the inflated tire-wheel assembly, TW, such that one or more of the upper bead, $T_{BU}$, and the lower bead, $T_{BL}$, of the tire, T, may be fully seated adjacent one or more of the upper bead seat, $W_{SU}$, and the lower bead seat, $W_{SL}$, of the wheel, W.

Once the tire-wheel assembly, TW, is exercised at the exercising sub-station 110f, the inflated tire-wheel assembly, TW, is advanced by the wheel transporting device 130 to the sub-stations 110g and 110h. The processing act conducted by the sub-station 110g may include balancing the inflated tire-wheel assembly, TW. The processing act conducted by the substation 110h may include testing the uniformity of the balanced tire-wheel assembly, TW. The balancing and testing-of-uniformity acts may include determining the un/balance of the inflated tire-wheel assembly, TW, and adding one or more weights to the tire-wheel assembly, TW, until the inflated tire-wheel assembly, TW, is balanced. Any desirable balancing apparatus and uniformity testing apparatus may be utilized for carrying out the above-described processing steps at the sub-stations 110g, 110h.

Referring to FIGS. 5A-6A, an apparatus 200 including a plurality of processing sub-stations 210a-210h is shown according to an embodiment. Regarding the view of FIG. 6A, the sub-station 210b is represented in a top view but shown next to the sub-station 210a due to the fact that the sub-station 210a would obscure the sub-station 210b from a true top view representation.

The sub-station 210a may be utilized for preparing a tire, T, prior to a subsequent processing act conducted by one or more of the sub-stations 210c-210h for forming an tire-wheel assembly, TW. The "preparing" act conducted by the sub-station 210a may include lubricating the tire, T, with a lubricant (e.g., a soap) in order to reduce friction between the tire, T, and a wheel, W, during subsequent mounting steps at sub-stations 210c, 210d.

The sub-station 210b may be utilized for "preparing" a wheel, W, prior to a subsequent processing act conducted by one or more of the sub-stations 210c-210h for forming a tire-wheel assembly, TW. The "preparing" act conducted by the sub-station 210b may include lubricating the wheel, W, with a lubricant (e.g., a soap) in order to reduce friction between the wheel, W, and the tire, T, during subsequent mounting steps at sub-stations 210c, 210d.

The sub-stations 210c-210d may be utilized for processing a tire-wheel assembly, TW. The "processing" act conducted by the sub-stations 210c and 210d may include the act of "joining" or "mounting" a tire, T, to a wheel, W, for forming an un-inflated tire-wheel assembly, TW; the act of "joining" or "mounting" may mean to physically couple, connect or marry the tire, T, and wheel, W, such that the wheel, W, may be referred to as a male portion that is inserted into a passage, $T_P$, of the tire, T, being a female portion.

The "processing" act conducted by the sub-station 210e may include the act of "inflating" the tire-wheel assembly, TW; the act of "inflating" may include directing air into the circumferential air cavity, $T_{AC}$, of the tire, T, of the tire-wheel assembly, TW. As a result of the act of "inflating," the upper bead, $T_{BU}$, and the lower bead, $T_{BL}$, of the tire, T, may be disposed (or "seated") adjacent the upper bead seat, $W_{SU}$, and the lower bead seat, $W_{SL}$, of the wheel, W.

The "processing" act conducted by the sub-station 210f may include the act of "exercising" the tire, T, relative the wheel, W, in order to fully seat the upper bead, $T_{BU}$, and the lower bead, $T_{BL}$, of the tire, T, adjacent the upper bead seat, $W_{SU}$, and the lower bead seat, $W_{SL}$, of the wheel, W, respectively. In some circumstances, entrapments, E (see, e.g., FIG. 12A), such as, for example: air bubbles, lubricant/soap, impurities or the like may be undesirably located between a bead, $T_{BU}$, $T_{BL}$, of the tire, T, and the seat, $W_{SU}$, $W_{SL}$, of the wheel, W; by "exercising" (which may include one or more of the acts of vibrating, vacuuming, or the like) one or more of the tire, T, and the wheel, W, the entrapments, E, may be removed/withdrawn from the tire-wheel assembly, TW, such that one or more of the upper bead, $T_{BU}$, and the lower bead, $T_{BL}$, of the tire, T, may be fully seated adjacent one or more of the upper bead seat, $W_{SU}$, and the lower bead seat, $W_{SL}$, of the wheel, W.

The "processing" act conducted by the sub-station 210g may include balancing the inflated tire-wheel assembly, TW. The "processing" act conducted by the substation 210h may include testing the uniformity of the balanced tire-wheel assembly, TW. The balancing and testing-of-uniformity acts may include determining the un/balance of the inflated tire-wheel assembly, TW, and adding one or more weights to the tire-wheel assembly, TW, until the inflated tire-wheel assembly, TW, is balanced. Any desirable balancing apparatus and uniformity testing apparatus may be utilized for carrying out the above-described processing steps at the sub-stations 210g, 210h.

Referring now to FIGS. 5A-6A, an embodiment of the invention is described. The tire, T, and the wheel, W, are moved in one direction (i.e., according to the illustrated embodiment, in a forwardly/rightwardly direction, R). The wheel, W, for example, may move along a linear path, $LP_W$, from the sub-station 210b to the sub-station 210c-210h. The tire, T, may also move along a linear path, $LP_T$, from the sub-station 210a to the sub-station 210c; however, the linear path of the tire, T, intersects with and merges into the linear path, $LP_W$, of the wheel, W, by way of the sub-station 10c (see, e.g., FIG. 5B). As a result of the generally linear movement of the tire, T, and the wheel, W, at least a portion (see, e.g., sub-stations 210c, 210d) of the apparatus 200 may be referred to as a "linear mounter."

The apparatus 200 may be operated automatically or manually according to the following implementations. In some embodiments, the apparatus 200 may include a controller 212 (e.g., a computer including one or more of a processor, memory or the like to permit automatic/automated control over the apparatus 200) and one or more motors 214 for actuating and/or causing movement of one or more components of the sub-stations 210a-210h. The controller 212 may be connected to the one or motors 214 by one or more cable or leads 216. The one or more motors 214 may be connected to the one or more sub-stations 210a-210h by one or more cables or leads 218. Alternatively or in addition to automatic/automated operation by the controller 212, operation of the apparatus 200 may result from one or more of a manual, operator input (e.g., by way of a joystick, depression of a button or the like).

As seen in FIGS. 5A and 6A, the sub-station 210a prepares the tire, T, by depositing a lubricant or soap upon the tire, T; accordingly, in an embodiment, the sub-station 210a may be referred to as a tire lubricating sub-station. The tire lubricating sub-station 210a may include a dispenser 220 that sprays or wipes the lubricant or soap upon one or more regions of the tire, T, such as, for example, the upper bead, $T_{BU}$, and the lower bead, $T_{BL}$, of the tire, T. The tire lubricating sub-station 210a may also include one or more tire rotating devices 222 for rotating the tire, T, during the lubricating step for the purpose of lubricating one or more regions of the tire, T, that may not be in the spraying direction or coating reach of the dispenser 220.

The tire lubricating sub-station 210a may also include a tire transporting device 224 for moving the tire, T, along the linear path, $LP_T$, from the tire lubricating sub-station 210a to the substation 210c. The dispenser 220 and the one or more tire rotating devices 222 may be attached to and extend away from the tire transporting device 224.

Referring to FIG. 6A, the tire transporting device 224 may include a central conveyor portion 224a (such as, for example, a conveyor belt) that is flanked by support members 224b. The dispenser 220 and the one or more tire rotating devices 222 are attached to and extend away from the support members 224b.

As seen in FIGS. 5A and 6A, the sub-station 210b prepares the wheel, W, by depositing a lubricant or soap upon the wheel, W; accordingly, in an embodiment, the sub-station 210b may be referred to as a wheel lubricating sub-station. The wheel lubricating sub-station 210b may include a dispenser 226 that showers/sprays or wipes the lubricant or soap upon one or more regions of the wheel, W, such as, for example, the upper bead seat, $W_{SU}$, and the lower bead seat, $W_{SL}$, of the wheel, W. The wheel lubricating sub-station 210b may also include one or more wheel rotating devices 228 for rotating the wheel, W, during the lubricating step for the purpose of lubricating one or more regions of the wheel, W, that are not in the spraying direction or coating reach of the dispenser 226.

The wheel lubricating sub-station 210b may also include a wheel transporting device 230 such as, for example, a transporting platen or cart for moving the wheel, W, along the linear path, $LP_W$, from the wheel lubricating sub-station 210b to the sub-station 210c. The one or more tire rotating devices 228 may be attached to the wheel transporting device 230; in an embodiment, a motor 214 may be arranged underneath the wheel transporting device 230, and, the rotating device 228 may extend away from the motor 214 and through the wheel transporting device 230 such that a distal end (not shown) of the rotating device 228 may be attached to an inner periphery/inner circumference of the wheel, W. The dispenser 226 may be attached to and be suspended over the wheel, W, by a lower surface of the tire transporting device 224.

As seen in FIGS. 5B, 6B and 6B'-6B''', sub-station 210c is shown conducting a processing step that may be referred to as a first mounting step; therefore, the sub-substation 210c may be referred to as a first mounting sub-station 210c. Prior to describing an embodiment of the components of the first mounting sub-station 210c, the orientation of the first mounting sub-station 210c relative to the tire lubricating sub-station 210a and the wheel lubricating substation 210b is described according to an embodiment.

As described above in FIG. 5A, the tire lubricating sub-station 210a and the first mounting sub-station 210c generally define the linear path, $LP_T$, of the tire, T. The tire-lubricating sub-station 210a is connected to the first mounting sub-station 210c by a pivot joint 232. Additionally, in an embodiment, both of the tire lubricating sub-station 210a and the first mounting sub-station 210c are arranged above the wheel lubricating sub-station 210b at a spaced-apart distance, $D_{200}$, such that the linear path, $LP_T$, of the tire, T, and the linear path, $LP_W$, of the wheel, W, are initially parallel and do not intersect with one another.

However, as seen in FIG. 5B, the controller 212 and motor 214 may communicate with the pivot joint 232 in order to permit a portion of the linear path, $LP_T$, of the tire, T, defined by the first mounting sub-station 210c to be temporality interrupted such that the portion of the linear path, $LP_T$, of the tire, T, defined by the first mounting sub-station 210c intersects with the linear path, $LP_W$, of the wheel W. Because the linear paths, $LP_T$, $LP_W$, of each of the tire, T, and the wheel, W, intersect, and, because both of the tire, T, and the wheel, W, are moved in one/the same direction (that is forwardly/rightwardly, R), the tire, T, and the wheel, W, may be at least partially coupled/joined at the first mounting sub-station 210c. Further, as will be described in the following embodiment, the forwardly/rightwardly, R, movement imparted to the tire, T, and the wheel, W, results in the partial coupling/joining of the tire, T, and the wheel, W, without the assistance of spatially manipulatable mounting equipment, such as, for example a robotic arm that is joined to, for example, the wheel, W, which would spatially move and force the wheel, W, into the passage, $T_P$, of the tire, T.

Referring to FIGS. 5A-6B, the first mounting sub-station 210c includes a match-mark imaging camera 234, a microprocessor 236, a tire rotating device 238, a tire-linear-movement interference member 240 and a pair of tire lower sidewall surface support members 242 that are spaced apart by a width $242_W$ (see FIGS. 6A, 6B) that forms a gap 244 (see FIGS. 6A, 6B) between the tire sidewall support members 242. The pivot joint 232 pivotally connects the tire sidewall support members 224b of the lubricating sub-station 210a to the support members 242 of the first mounting sub-station 210c. The tire-linear-movement interference member 240 may be spaced-apart by a height, $240_H$, from the pair of tire lower sidewall surface support members 242; the height, $240_H$, is substantially equal to but less than the height, $T_H$, of the tire, T.

The tire rotating device 238 may include a plurality of roller members that extend away from approximately about a central portion of the upper surface of the tire lower sidewall surface support members 242. The tire-linear-movement interference member 240 may be located at and extend away from approximately about a distal end of the upper surface of the of the tire lower sidewall surface support members 242. The match-mark imaging camera 234 may be arranged above and over the tire lower sidewall surface support members 242. The microprocessor 236 is connected to the match-mark imaging camera 234. The microprocessor 236 is communicatively-coupled to the motor 214, and, the motor 214 is connected to the tire rotating device 238 (i.e., the microprocessor 236 is connected to the tire rotating device 238 by way of the motor 214).

Functionally, both of the tire, T, and the wheel, W, are advanced forwardly/rightwardly, R, at about the same speed such that the tire, T, and the wheel, W, arrive in a substantially axially-aligned orientation at the first mounting sub-station 210c prior to actuation of the pivot joint 232 by the controller 212 and the motor 214. The tire, T, may be advanced to and deposited upon the first mounting sub-station 210c as a result of the driving movement of the conveyor 224a, and, about concurrently, the wheel, W, may be advanced underneath the first mounting substation 210c by the wheel transporting device 230 in order to maintain substantially axial alignment of the wheel, W, with the tire, T.

When substantially all of the lower sidewall surface, $T_{SL}$, of the tire, T, is arranged upon the tire sidewall support members 242, the wheel, W, may be substantially axially-aligned with the tire, T, such that the wheel, W, is aligned with the gap 244 and is viewable through both of the gap 244 and the passage, $T_P$, of the tire, T, by the match-mark imaging camera 234.

Then, the match-mark imaging camera 234 obtains/images match-marks, $T_{MM}$, $W_{MM}$, of both of the tire, T, and the wheel, W. The imaged match-marks, $T_{MM}$, $W_{MM}$, of both of the tire, T, and the wheel, W, are then sent to and subsequently interpreted by the microprocessor 236. After interpreting the imaged match-marks, $T_{MM}$, $W_{MM}$, of both of the tire, T, and the wheel, W, the microprocessor 236 determines if and how much the tire, T, should be rotated by the tire rotating devices 238 in order to align the match-marks, $T_{MM}$, $W_{MM}$, of both of the tire, T, and the wheel, W. If the microprocessor 236 determines that the tire, T, should be rotated, the microprocessor 236 sends a signal to the motor 214, which, in turn causes/drives rotation of the tire rotating devices 238 in order to rotate the tire, T, for aligning the match-mark, $T_{MM}$, of the tire, T, with the match-mark, $W_{MM}$, of the wheel, W.

After the match-marks, $T_{MM}$, $W_{MM}$, of both of the tire, T, and the wheel, W, have been aligned, the controller 212 causes the motor 214 to actuate the pivot joint 232, which causes the tire sidewall support members 242 to pivot relative to and no longer be linearly-aligned with the support members 224b, thereby disrupting the linear path, $LP_T$, of the tire, T, thereby causing the linear path, $LP_T$, of the tire, T, to intersect with the linear path, $LP_W$, of the wheel, W.

Once the pivot joint 232 has been actuated, the lower sidewall surface, $T_{LS}$, of the tire, T, should no longer be arranged upon the conveyor 224a, and, with the assistance of gravity, one or more of the tread surface, $T_T$, and a portion of the upper sidewall surface, $T_{SU}$, of the tire, T, may be disposed adjacent the tire-linear-movement interference member 240 in order to, in part, prevent the tire, T, from sliding off of the tire sidewall support members 242. Further, once the pivot joint 232 has been actuated, and, because the wheel, W, is substantially axially-aligned with the tire, T (and, due to the diameter, $W_D$, of the wheel, W, being approximately equal to but slightly less than the width 242w that forms the gap 244 between the tire sidewall support members 242), a portion of the wheel, W, may be arranged within the passage, $T_P$, of the tire, T; referring to FIG. 6B', the portion of the wheel, W, arranged within the passage, $T_P$, of the tire, T, may also result in a portion of the outer circumferential surface, $W_C$, of the wheel, W, proximate the upper bead seat, $W_{SU}$, being arranged adjacent the lower bead, $T_{BL}$, of the tire, T.

Referring to FIGS. 6B' and 6B'', as the wheel, W, is advanced forwardly/rightwardly, R, along the linear path, $LP_W$, of the wheel, W, by the wheel transporting device 230, the contact of the wheel, W, with the tire, T, results in the wheel, W, imparting movement to the tire, T, forwardly/rightwardly, R, along the linear path, $LP_W$, of the wheel, W. Although the wheel, W, imparts the movement to the tire, T, in the forwardly/rightwardly, R, along the linear path, $LP_W$, of the wheel, W, the tire-linear-movement interference member 240 resists, but does not prevent, movement of the tire, T, in the forwardly/rightwardly, R, along the linear path, $LP_W$, of the wheel, W; accordingly, as seen in FIG. 6B'', 6B''', the tire-linear-movement interference member 240 temporarily deforms the tire, T, which results in the tire, T, being spatially manipulated about the wheel, W (such that, e.g., the chords, $T_{C1}$, $T_{C2}/T_D$, $T_{C3}$, of the tire, T, are temporarily upset (i.e., expanded)), in order to permit the lower bead, $T_{BL}$, of the tire, T, to be wrapped about the outer circumferential surface, $W_C$, of the wheel, W, in order to partially join/mount the tire, T, to the wheel, W, as seen in FIG. 6B'''. The wheel transporting device 230 also includes a wheel-retaining member (not shown) that counteracts the resistance imparted to the tire, T, by the tire-linear-movement interference member 240, which would otherwise be imparted to the wheel, W, in order to permit both of the tire, T, and the wheel, W, to continued forwardly/rightwardly, R, movement along the linear path, $LP_W$, of the wheel, W. Once the tire, T, is completely passed by the tire-linear-movement interference member 240 as seen in FIG. 6B''', the tire, T, deforms back into its at-rest/unbiased orientation prior to contacting the tire-linear-movement interference member 240 and is partially joined/mounted to the wheel, W; further, as seen in FIG. 6B''', the upper bead, $T_{BU}$, may be disposed over/adjacent the upper rim surface, $W_{RU}$, of the wheel, W.

In some implementations, one or more tire orientation changing members 254 may be connected to parallel support members 246 (that form part of the second mounting sub-station 210d). The one or more tire orientation changing members 254 may be referred to as "kickers" due to the "kicking"/plunging motion toward the lower sidewall surface, $T_{SL}$, of the tire, T. After the tire, T, is arranged as described above at FIGS. 5B and 6B, the controller 212 may send a signal to the motor 214 in order to actuate the kicker 254 (see FIG. 6C'); upon actuating the kicker 254, the kicker 254 may plunge into and engage the lower sidewall surface, $T_{SL}$, of the tire, T (see FIG. 6C''), such that the orientation of the tire, T, may be adjusted from a substantially planar orientation relative the wheel, W, to a canted/angled orientation relative to the wheel, W. The adjusted orientation of the tire, T, may result in a first portion of the upper bead, $T_{BU}$, of the tire, T, that is proximate the sub-station 210d being lowered to an orientation such that the first portion of upper bead, $T_{BU}$, may be arranged substantially (but not entirely) seated adjacent the upper bead seat, $W_{SU}$, of the wheel, W, whereas a second portion of the upper bead, $T_{BU}$, of the tire, T, that is not proximate and facing away from the sub-station 210d is raised to an orientation such that the second portion of upper bead, $T_{BU}$, may be arranged over the upper rim surface, $W_{RU}$, and not arranged proximate or seated adjacent the upper bead seat, $W_{SU}$, of the wheel, W. After engaging the tire, T, the kicker 254 may be retracted to an orientation within/proximate to the parallel support members 246.

Figure 5D:
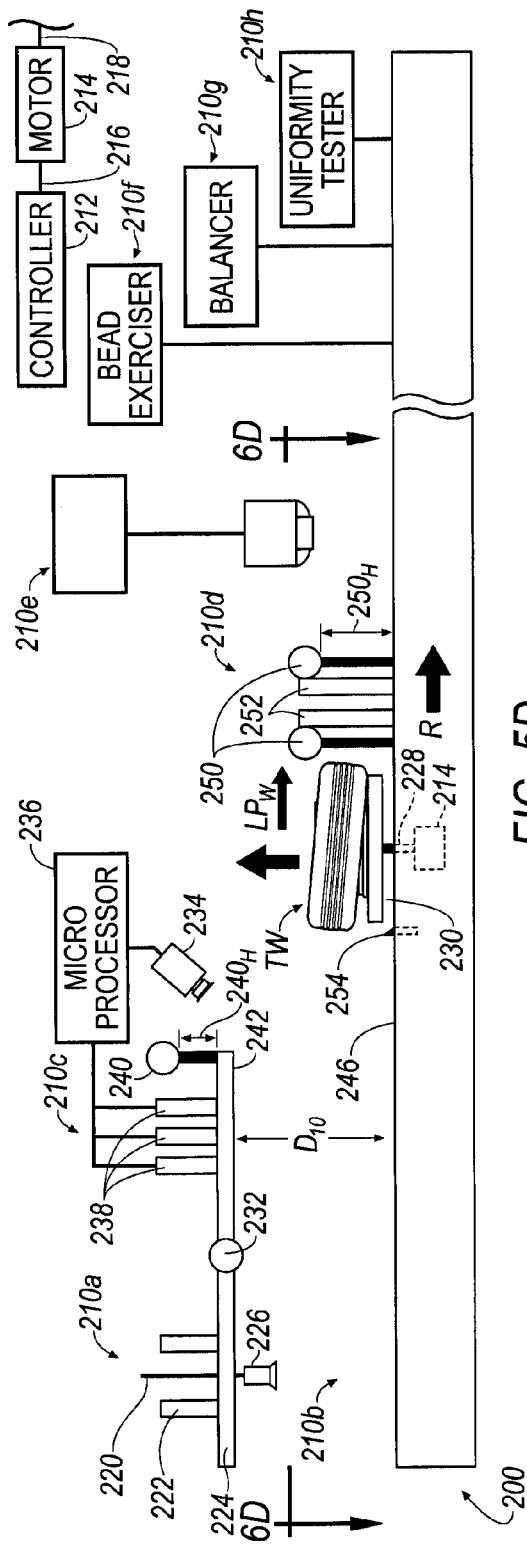
FIG. 5D is another side view of the apparatus of FIG. 5C for processing a tire and a wheel in accordance with an exemplary embodiment of the invention.
Figure 6D:
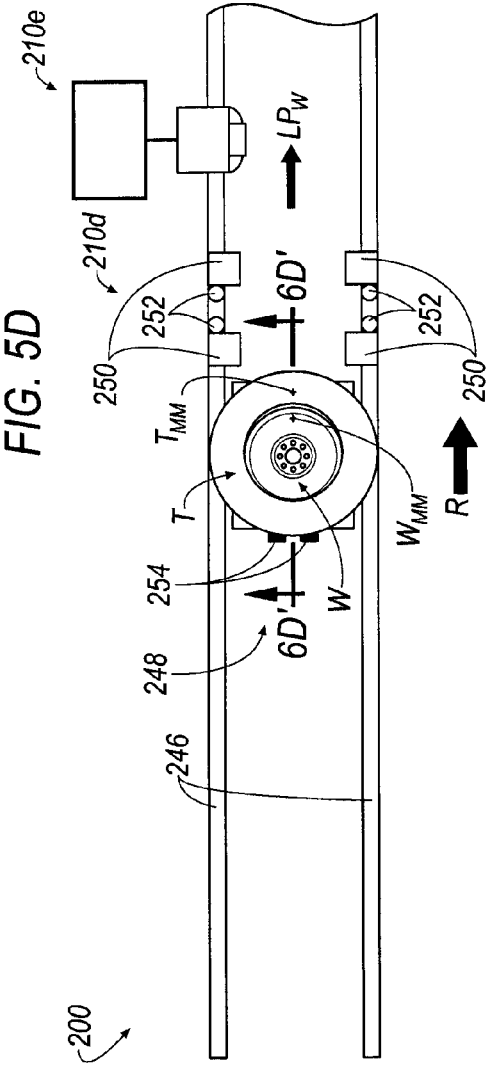
FIG. 6D is a top view of the apparatus according to line 6D-6D of FIG. 5D.

Referring to FIGS. 5D, 6D and 6D'-6D''', once the tire, T, is partially joined/mounted to the wheel, W, as described above, and the kicker 254 has adjusted the orientation of the tire, T, relative to the wheel, W, the wheel transporting device 230 continues to move both of the wheel, W, and the tire, T, along the linear path, $LP_W$, of the wheel, W, in the forwardly/rightwardly direction, R, toward the sub-station 210d. The sub-station 210d is shown conducting a processing step that may be referred to as a second mounting step; therefore, the sub-substation 210d may be referred to as a second mounting sub-station 210d.

As seen in FIGS. 5D and 6D, the second mounting sub-station 210d may include the parallel support members 246 defining a gap 248. The transporting device 230 is movably-arranged within the gap 248 along the linear path, $LP_W$, of the wheel, W. The second mounting sub-station 210d may further comprise a pair of tire-linear-movement interference members 250 and one or more tire-tread-surface-contacting guide members 252 connected to and extending away from each support member defining the parallel support members 246. Like the tire-linear-movement interference member 240, the two pairs of tire-linear-movement interference members 250 may be spaced-apart by a height, $250_H$ (see FIG. 5D), from the parallel support members 246; the height, $250_H$, is substantially equal to but less than the height, $T_H$, of the tire, T.

Referring to FIGS. 6D' and 6D'', as the tire, T, and the wheel, W, are advanced forwardly/rightwardly, R, along the linear path, $LP_W$, of the wheel, W, by the wheel transporting device 230, the two pairs of tire-linear-movement interference members 250 of the second mounting sub-station 210d may come into contact with and resists, but does not prevent, movement of the tire, T, as the tire, T, is carried upon the wheel, W, in the forwardly/rightwardly, R, direction along the linear path, $LP_W$, of the wheel, W.

As the tire, T, is moved past the two pairs of tire-linear-movement interference members 250, the two pairs of tire-linear-movement interference members 250 are brought into contact with the upper sidewall surface, $T_{SU}$, of the tire, T; when the two pairs of tire-linear-movement interference members 250 come into contact with the upper sidewall surface, $T_{SU}$, of the tire, T, the two pairs of tire-linear-movement interference members 250 exerts a downwardly force upon the tire, T, thereby temporarily deforming the tire, T, which results in the tire, T, being spatially manipulated about the wheel, W (such that, e.g., the chords, $T_{C1}$, $T_{C2}/T_D$, $T_{C3}$, of the tire, T, are temporarily upset (i.e., expanded)), in order to permit the upper bead, $T_{BU}$, of the tire, T, to be wrapped about the outer circumferential surface, $W_C$, of the wheel, W, in order to complete the joining/mounting of the tire, T, to the wheel, W, as seen in FIG. 6D''' (due to both of the upper bead, $T_{BU}$, and the lower bead, $T_{BL}$, of the tire, T, being wrapped about the entire outer circumferential surface, $W_C$, of the wheel, W). During the temporary deforming process of the tire, T, as described above, the one or more tire-tread-surface-contacting guide members 252 may engage the tread surface, $T_T$, of the tire, T, in order to assist in maintaining a substantially equal distribution of forces applied to the tire, T, as the tire, T, is advanced by the wheel, W, along the linear path, $LP_W$, of the wheel, W.

As explained above, the wheel transporting device 230 also includes a wheel-retaining member (not shown) that counteracts the resistance imparted to the tire, T, by the two pairs of tire-linear-movement interference members 250, which would otherwise be imparted to the wheel, W, in order to permit both of the tire, T, and the wheel, W, to continued forwardly/rightwardly, R, along the linear path, $LP_W$, of the wheel, W. Once the tire, T, is completely passed by the two pairs of tire-linear-movement interference members 250 as seen in FIG. 6D''', the tire, T, deforms back into its substantially at-rest/substantially unbiased orientation prior to contacting the two pairs of tire-linear-movement interference members 250 such that the tire, T, may be said to be mounted to the wheel, W, thereby forming a non-inflated tire-wheel assembly, TW.

Figure 6E:
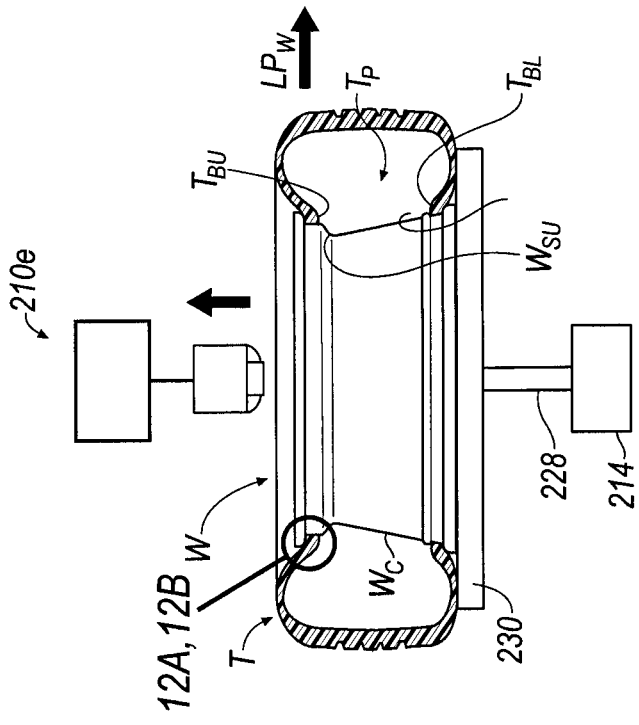
FIG. 6E is a top view of the apparatus according to line 6E-6E of FIG. 5E.
Figure 6E:
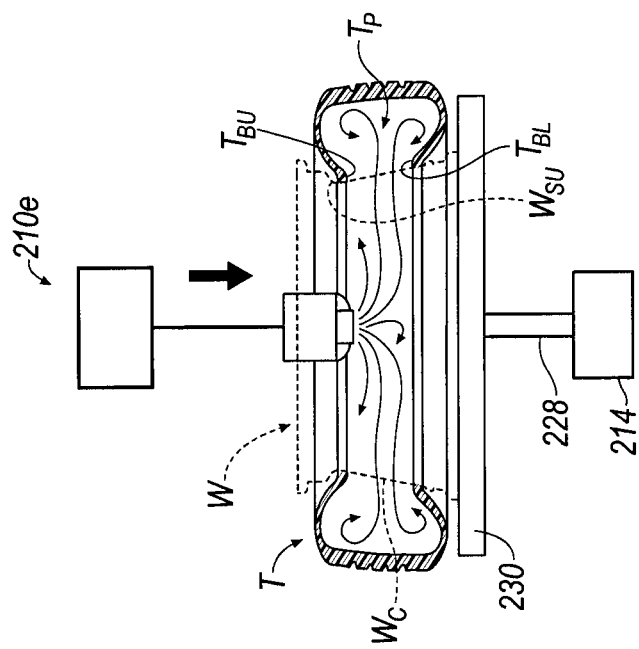

Referring to FIGS. 5E, 6E and 6E'-6E''', the non-inflated tire-wheel assembly, TW, is advanced to the inflating sub-station 210e by the wheel transporting device 230. As explained above, the inflating sub-station 210e may engage the non-inflated tire-wheel assembly, TW, and perform the act of inflating the non-inflated tire-wheel assembly, TW, in order to direct air into the circumferential air cavity, $T_{AC}$, of the tire, T, of the non-inflated tire-wheel assembly, TW. As a result of the act of inflating conducted by the inflating sub-station 210e, the upper bead, $T_{BU}$, and the lower bead, $T_{BL}$, of the tire, T, may be disposed (or "seated") adjacent the upper bead seat, $W_{SU}$, and the lower bead seat, $W_{SL}$, of the wheel, W, such that the non-inflated tire-wheel assembly, TW, may now be referred to as an inflated tire-wheel assembly, TW.

Once the tire-wheel assembly, TW, is inflated at the inflating sub-station 210e, the inflated tire-wheel assembly, TW, is advanced by the wheel transporting device 230 to the sub-station 210f. The processing act conducted by the sub-station 210f may include the act of "exercising" the tire, T, relative the wheel, W, in order to fully seat the upper bead, $T_{BU}$, and the lower bead, $T_{BL}$, of the tire, T, adjacent the upper bead seat, $W_{SU}$, and the lower bead seat, $W_{SL}$, of the wheel, W, respectively. Accordingly, the inflating sub-station 210e may be referred to as an exercising sub-station. As explained above, in some circumstances, entrapments, E (see, e.g., FIG. 12A), such as, for example: air bubbles, lubricant/soap, impurities or the like may be undesirably located between a bead, $T_{BU}/T_{BL}$, of the tire, T, and the seat, $W_{SU}/W_{SL}$, of the wheel, W, after the inflating procedure conducted by the inflating sub-station 210e; by "exercising" (which may include the exercising sub-station contacting the inflated tire-wheel assembly, TW, and imparting one or more of the acts of vibrating, vacuuming, or the like to the inflated tire-wheel assembly, TW), the entrapments, E, may be removed/withdrawn (as seen in FIG. 12B in reference to FIG. 12A) from the inflated tire-wheel assembly, TW, such that one or more of the upper bead, $T_{BU}$, and the lower bead, $T_{BL}$, of the tire, T, may be fully seated adjacent one or more of the upper bead seat, $W_{SU}$, and the lower bead seat, $W_{SL}$, of the wheel, W.

Once the tire-wheel assembly, TW, is exercised at the exercising sub-station 210f, the inflated tire-wheel assembly, TW, is advanced by the wheel transporting device 230 to the sub-stations 210g and 210h. The processing act conducted by the sub-station 210g may include balancing the inflated tire-wheel assembly, TW. The processing act conducted by the substation 210h may include testing the uniformity of the balanced tire-wheel assembly, TW. The balancing and testing-of-uniformity acts may include determining the un/balance of the inflated tire-wheel assembly, TW, and adding one or more weights to the tire-wheel assembly, TW, until the inflated tire-wheel assembly, TW, is balanced. Any desirable balancing apparatus and uniformity testing apparatus may be utilized for carrying out the above-described processing steps at the sub-stations 210g, 210h.

Referring to FIGS. 7A-8A, an apparatus 300 including a plurality of processing sub-stations 310a-310h is shown according to an embodiment. Regarding the view of FIG. 8A, the sub-station 310b is represented in a top view but shown next to the sub-station 310a due to the fact that the sub-station 310a would obscure the sub-station 310b from a true top view representation.

The sub-station 310a may be utilized for preparing a tire, T, prior to a subsequent processing act conducted by one or more of the sub-stations 310c-310h for forming an tire-wheel assembly, TW. The "preparing" act conducted by the sub-station 310a may include lubricating the tire, T, with a lubricant (e.g., a soap) in order to reduce friction between the tire, T, and a wheel, W, during subsequent mounting steps at sub-stations 310c, 310d.

The sub-station 310b may be utilized for "preparing" a wheel, W, prior to a subsequent processing act conducted by one or more of the sub-stations 310c-310h for forming a tire-wheel assembly, TW. The "preparing" act conducted by the sub-station 310b may include lubricating the wheel, W, with a lubricant (e.g., a soap) in order to reduce friction between the wheel, W, and the tire, T, during subsequent mounting steps at sub-stations 310c, 310d.

The sub-stations 310c-310d may be utilized for processing a tire-wheel assembly, TW. The "processing" act conducted by the sub-stations 310c and 310d may include the act of "joining" or "mounting" a tire, T, to a wheel, W, for forming an un-inflated tire-wheel assembly, TW; the act of "joining" or "mounting" may mean to physically couple, connect or marry the tire, T, and wheel, W, such that the wheel, W, may be referred to as a male portion that is inserted into a passage, $T_P$, of the tire, T, being a female portion.

The "processing" act conducted by the sub-station 310e may include the act of "inflating" the tire-wheel assembly, TW; the act of "inflating" may include directing air into the circumferential air cavity, $T_{AC}$, of the tire, T, of the tire-wheel assembly, TW. As a result of the act of "inflating," the upper bead, $T_{BU}$, and the lower bead, $T_{BL}$, of the tire, T, may be disposed (or "seated") adjacent the upper bead seat, $W_{SU}$, and the lower bead seat, $W_{SL}$, of the wheel, W.

The "processing" act conducted by the sub-station 310f may include the act of "exercising" the tire, T, relative to the wheel, W, in order to fully seat the upper bead, $T_{BU}$, and the lower bead, $T_{BL}$, of the tire, T, adjacent the upper bead seat, $W_{SU}$, and the lower bead seat, $W_{SL}$, of the wheel, W, respectively. In some circumstances, entrapments, E (see, e.g., FIG. 12A), such as, for example: air bubbles, lubricant/soap, impurities or the like may be undesirably located between a bead, $T_{BU}$, $T_{BL}$, of the tire, T, and the seat, $W_{SU}$/$W_{SL}$, of the wheel, W; by "exercising" (which may include one or more of the acts of vibrating, vacuuming, or the like) one or more of the tire, T, and the wheel, W, the entrapments, E, may be removed/withdrawn from the tire-wheel assembly, TW, such that one or more of the upper bead, $T_{BU}$, and the lower bead, $T_{BL}$, of the tire, T, may be fully seated adjacent one or more of the upper bead seat, $W_{SU}$, and the lower bead seat, $W_{SL}$, of the wheel, W.

The "processing" act conducted by the sub-station 310g may include balancing the inflated tire-wheel assembly, TW. The "processing" act conducted by the substation 310h may include testing the uniformity of the balanced tire-wheel assembly, TW. The balancing and testing-of-uniformity acts may include determining the un/balance of the inflated tire-wheel assembly, TW, and adding one or more weights to the tire-wheel assembly, TW, until the inflated tire-wheel assembly, TW, is balanced. Any desirable balancing apparatus and uniformity testing apparatus may be utilized for carrying out the above-described processing steps at the sub-stations 310g, 310h.

Referring now to FIGS. 7A-8A, an embodiment of the invention is described. The tire, T, and the wheel, W, are moved in one direction (i.e., according to the illustrated embodiment, in a forwardly/rightwardly direction, R). The wheel, W, for example, may move along a linear path, $LP_W$, from the sub-station 310b to the sub-station 310c-310h. The tire, T, may also move along a linear path, $LP_T$, from the sub-station 310a to the sub-station 310c; however, the linear path of the tire, T, intersects with and merges into the linear path, $LP_W$, of the wheel, W, by way of the sub-station 310c (see, e.g., FIG. 7B). As a result of the generally linear movement of the tire, T, and the wheel, W, at least a portion (see, e.g., sub-stations 310c, 310d) of the apparatus 300 may be referred to as a "linear mounter."

The apparatus 300 may be operated automatically or manually according to the following implementations. In some embodiments, the apparatus 300 may include a controller 312 (e.g., a computer including one or more of a processor, memory or the like to permit automatic/automated control over the apparatus 300) and one or more motors 314 for actuating and/or causing movement of one or more components of the sub-stations 310a-310h. The controller 312 may be connected to the one or motors 314 by one or more cable or leads 316. The one or more motors 314 may be connected to the one or more sub-stations 310a-310h by one or more cables or leads 318. Alternatively or in addition to automatic/automated operation by the controller 312, operation of the apparatus 300 may result from one or more of a manual, operator input (e.g., by way of a joystick, depression of a button or the like).

As seen in FIGS. 7A and 8A, the sub-station 310a prepares the tire, T, by depositing a lubricant or soap upon the tire, T; accordingly, in an embodiment, the sub-station 310a may be referred to as a tire lubricating sub-station. The tire lubricating sub-station 310a may include a dispenser 320 that sprays or wipes the lubricant or soap upon one or more regions of the tire, T, such as, for example, the upper bead, $T_{BU}$, and the lower bead, $T_{BL}$, of the tire, T. The tire lubricating sub-station 310a may also include one or more tire rotating devices 322 for rotating the tire, T, during the lubricating step for the purpose of lubricating one or more regions of the tire, T, that may not be in the spraying direction or coating reach of the dispenser 320.

The tire lubricating sub-station 310a may also include a tire transporting device 324 for moving the tire, T, along the linear path, $LP_T$, from the tire lubricating sub-station 310a to the substation 310c. The dispenser 320 and the one or more tire rotating devices 322 may be attached to and extend away from the tire transporting device 324.

Referring to FIG. 8A, the tire transporting device 324 may include a central conveyor portion 324a (such as, for example, a conveyor belt) that is flanked by support members 324b. The dispenser 320 and the one or more tire rotating devices 322 are attached to and extend away from the support members 324b.

As seen in FIGS. 7A and 8A, the sub-station 310b prepares the wheel, W, by depositing a lubricant or soap upon the wheel, W; accordingly, in an embodiment, the sub-station 310b may be referred to as a wheel lubricating sub-station. The wheel lubricating sub-station 310b may include a dispenser 326 that showers/sprays or wipes the lubricant or soap upon one or more regions of the wheel, W, such as, for example, the upper bead seat, $W_{SU}$, and the lower bead seat, $W_{SL}$, of the wheel, W. The wheel lubricating sub-station 310b may also include one or more wheel rotating devices 328 for rotating the wheel, W, during the lubricating step for the purpose of lubricating one or more regions of the wheel, W, that are not in the spraying direction or coating reach of the dispenser 326.

The wheel lubricating sub-station 310b may also include a wheel transporting device 330 such as, for example, a transporting platen or cart for moving the wheel, W, along the linear path, $LP_W$, from the wheel lubricating sub-station 310b to the sub-station 310c. The one or more tire rotating devices 328 may be attached to the wheel transporting device 330; in an embodiment, a motor 314 may be arranged underneath the wheel transporting device 330, and, the rotating device 328 may extend away from the motor 314 and through the wheel transporting device 330 such that a distal end (not shown) of the rotating device 328 may be attached to an inner periphery/inner circumference of the wheel, W. The dispenser 326 may be attached to and be suspended over the wheel, W, by a lower surface of the tire transporting device 324.

As seen in FIGS. 7B, 8B and 8B'-8B''', sub-station 310c is shown conducting a processing step that may be referred to as a first mounting step; therefore, the sub-substation 310c may be referred to as a first mounting sub-station 310c. Prior to describing an embodiment of the components of the first mounting sub-station 310c, the orientation of the first mounting sub-station 310c relative to the tire lubricating sub-station 310a and the wheel lubricating substation 310b is described according to an embodiment.

As described above in FIG. 7A, the tire lubricating sub-station 310a and the first mounting sub-station 310c generally define the linear path, $LP_T$, of the tire, T. The tire-lubricating sub-station 310a is connected to the first mounting sub-station 310c by a pivot joint 332. Additionally, in an embodiment, both of the tire lubricating sub-station 310a and the first mounting sub-station 310c are arranged above the wheel lubricating sub-station 310b at a spaced-apart distance, $D_{300}$, such that the linear path, $LP_T$, of the tire, T, and the linear path, $LP_W$, of the wheel, W, are initially parallel and do not intersect with one another.

However, as seen in FIG. 7B, the controller 312 and motor 314 may communicate with the pivot joint 332 in order to permit a portion of the linear path, $LP_T$, of the tire, T, defined by the first mounting sub-station 310c to be temporality interrupted such that the portion of the linear path, $LP_T$, of the tire, T, defined by the first mounting sub-station 310c intersects with the linear path, $LP_W$, of the wheel W. Because the linear paths, $LP_T$, $LP_W$, of each of the tire, T, and the wheel, W, intersect, and, because both of the tire, T, and the wheel, W, are moved in one/the same direction (that is forwardly/rightwardly, R), the tire, T, and the wheel, W, may be at least partially coupled/joined at the first mounting sub-station 310c. Further, as will be described in the following embodiment, the forwardly/rightwardly, R, movement imparted to the tire, T, and the wheel, W, results in the partial coupling/joining of the tire, T, and the wheel, W, without the assistance of spatially manipulatable mounting equipment, such as, for example a robotic arm that is joined to, for example, the wheel, W, which would spatially move and force the wheel, W, into the passage, $T_P$, of the tire, T.

Referring to FIGS. 7A-8B, the first mounting sub-station 310c includes a match-mark imaging camera 334, a microprocessor 336, a tire rotating device 338, a tire-linear-movement interference member 340 and a pair of tire lower sidewall surface support members 342 that are spaced apart by a width 342w (see FIGS. 8A, 8B) that forms a gap 344 (see FIGS. 8A, 8B) between the tire sidewall support members 342. The pivot joint 332 pivotally connects the tire sidewall support members 324b of the lubricating sub-station 310a to the support members 342 of the first mounting sub-station 310c. The tire-linear-movement interference member 340 may be spaced-apart by a height, $340_H$, from the pair of tire lower sidewall surface support members 342; the height, $340_H$, is substantially equal to but less than the height, $T_H$, of the tire, T.

The tire rotating device 338 may include a plurality of roller members that extend away from approximately about a central portion of the upper surface of the tire lower sidewall surface support members 342. The tire-linear-movement interference member 340 may be located at and extend away from approximately about a distal end of the upper surface of the of the tire lower sidewall surface support members 342. The match-mark imaging camera 334 may be arranged above and over the tire lower sidewall surface support members 342. The microprocessor 336 is connected to the match-mark imaging camera 334. The microprocessor 336 is communicatively-coupled to the motor 314, and, the motor 314 is connected to the tire rotating device 338 (i.e., the microprocessor 336 is connected to the tire rotating device 338 by way of the motor 314).

Functionally, both of the tire, T, and the wheel, W, are advanced forwardly/rightwardly, R, at about the same speed such that the tire, T, and the wheel, W, arrive in a substantially axially-aligned orientation at the first mounting sub-station 310c prior to actuation of the pivot joint 332 by the controller 312 and the motor 314. The tire, T, may be advanced to and deposited upon the first mounting sub-station 310c as a result of the driving movement of the conveyor 324a, and, about concurrently, the wheel, W, may be advanced underneath the first mounting substation 310c by the wheel transporting device 330 in order to maintain substantially axial alignment of the wheel, W, with the tire, T.

When substantially all of the lower sidewall surface, $T_{SL}$, of the tire, T, is arranged upon the tire sidewall support members 342, the wheel, W, may be substantially axially-aligned with the tire, T, such that the wheel, W, is aligned with the gap 344 and is viewable through both of the gap 344 and the passage, $T_P$, of the tire, T, by the match-mark imaging camera 334.

Then, the match-mark imaging camera 334 obtains/images match-marks, $T_{MM}$, $W_{MM}$, of both of the tire, T, and the wheel, W. The imaged match-marks, $T_{MM}$, $W_{MM}$, of both of the tire, T, and the wheel, W, are then sent to and subsequently interpreted by the microprocessor 336. After interpreting the imaged match-marks, $T_{MM}$, $W_{MM}$, of both of the tire, T, and the wheel, W, the microprocessor 336 determines if and how much the tire, T, should be rotated by the tire rotating devices 338 in order to align the match-marks, $T_{MM}$, $W_{MM}$, of both of the tire, T, and the wheel, W. If the microprocessor 336 determines that the tire, T, should be rotated, the microprocessor 336 sends a signal to the motor 314, which, in turn causes/drives rotation of the tire rotating devices 338 in order to rotate the tire, T, for aligning the match-mark, $T_{MM}$, of the tire, T, with the match-mark, $W_{MM}$, of the wheel, W.

After the match-marks, $T_{MM}$, $W_{MM}$, of both of the tire, T, and the wheel, W, have been aligned, the controller 312 causes the motor 314 to actuate the pivot joint 332, which causes the tire sidewall support members 342 to pivot relative to and no longer be linearly-aligned with the support members 324b, thereby disrupting the linear path, $LP_T$, of the tire, T, thereby causing the linear path, $LP_T$, of the tire, T, to intersect with the linear path, $LP_W$, of the wheel, W.

Once the pivot joint 332 has been actuated, the lower sidewall surface, $T_{LS}$, of the tire, T, should no longer be arranged upon the conveyor 324a, and, with the assistance of gravity, one or more of the tread surface, $T_T$, and a portion of the upper sidewall surface, $T_{SU}$, of the tire, T, may be disposed adjacent the tire-linear-movement interference member 340 in order to, in part, prevent the tire, T, from sliding off of the tire sidewall support members 342. Further, once the pivot joint 332 has been actuated, and, because the wheel, W, is substantially axially-aligned with the tire, T (and, due to the diameter, $W_D$, of the wheel, W, being approximately equal to but slightly less than the width 342w that forms the gap 344 between the tire sidewall support members 342), a portion of the wheel, W, may be arranged within the passage, $T_P$, of the tire, T; referring to FIG. 8B', the portion of the wheel, W, arranged within the passage, $T_P$, of the tire, T, may also result in a portion of the outer circumferential surface, $W_C$, of the wheel, W, proximate the upper bead seat, $W_{SU}$, being arranged adjacent the lower bead, $T_{BL}$, of the tire, T.

Referring to FIGS. 8B' and 8B", as the wheel, W, is advanced forwardly/rightwardly, R, along the linear path, $LP_W$, of the wheel, W, by the wheel transporting device 330, the contact of the wheel, W, with the tire, T, results in the wheel, W, imparting movement to the tire, T, forwardly/rightwardly, R, along the linear path, $LP_W$, of the wheel, W. Although the wheel, W, imparts the movement to the tire, T, in the forwardly/rightwardly, R, along the linear path, $LP_W$, of the wheel, W, the tire-linear-movement interference member 340 resists, but does not prevent, movement of the tire, T, in the forwardly/rightwardly, R, along the linear path, $LP_W$, of the wheel, W; accordingly, as seen in FIG. 8B", 8B'", the tire-linear-movement interference member 340 temporarily deforms the tire, T, which results in the tire, T, being spatially manipulated about the wheel, W (such that, e.g., the chords, $T_{C1}$, $T_{C2}/T_D$, $T_{C3}$, of the tire, T, are temporarily upset (i.e., expanded)), in order to permit the lower bead, $T_{BL}$, of the tire, T, to be wrapped about the outer circumferential surface, $W_C$, of the wheel, W, in order to partially join/mount the tire, T, to the wheel, W, as seen in FIG. 8B'". The wheel transporting device 330 also includes a wheel-retaining member (not shown) that counteracts the resistance imparted to the tire, T, by the tire-linear-movement interference member 340, which would otherwise be imparted to the wheel, W, in order to permit both of the tire, T, and the wheel, W, to continued forwardly/rightwardly, R, movement along the linear path, $LP_W$, of the wheel, W. Once the tire, T, is completely passed by the tire-linear-movement interference member 340 as seen in FIG. 8B'", the tire, T, deforms back into its at-rest/unbiased orientation prior to contacting the tire-linear-movement interference member 340 and is partially joined/mounted to the wheel, W; further, as seen in FIG. 8B'", the upper bead, $T_{BU}$, may be disposed over/adjacent the upper rim surface, $W_{RU}$, of the wheel, W.

Referring to FIGS. 7B, 8B once the tire, T, has been partially mounted to the wheel, W, as described above, the first mounting station 310c arranges the tire, T, upon the wheel, W, and wheel transporting device 330 to the right of/forwardly of the sub-station 310d. Because of the arrangement as described above, in order to interface the tire, T, with the sub-station 310d, the wheel transporting device 330 must reverse the linear motion in the rearwardly/leftwardly, L, direction, as seen in FIG. 8B'"

Referring to FIGS. 7C, 8C and 8C'-8C'", once the tire, T, is partially joined/mounted to the wheel, W, as described above, the wheel transporting device 330 moves both of the wheel, W, and the tire, T, along the linear path, $LP_W$, of the wheel, W (but, however, in the rearwardly/leftwardly direction, L), toward the sub-station 310d. The sub-station 310d is shown conducting a processing step that may be referred to as a second mounting step; therefore, the sub-substation 310d may be referred to as a second mounting sub-station 310d.

As seen in FIGS. 7C and 8C, the second mounting sub-station 310d may include parallel support members 346 defining a gap 348. The transporting device 330 is movably-arranged within the gap 348 along the linear path, $LP_W$, of the wheel, W. The second mounting sub-station 310d may further comprise a pair of tire-linear-movement interference members 350 and one or more tire-tread-surface-contacting guide members 352 connected to and extending away from each support member defining the parallel support members 346. Like the tire-linear-movement interference member 340, the two pairs of tire-linear-movement interference members 350 may be spaced-apart by a height, $350_H$ (see FIG. 7C), from the parallel support members 346; the height, $350_H$, is substantially equal to but less than the height, $T_H$, of the tire, T.

Referring to FIGS. 8C' and 8C", as the tire, T, and the wheel, W, are advanced rearwardly/leftwardly, L, along the linear path, $LP_W$, of the wheel, W, by the wheel transporting device 330, the two pairs of tire-linear-movement interference members 350 of the second mounting sub-station 310d may come into contact with and resists, but does not prevent, movement of the tire, T, as the tire, T, is carried upon the wheel, W, in the forwardly/rightwardly, R, direction along the linear path, $LP_W$, of the wheel, W.

As the tire, T, is moved past the two pairs of tire-linear-movement interference members 350, the two pairs of tire-linear-movement interference members 350 are brought into contact with the upper sidewall surface, $T_{SU}$, of the tire, T; when the two pairs of tire-linear-movement interference members 350 come into contact with the upper sidewall surface, $T_{SU}$, of the tire, T, the two pairs of tire-linear-movement interference members 350 exerts a downwardly force upon the tire, T, thereby temporarily deforming the tire, T, which results in the tire, T, being spatially manipulated about the wheel, W (such that, e.g., the chords, $T_{C1}$, $T_{C2}/T_D$, $T_{C3}$, of the tire, T, are temporarily upset (i.e., expanded)), in order to permit the upper bead, $T_{BU}$, of the tire, T, to be wrapped about the outer circumferential surface, $W_C$, of the wheel, W, in order to complete the joining/mounting of the tire, T, to the wheel, W, as seen in FIG. 8C'" (due to both of the upper bead, $T_{BU}$, and the lower bead, $T_{BL}$, of the tire, T, being wrapped about the entire outer circumferential surface, $W_C$, of the wheel, W). During the temporary deforming process of the tire, T, as described above, the one or more tire-tread-surface-contacting guide members 352 may engage the tread surface, $T_T$, of the tire, T, in order to assist in maintaining a substantially equal distribution of forces applied to the tire, T, as the tire, T, is advanced by the wheel, W, along the linear path, $LP_W$, of the wheel, W.

As explained above, the wheel transporting device 330 also includes a wheel-retaining member (not shown) that counteracts the resistance imparted to the tire, T, by the two pairs of tire-linear-movement interference members 350, which would otherwise be imparted to the wheel, W, in order to permit both of the tire, T, and the wheel, W, to continued rearwardly/leftwardly, L, motion along the linear path, $LP_W$, of the wheel, W. Once the tire, T, is completely passed by the two pairs of tire-linear-movement interference members 350 as seen in FIG. 8C'", the tire, T, deforms back into its substantially at-rest/substantially unbiased orientation prior to contacting the two pairs of tire-linear-movement interference members 350 such that the tire, T, may be said to be mounted to the wheel, W, thereby forming a non-inflated tire-wheel assembly, TW.

Referring to FIGS. 7D and 8D, once the tire, T, has been mounted to the wheel, W, as described above, the wheel transporting device 330 ceases the rearwardly/leftwardly, L, motion along the linear path, $LP_W$, of the wheel, W, and reverses the motion back to the forwardly/rightwardly, R, motion, passing back through the second mounting sub-station 310d; because the tire, T, has been mounted to the wheel, W, any interference arising from subsequently contact of the tire, T, with the two pairs of tire-linear-movement interference members 350 should not upset the mounted orientation of the tire, T, with respect to the wheel, W.

Referring to FIGS. 7E, 8E and 8E'-8E", the non-inflated tire-wheel assembly, TW, is advanced to the inflating sub-station 310e by the wheel transporting device 330. As explained above, the inflating sub-station 310e may engage the non-inflated tire-wheel assembly, TW, and perform the act of inflating the non-inflated tire-wheel assembly, TW, in order to direct air into the circumferential air cavity, $T_{AC}$, of the tire, T, of the non-inflated tire-wheel assembly, TW. As a result of the act of inflating conducted by the inflating sub-station 310e, the upper bead, $T_{BU}$, and the lower bead, $T_{BL}$, of the tire, T, may be disposed (or "seated") adjacent the upper bead seat, $W_{SU}$, and the lower bead seat, $W_{SL}$, of the wheel, W, such that the non-inflated tire-wheel assembly, TW, may now be referred to as an inflated tire-wheel assembly, TW.

Once the tire-wheel assembly, TW, is inflated at the inflating sub-station 310e, the inflated tire-wheel assembly, TW, is advanced by the wheel transporting device 330 to the sub-station 310f. The processing act conducted by the sub-station 310f may include the act of "exercising" the tire, T, relative the wheel, W, in order to fully seat the upper bead, $T_{BU}$, and the lower bead, $T_{BL}$, of the tire, T, adjacent the upper bead seat, $W_{SU}$, and the lower bead seat, $W_{SL}$, of the wheel, W, respectively. Accordingly, the inflating sub-station 310e may be referred to as an exercising sub-station. As explained above, in some circumstances, entrapments, E (see, e.g., FIG. 12A), such as, for example: air bubbles, lubricant/soap, impurities or the like may be undesirably located between a bead, $T_{BU}/T_{BL}$, of the tire, T, and the seat, $W_{SU}/W_{SL}$, of the wheel, W, after the inflating procedure conducted by the inflating sub-station 310e; by "exercising" (which may include the exercising sub-station contacting the inflated tire-wheel assembly, TW, and imparting one or more of the acts of vibrating, vacuuming, or the like to the inflated tire-wheel assembly, TW), the entrapments, E, may be removed/withdrawn (as seen in FIG. 12B in reference to FIG. 12A) from the inflated tire-wheel assembly, TW, such that one or more of the upper bead, $T_{BU}$, and the lower bead, $T_{BL}$, of the tire, T, may be fully seated adjacent one or more of the upper bead seat, $W_{SU}$, and the lower bead seat, $W_{SL}$, of the wheel, W.

Once the tire-wheel assembly, TW, is exercised at the exercising sub-station 310f, the inflated tire-wheel assembly, TW, is advanced by the wheel transporting device 330 to the sub-stations 310g and 310h. The processing act conducted by the sub-station 310g may include balancing the inflated tire-wheel assembly, TW. The processing act conducted by the substation 310h may include testing the uniformity of the balanced tire-wheel assembly, TW. The balancing and testing-of-uniformity acts may include determining the un/balance of the inflated tire-wheel assembly, TW, and adding one or more weights to the tire-wheel assembly, TW, until the inflated tire-wheel assembly, TW, is balanced. Any desirable balancing apparatus and uniformity testing apparatus may be utilized for carrying out the above-described processing steps at the sub-stations 310g, 310h.

The present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. For example most embodiments shown herein depict engaging a wheel (by way of a robotic arm) and manipulating the wheel to mount a tire thereon. However, nothing herein shall be construed to limit the scope of the present invention to only manipulating a wheel to mount a tire thereon. The exemplary embodiments are merely illustrative and should not be considered restrictive in any way. The scope of the invention is defined by the appended claims and their equivalents,rather than by the preceding description.

What is claimed is:

1. An apparatus for processing a tire and a wheel for forming a tire-wheel assembly, comprising:
    at least one linear mounter sub-station that couples the tire with the wheel for forming the tire-wheel assembly;
    a transporting device that transports one of the wheel and the tire along a linear path that traverses the at least one linear mounter sub-station, wherein a component of the at least one linear mounter sub-station resists, but does not prevent, movement of one of the tire and the wheel relative the other of the tire and the wheel along the linear path in order to spatially manipulate one of the tire and the wheel relative the other of the tire and the wheel in order to at least partially couple the tire with the wheel for forming the tire-wheel assembly;
    a tire lubricating sub-station that lubricates the tire prior to the at least one linear mounter sub-station coupling the tire with the wheel for forming the tire-wheel assembly; and
    a wheel lubricating sub-station that lubricates the wheel, prior to the at least one linear mounter sub-station coupling the tire with the wheel for forming the tire-wheel assembly.

2. The apparatus according to claim 1, wherein the movement of one of the tire and the wheel relative the other of the tire and the wheel along the linear path is conducted without the assistance of spatially manipulatable mounting equipment.

3. The apparatus according to claim 2, wherein the spatially manipulatable mounting equipment engages one of the tire and the wheel and conducts work upon of the tire and the wheel for spatially manipulating one of the tire and the wheel relative to the other of the tire and the wheel.

4. The apparatus according to claim 1, wherein the at least one linear mounter sub-station includes
    a first linear mounter sub-station for arranging a lower bead of the tire about an outer circumferential surface of the wheel, and
    a second linear mounter sub-station for arranging an upper bead of the tire about the outer circumferential surface of the wheel.

5. The apparatus according to claim 4 further comprising:
    an inflating sub-station for inflating the tire-wheel assembly thereby arranging an upper bead of the tire adjacent an upper bead seat of the wheel as well as a lower bead of the tire adjacent a lower bead seat of the wheel,
    a bead exerciser sub-station for removing one or more entrapments from between one or more of the upper bead and the upper bead seat and the lower bead and the lower bead seat, a balancer sub-station for balancing the tire-wheel assembly, and a uniformity tester sub-station for determining if the tire-wheel assembly is balanced after processing by the balancer sub-station.

6. The apparatus according to claim 4, wherein the first linear mounter sub-station and the tire lubricating sub-station forms a linear movement path of the tire, wherein second linear mounter sub-station and the wheel lubricating sub-station forms a linear movement path of the wheel, wherein the linear movement path of the tire intersects with the linear movement path of the wheel for forming the linear path.

7. The apparatus according to claim 6, wherein the transporting device transports the wheel along the linear path and drives the wheel into the tire for driving the tire into the component such that the tire is deformed by the component about the wheel in order to spatially manipulate the tire about the wheel for coupling the tire with the wheel for forming the tire-wheel assembly.

8. The apparatus according to claim 6, wherein the first linear mounter sub-station is connected to the second linear mounter sub-station by:

a joint.

9. The apparatus according to claim 8, wherein the joint is a pivot joint such that the linear movement path of the tire intersects with the linear movement path of the wheel at a non-perpendicular angle.

10. The apparatus according to claim 8, wherein the joint is a de-coupling joint such that the linear movement path of the tire is perpendicularly lowered upon the linear movement path of the wheel.

11. The apparatus according to claim 6, wherein the second linear mounter sub-station includes one or more tire orientation changing members plunge into and engage a lower sidewall surface of the tire such that the orientation of the tire is adjusted from a substantially planar orientation relative the wheel to a canted/angled orientation relative to the wheel prior to the second linear mounter sub-station arranging the upper bead of the tire about the outer circumferential surface of the wheel.

12. The apparatus according to claim 6, wherein the transporting device traverses the second linear mounter sub-station in a first direction along the linear path, stops and then traverses the second linear mounter sub-station in a second direction along the linear path, wherein the first direction is opposite the second direction.

13. A method for processing a tire and a wheel for forming a tire-wheel assembly, comprising:

utilizing at least one linear mounter sub-station for coupling the tire with the wheel for forming the tire-wheel assembly;

utilizing a transporting device for transporting one of the wheel and the tire along a linear path that traverses the at least one linear mounter sub-station utilizing a component of the at least one linear mounter sub-station for resisting, but not preventing, movement of one of the tire and the wheel relative the other of the tire and the wheel along the linear path for spatially manipulating one of the tire and the wheel relative the other of the tire and the wheel for at least partially coupling the tire with the wheel for forming the tire-wheel assembly;

conducting movement of one of the tire and the wheel relative the other of the tire and the wheel along the linear path without the assistance of spatially manipulatable mounting equipment.

14. A method for processing a tire and a wheel for forming a tire-wheel assembly, comprising:

utilizing at least one linear mounter sub-station for coupling the tire with the wheel for forming the tire-wheel assembly;

utilizing a transporting device for transporting one of the wheel and the tire along a linear path that traverses the at least one linear mounter sub-station utilizing a component of the at least one linear mounter sub-station for resisting, but not preventing, movement of one of the tire and the wheel relative the other of the tire and the wheel along the linear path for spatially manipulating one of the tire and the wheel relative the other of the tire and the wheel for at least partially coupling the tire with the wheel for forming the tire-wheel assembly;

utilizing a tire lubricating sub-station for lubricating the tire prior to the at least one linear mounter sub-station coupling the tire with the wheel for forming the tire-wheel assembly; and utilizing a wheel lubricating sub-station for lubricating the wheel, prior to the at least one linear mounter sub-station coupling the tire with the wheel for forming the tire-wheel assembly, wherein the at least one linear mounter sub-station includes a first linear mounter sub-station for arranging a lower bead of the tire about an outer circumferential surface of the wheel, wherein the at least one linear mounter sub-station further includes a second linear mounter sub-station for arranging an upper bead of the tire about the outer circumferential surface of the wheel.

15. The apparatus according to claim 14 further comprising the steps of:

utilizing an inflating sub-station for inflating the tire-wheel assembly thereby arranging an upper bead of the tire adjacent an upper bead seat of the wheel as well as a lower bead of the tire adjacent a lower bead seat of the wheel, utilizing a bead exerciser sub-station for removing one or more entrapments from between one or more of the upper bead and the upper bead seat and the lower bead and the lower bead seat, utilizing a balancer sub-station for balancing the tire-wheel assembly, and utilizing a uniformity tester sub-station for determining if the tire-wheel assembly is balanced after processing by the balancer sub-station.

16. The apparatus according to claim 14, wherein the first linear mounter sub-station and the tire lubricating sub-station forms a linear movement path of the tire, wherein second linear mounter sub-station and the wheel lubricating sub-station forms a linear movement path of the wheel, wherein the method further comprises the step of intersecting the linear movement path of the tire with the linear movement path of the wheel for forming the linear path.

17. The apparatus according to claim 16, wherein the transporting device transports the wheel along the linear path and drives the wheel into the tire for driving the tire into the component such that the tire is deformed by the component about the wheel for spatially manipulating the tire about the wheel for coupling the tire with the wheel for forming the tire-wheel assembly.

18. The apparatus according to claim 16 further comprising the steps of:
utilizing the transporting device for:
traversing the second linear mounter sub-station in a first direction along the linear path,
stopping movement in the first direction,
traversing the second linear mounter sub-station in a second direction along the linear path, wherein the first direction is opposite the second direction.

* * * * *